United States Patent
Jain et al.

(10) Patent No.: US 11,722,367 B2
(45) Date of Patent: Aug. 8, 2023

(54) METHOD AND APPARATUS FOR PROVIDING A SERVICE WITH A PLURALITY OF SERVICE NODES

(71) Applicant: Nicira, Inc., Palo Alto, CA (US)

(72) Inventors: Jayant Jain, Cupertino, CA (US);
Anirban Sengupta, Saratoga, CA (US);
Mohan Parthasarathy, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/569,358

(22) Filed: Dec. 12, 2014

(65) Prior Publication Data

US 2016/0094454 A1    Mar. 31, 2016

Related U.S. Application Data

(60) Provisional application No. 62/086,136, filed on Dec. 1, 2014, provisional application No. 62/083,453, filed
(Continued)

(51) Int. Cl.
*G06F 9/46* (2006.01)
*G06F 15/16* (2006.01)
(Continued)

(52) U.S. Cl.
CPC ...... *H04L 41/0813* (2013.01); *H04L 41/5054* (2013.01); *H04L 45/7453* (2013.01);
(Continued)

(58) Field of Classification Search
CPC ............ H04L 41/0813; H04L 47/125; H04L 67/1023; H04L 41/40; H04L 41/5054;
(Continued)

(56) References Cited

U.S. PATENT DOCUMENTS 6,006,264 A    12/1999   Colby et al.
6,104,700 A    8/2000    Haddock et al.
(Continued)

FOREIGN PATENT DOCUMENTS

CA    3034809 A1    3/2018
CN    1689369 A     10/2005
(Continued)

OTHER PUBLICATIONS

Portions of prosecution history of U.S. Appl. No. 14/569,249, Apr. 4, 2016, Jain, Jayant, et al.
(Continued)

*Primary Examiner* — Edan Orgad
*Assistant Examiner* — Vanneilian Lalchinthang
(74) *Attorney, Agent, or Firm* — Adeli LLP

(57) ABSTRACT

Some embodiments provide an elastic architecture for providing a service in a computing system. To perform a service on the data messages, the service architecture uses a service node (SN) group that includes one primary service node (PSN) and zero or more secondary service nodes (SSNs). The service can be performed on a data message by either the PSN or one of the SSN. However, in addition to performing the service, the PSN also performs a load balancing operation that assesses the load on each service node (i.e., on the PSN or each SSN), and based on this assessment, has the data messages distributed to the service node(s) in its SN group. Based on the assessed load, the PSN in some embodiments also has one or more SSNs added to or removed from its SN group. To add or remove an SSN to or from the service node group, the PSN in some embodiments directs a set of controllers to add (e.g., instantiate or allocate) or remove the SSN to or from the SN group. Also, to assess the load on the service nodes, the PSN in some embodiments receives message load data from the controller
(Continued)

set, which collects such data from each service node. In other embodiments, the PSN receives such load data directly from the SSNs.

19 Claims, 20 Drawing Sheets

Related U.S. Application Data on Nov. 24, 2014, provisional application No. 62/058,044, filed on Sep. 30, 2014.

(51) Int. Cl.

| | |
|---|---|
| H04L 12/28 | (2006.01) |
| H04L 41/0813 | (2022.01) |
| H04L 47/125 | (2022.01) |
| H04L 41/5054 | (2022.01) |
| H04L 67/1031 | (2022.01) |
| H04L 47/62 | (2022.01) |
| H04L 9/40 | (2022.01) |
| H04L 69/22 | (2022.01) |
| H04L 45/7453 | (2022.01) |
| H04L 43/0817 | (2022.01) |
| H04L 43/16 | (2022.01) |
| H04L 67/1027 | (2022.01) |
| H04L 67/1008 | (2022.01) |

(52) U.S. Cl.
CPC ........ *H04L 47/125* (2013.01); *H04L 47/6225* (2013.01); *H04L 63/02* (2013.01); *H04L 67/1031* (2013.01); *H04L 69/22* (2013.01); *H04L 43/0817* (2013.01); *H04L 43/16* (2013.01); *H04L 67/1008* (2013.01); *H04L 67/1027* (2013.01)

(58) Field of Classification Search
CPC . H04L 45/7453; H04L 47/6225; H04L 63/02; H04L 67/1031; H04L 69/22; H04L 43/0817; H04L 43/16; H04L 67/1008; H04L 67/1027; H04L 45/38
USPC .......................................................... 370/235
See application file for complete search history.

(56) References Cited

U.S. PATENT DOCUMENTS

| | | | |
|---|---|---|---|
| 6,154,448 A | 11/2000 | Petersen et al. | |
| 6,772,211 B2 | 8/2004 | Lu et al. | |
| 6,779,030 B1 | 8/2004 | Dugan et al. | |
| 6,826,694 B1 | 11/2004 | Dutta et al. | |
| 6,880,089 B1 | 4/2005 | Bommareddy et al. | |
| 6,985,956 B2 | 1/2006 | Luke et al. | |
| 7,013,389 B1 | 3/2006 | Srivastava et al. | |
| 7,209,977 B2 | 4/2007 | Acharya et al. | |
| 7,239,639 B2 | 7/2007 | Cox et al. | |
| 7,379,465 B2 | 5/2008 | Aysan et al. | |
| 7,406,540 B2 | 7/2008 | Acharya et al. | |
| 7,447,775 B1 | 11/2008 | Zhu et al. | |
| 7,480,737 B2 | 1/2009 | Chauffour et al. | |
| 7,487,250 B2 | 2/2009 | Siegel | |
| 7,499,463 B1 | 3/2009 | Droux et al. | |
| 7,649,890 B2 | 1/2010 | Mizutani et al. | |
| 7,698,458 B1 | 4/2010 | Liu et al. | |
| 7,818,452 B2 | 10/2010 | Matthews et al. | |
| 7,898,959 B1 | 3/2011 | Arad | |
| 7,921,174 B1 | 4/2011 | Denise | |
| 7,948,986 B1 | 5/2011 | Ghosh et al. | |
| 8,078,903 B1 | 12/2011 | Parthasarathy et al. | |
| 8,094,575 B1 | 1/2012 | Vadlakonda et al. | |
| 8,175,863 B2 | 5/2012 | Ostermeyer et al. | |
| 8,190,767 B1 | 5/2012 | Maufer et al. | |
| 8,201,219 B2 | 6/2012 | Jones | |
| 8,223,634 B2 | 7/2012 | Tanaka et al. | |
| 8,224,885 B1 | 7/2012 | Doucette et al. | |
| 8,230,493 B2 | 7/2012 | Davidson et al. | |
| 8,266,261 B2 * | 9/2012 | Akagi ............... H04L 29/12254 370/217 |
| 8,339,959 B1 | 12/2012 | Moisand et al. | |
| 8,451,735 B2 | 5/2013 | Li | |
| 8,484,348 B2 | 7/2013 | Subramanian et al. | |
| 8,488,577 B1 | 7/2013 | Macpherson | |
| 8,521,879 B1 | 8/2013 | Pena et al. | |
| 8,615,009 B1 | 12/2013 | Ramamoorthi et al. | |
| 8,707,383 B2 | 4/2014 | Bade et al. | |
| 8,738,702 B1 | 5/2014 | Belanger et al. | |
| 8,743,885 B2 | 6/2014 | Khan et al. | |
| 8,804,720 B1 | 8/2014 | Rainovic et al. | |
| 8,804,746 B2 | 8/2014 | Wu et al. | |
| 8,811,412 B2 | 8/2014 | Shippy | |
| 8,830,834 B2 | 9/2014 | Sharma et al. | |
| 8,832,683 B2 | 9/2014 | Heim | |
| 8,849,746 B2 | 9/2014 | Candea et al. | |
| 8,856,518 B2 | 10/2014 | Sridharan et al. | |
| 8,862,883 B2 | 10/2014 | Cherukur et al. | |
| 8,868,711 B2 | 10/2014 | Skjolsvold et al. | |
| 8,873,399 B2 | 10/2014 | Bothos et al. | |
| 8,874,789 B1 | 10/2014 | Zhu | |
| 8,892,706 B1 | 11/2014 | Dalal | |
| 8,914,406 B1 | 12/2014 | Haugsnes et al. | |
| 8,971,345 B1 | 3/2015 | McCanne et al. | |
| 8,989,192 B2 | 3/2015 | Foo et al. | |
| 8,996,610 B1 | 3/2015 | Sureshchandra et al. | |
| 9,009,289 B1 | 4/2015 | Jacob | |
| 9,094,464 B1 | 7/2015 | Scharber et al. | |
| 9,104,497 B2 | 8/2015 | Mortazavi | |
| 9,148,367 B2 | 9/2015 | Kandaswamy et al. | |
| 9,178,709 B2 | 11/2015 | Higashida et al. | |
| 9,191,293 B2 | 11/2015 | Iovene et al. | |
| 9,203,748 B2 | 12/2015 | Jiang et al. | |
| 9,225,638 B2 | 12/2015 | Jain et al. | |
| 9,225,659 B2 | 12/2015 | McCanne et al. | |
| 9,232,342 B2 | 1/2016 | Seed et al. | |
| 9,237,098 B2 | 1/2016 | Patel et al. | |
| 9,256,467 B1 | 2/2016 | Singh et al. | |
| 9,258,742 B1 | 2/2016 | Pianigiani et al. | |
| 9,264,313 B1 | 2/2016 | Manuguri et al. | |
| 9,277,412 B2 | 3/2016 | Freda et al. | |
| 9,397,946 B1 | 7/2016 | Yadav | |
| 9,407,540 B2 | 8/2016 | Kumar et al. | |
| 9,407,599 B2 | 8/2016 | Koponen et al. | |
| 9,442,752 B1 | 9/2016 | Roth et al. | |
| 9,479,358 B2 | 10/2016 | Klosowski et al. | |
| 9,503,530 B1 | 11/2016 | Niedzielski | |
| 9,531,590 B2 | 12/2016 | Jain et al. | |
| 9,577,845 B2 | 2/2017 | Thakkar et al. | |
| 9,602,380 B2 | 3/2017 | Strassner | |
| 9,686,192 B2 | 6/2017 | Sengupta et al. | |
| 9,686,200 B2 | 6/2017 | Pettit et al. | |
| 9,705,702 B2 | 7/2017 | Foo et al. | |
| 9,705,775 B2 | 7/2017 | Zhang et al. | |
| 9,755,898 B2 | 9/2017 | Jain et al. | |
| 9,755,971 B2 | 9/2017 | Wang et al. | |
| 9,774,537 B2 | 9/2017 | Jain et al. | |
| 9,787,559 B1 | 10/2017 | Schroeder | |
| 9,787,605 B2 | 10/2017 | Zhang et al. | |
| 9,804,797 B1 | 10/2017 | Ng et al. | |
| 9,825,810 B2 | 11/2017 | Jain et al. | |
| 9,860,079 B2 | 1/2018 | Cohn et al. | |
| 9,900,410 B2 | 2/2018 | Dalal | |
| 9,935,827 B2 | 4/2018 | Jain et al. | |
| 9,979,641 B2 | 5/2018 | Jain et al. | |
| 9,985,896 B2 | 5/2018 | Koponen et al. | |
| 9,996,380 B2 | 6/2018 | Singh et al. | |
| 10,013,276 B2 | 7/2018 | Fahs et al. | |
| 10,042,722 B1 | 8/2018 | Chigurupati et al. | |
| 10,075,470 B2 | 9/2018 | Vaidya et al. | |
| 10,079,779 B2 | 9/2018 | Zhang et al. | |
| 10,084,703 B2 | 9/2018 | Kumar et al. | |
| 10,091,276 B2 | 10/2018 | Bloomquist et al. | |
| 10,104,169 B1 | 10/2018 | Moniz et al. | |

(56) References Cited

U.S. PATENT DOCUMENTS

| | | |
|---|---|---|
| 10,129,077 B2 | 11/2018 | Jain et al. |
| 10,129,180 B2 | 11/2018 | Zhang et al. |
| 10,135,636 B2 | 11/2018 | Jiang et al. |
| 10,135,737 B2 | 11/2018 | Jain et al. |
| 10,158,573 B1 | 12/2018 | Lee et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,305,822 B2 | 5/2019 | Tao et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,397,275 B2 | 8/2019 | Jain et al. |
| 10,445,509 B2 | 10/2019 | Thota et al. |
| 10,484,334 B1 | 11/2019 | Lee et al. |
| 10,516,568 B2 | 12/2019 | Jain et al. |
| 10,547,508 B1 | 1/2020 | Kanakarajan |
| 10,554,484 B2 | 2/2020 | Chanda et al. |
| 10,594,743 B2 | 3/2020 | Hong et al. |
| 10,609,091 B2 | 3/2020 | Hong et al. |
| 10,609,122 B1 | 3/2020 | Argenti et al. |
| 10,623,309 B1 | 4/2020 | Gampel et al. |
| 10,637,750 B1 | 4/2020 | Bollineni et al. |
| 10,645,060 B2 | 5/2020 | Ao et al. |
| 10,645,201 B2 | 5/2020 | Mishra et al. |
| 10,659,252 B2 | 5/2020 | Boutros et al. |
| 10,693,782 B2 | 6/2020 | Jain et al. |
| 10,708,229 B2 | 7/2020 | Sevinc et al. |
| 10,728,174 B2 | 7/2020 | Boutros et al. |
| 10,757,077 B2 | 8/2020 | Rajahalme et al. |
| 10,812,378 B2 | 10/2020 | Nainar et al. |
| 10,834,004 B2 | 11/2020 | Yigit et al. |
| 10,853,111 B1 | 12/2020 | Gupta et al. |
| 10,938,668 B1 | 3/2021 | Zulak et al. |
| 10,938,716 B1 | 3/2021 | Chin et al. |
| 10,997,177 B1 | 5/2021 | Howes et al. |
| 11,026,047 B2 | 6/2021 | Greenberger et al. |
| 11,055,273 B1 | 7/2021 | Meduri et al. |
| 11,075,839 B2 | 7/2021 | Zhuang et al. |
| 11,153,190 B1 | 10/2021 | Mahajan et al. |
| 11,157,304 B2 | 10/2021 | Watt, Jr. et al. |
| 11,184,397 B2 | 11/2021 | Annadata et al. |
| 11,316,900 B1 | 4/2022 | Schottland et al. |
| 11,398,983 B2 | 7/2022 | Wijnands et al. |
| 11,528,213 B2 | 12/2022 | Venkatasubbaiah et al. |
| 2002/0010783 A1 | 1/2002 | Primak et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0188026 A1 | 10/2003 | Denton et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2004/0249776 A1 | 12/2004 | Horvitz et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1* | 6/2006 | Andreev ............ H04L 63/0263 726/11 |
| 2006/0155862 A1 | 7/2006 | Kathi et al. |
| 2006/0195896 A1 | 8/2006 | Fulp et al. |
| 2006/0233155 A1* | 10/2006 | Srivastava ............ H04L 45/00 370/351 |
| 2007/0061492 A1 | 3/2007 | Riel |
| 2007/0121615 A1 | 5/2007 | Weill et al. |
| 2007/0153782 A1 | 7/2007 | Fletcher et al. |
| 2007/0214282 A1* | 9/2007 | Sen .................. H04L 67/1017 709/245 |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1* | 2/2008 | Shi .................. G06F 17/30445 |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0037713 A1 | 2/2009 | Khalid et al. |
| 2009/0063706 A1* | 3/2009 | Goldman ................ H04L 45/66 709/250 |
| 2009/0129271 A1 | 5/2009 | Ramankutty et al. |
| 2009/0172666 A1 | 7/2009 | Yahalom et al. |
| 2009/0190506 A1 | 7/2009 | Belling et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0165985 A1 | 7/2010 | Sharma et al. |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0254385 A1 | 10/2010 | Sharma et al. |
| 2010/0257278 A1 | 10/2010 | Gunturu |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1* | 3/2011 | Nandagopal ........ H04L 67/1023 718/105 |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |

(56) References Cited

U.S. PATENT DOCUMENTS

| | | |
|---|---|---|
| 2011/0225293 A1 | 9/2011 | Rathod |
| 2011/0235508 A1 | 9/2011 | Goel et al. |
| 2011/0261811 A1* | 10/2011 | Battestilli .......... H04L 47/125 370/389 |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1* | 12/2011 | Aida .................. H04L 12/4625 709/223 |
| 2011/0317708 A1 | 12/2011 | Clark |
| 2012/0005265 A1 | 1/2012 | Ushioda et al. |
| 2012/0011281 A1 | 1/2012 | Hamada et al. |
| 2012/0014386 A1 | 1/2012 | Xiong et al. |
| 2012/0023231 A1* | 1/2012 | Ueno .................. H04L 45/38 709/225 |
| 2012/0054266 A1 | 3/2012 | Kazerani et al. |
| 2012/0089664 A1 | 4/2012 | Igelka |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0266252 A1 | 10/2012 | Spiers et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0021942 A1 | 1/2013 | Bacthu et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0100851 A1 | 4/2013 | Bacthu et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1* | 8/2013 | Hu .................... H04L 45/24 370/392 |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0287036 A1 | 10/2013 | Banavalikar et al. |
| 2013/0291088 A1 | 10/2013 | Shieh et al. |
| 2013/0297798 A1 | 11/2013 | Arisoylu et al. |
| 2013/0301472 A1 | 11/2013 | Allan |
| 2013/0311637 A1 | 11/2013 | Kamath et al. |
| 2013/0318219 A1 | 11/2013 | Kancherla |
| 2013/0322446 A1 | 12/2013 | Biswas et al. |
| 2013/0332983 A1 | 12/2013 | Koorevaar et al. |
| 2013/0336319 A1 | 12/2013 | Liu et al. |
| 2013/0343174 A1 | 12/2013 | Guichard et al. |
| 2013/0343378 A1 | 12/2013 | Veteikis et al. |
| 2014/0003232 A1 | 1/2014 | Guichard et al. |
| 2014/0003422 A1 | 1/2014 | Mogul et al. |
| 2014/0010085 A1 | 1/2014 | Kavunder et al. |
| 2014/0029447 A1 | 1/2014 | Schrum, Jr. |
| 2014/0046997 A1 | 2/2014 | Dain et al. |
| 2014/0046998 A1 | 2/2014 | Dain et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092914 A1 | 4/2014 | Kondapalli |
| 2014/0096183 A1 | 4/2014 | Jain et al. |
| 2014/0101226 A1 | 4/2014 | Khandekar et al. |
| 2014/0101656 A1 | 4/2014 | Zhu et al. |
| 2014/0108665 A1 | 4/2014 | Arora et al. |
| 2014/0115578 A1 | 4/2014 | Cooper et al. |
| 2014/0129715 A1 | 5/2014 | Mortazavi |
| 2014/0149696 A1 | 5/2014 | Frenkel et al. |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0254591 A1 | 9/2014 | Mahadevan et al. |
| 2014/0269487 A1 | 9/2014 | Kalkunte |
| 2014/0269717 A1 | 9/2014 | Thubert et al. |
| 2014/0269724 A1 | 9/2014 | Mehler et al. |
| 2014/0280896 A1 | 9/2014 | Papakostas et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson, III et al. |
| 2014/0317677 A1 | 10/2014 | Vaidya et al. |
| 2014/0321459 A1 | 10/2014 | Kumar et al. |
| 2014/0330983 A1* | 11/2014 | Zisapel .................. G06F 9/505 709/238 |
| 2014/0334485 A1 | 11/2014 | Jain et al. |
| 2014/0334488 A1 | 11/2014 | Guichard et al. |
| 2014/0341029 A1 | 11/2014 | Allan et al. |
| 2014/0351452 A1 | 11/2014 | Bosch et al. |
| 2014/0362682 A1 | 12/2014 | Guichard et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1 | 1/2015 | Zhang et al. |
| 2015/0023354 A1 | 1/2015 | Li et al. |
| 2015/0026345 A1 | 1/2015 | Ravinoothala et al. |
| 2015/0026362 A1 | 1/2015 | Guichard et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071301 A1 | 3/2015 | Dalal |
| 2015/0073967 A1 | 3/2015 | Katsuyama et al. |
| 2015/0078384 A1 | 3/2015 | Jackson et al. |
| 2015/0092551 A1 | 4/2015 | Moisand et al. |
| 2015/0092564 A1 | 4/2015 | Aldrin |
| 2015/0103645 A1 | 4/2015 | Shen et al. |
| 2015/0103679 A1 | 4/2015 | Tessmer et al. |
| 2015/0103827 A1 | 4/2015 | Quinn et al. |
| 2015/0109901 A1 | 4/2015 | Fan et al. |
| 2015/0124608 A1 | 5/2015 | Agarwal et al. |
| 2015/0124622 A1 | 5/2015 | Kovvali et al. |
| 2015/0124840 A1 | 5/2015 | Bergeron |
| 2015/0138973 A1 | 5/2015 | Kumar et al. |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |

(56) References Cited

U.S. PATENT DOCUMENTS

| | | |
|---|---|---|
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0236948 A1 | 8/2015 | Dunbar et al. |
| 2015/0237013 A1 | 8/2015 | Bansal et al. |
| 2015/0242197 A1 | 8/2015 | Alfonso et al. |
| 2015/0244617 A1 | 8/2015 | Nakil et al. |
| 2015/0263901 A1 | 9/2015 | Kumar et al. |
| 2015/0263946 A1 | 9/2015 | Tubaltsev et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0319078 A1 | 11/2015 | Lee et al. |
| 2015/0319096 A1 | 11/2015 | Yip et al. |
| 2015/0358235 A1 | 12/2015 | Zhang et al. |
| 2015/0358294 A1 | 12/2015 | Kancharla et al. |
| 2015/0365322 A1 | 12/2015 | Shalzkamer et al. |
| 2015/0370586 A1 | 12/2015 | Cooper et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0379277 A1 | 12/2015 | Thota et al. |
| 2015/0381493 A1 | 12/2015 | Bansal et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0043952 A1 | 2/2016 | Zhang et al. |
| 2016/0057050 A1 | 2/2016 | Ostrom et al. |
| 2016/0057687 A1 | 2/2016 | Horn et al. |
| 2016/0065503 A1 | 3/2016 | Yohe et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0099948 A1 | 4/2016 | Ott et al. |
| 2016/0105333 A1 | 4/2016 | Lenglet et al. |
| 2016/0119226 A1 | 4/2016 | Guichard et al. |
| 2016/0127306 A1 | 5/2016 | Wang et al. |
| 2016/0127564 A1 | 5/2016 | Sharma et al. |
| 2016/0134528 A1 | 5/2016 | Lin et al. |
| 2016/0149784 A1 | 5/2016 | Zhang et al. |
| 2016/0149816 A1 | 5/2016 | Wu et al. |
| 2016/0149828 A1 | 5/2016 | Vijayan et al. |
| 2016/0162320 A1 | 6/2016 | Singh et al. |
| 2016/0164776 A1 | 6/2016 | Biancaniello |
| 2016/0164787 A1 | 6/2016 | Roach et al. |
| 2016/0164826 A1 | 6/2016 | Riedel et al. |
| 2016/0173373 A1 | 6/2016 | Guichard et al. |
| 2016/0182684 A1 | 6/2016 | Connor et al. |
| 2016/0197831 A1 | 7/2016 | Foy et al. |
| 2016/0197839 A1 | 7/2016 | Li et al. |
| 2016/0203817 A1 | 7/2016 | Formhals et al. |
| 2016/0205015 A1 | 7/2016 | Halligan et al. |
| 2016/0212048 A1 | 7/2016 | Kaempfer et al. |
| 2016/0212237 A1 | 7/2016 | Nishijima |
| 2016/0218918 A1 | 7/2016 | Chu et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0232019 A1 | 8/2016 | Shah et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0308961 A1 | 10/2016 | Rao |
| 2016/0337189 A1 | 11/2016 | Liebhart et al. |
| 2016/0337249 A1 | 11/2016 | Zhang et al. |
| 2016/0337317 A1 | 11/2016 | Hwang et al. |
| 2016/0344565 A1 | 11/2016 | Batz et al. |
| 2016/0344621 A1 | 11/2016 | Roeland et al. |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2017/0005882 A1 | 1/2017 | Tao et al. |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019303 A1 | 1/2017 | Swamy et al. |
| 2017/0019329 A1 | 1/2017 | Kozat et al. |
| 2017/0019331 A1 | 1/2017 | Yong |
| 2017/0019341 A1 | 1/2017 | Huang et al. |
| 2017/0026417 A1 | 1/2017 | Ermagan et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064048 A1 | 3/2017 | Pettit et al. |
| 2017/0064749 A1 | 3/2017 | Jain et al. |
| 2017/0078176 A1 | 3/2017 | Lakshmikantha et al. |
| 2017/0078961 A1 | 3/2017 | Rabii et al. |
| 2017/0093698 A1 | 3/2017 | Farmanbar |
| 2017/0093758 A1 | 3/2017 | Chanda |
| 2017/0099194 A1 | 4/2017 | Wei |
| 2017/0126497 A1 | 5/2017 | Dubey et al. |
| 2017/0126522 A1 | 5/2017 | McCann et al. |
| 2017/0126726 A1 | 5/2017 | Han |
| 2017/0134538 A1 | 5/2017 | Mahkonen et al. |
| 2017/0142012 A1 | 5/2017 | Thakkar et al. |
| 2017/0147399 A1 | 5/2017 | Cropper et al. |
| 2017/0149582 A1 | 5/2017 | Cohn et al. |
| 2017/0149675 A1 | 5/2017 | Yang |
| 2017/0163531 A1 | 6/2017 | Kumar et al. |
| 2017/0163724 A1 | 6/2017 | Puri et al. |
| 2017/0171159 A1 | 6/2017 | Kumar et al. |
| 2017/0180240 A1 | 6/2017 | Kem et al. |
| 2017/0195255 A1 | 7/2017 | Pham et al. |
| 2017/0208000 A1 | 7/2017 | Bosch et al. |
| 2017/0208011 A1 | 7/2017 | Bosch et al. |
| 2017/0208532 A1 | 7/2017 | Zhou |
| 2017/0214627 A1 | 7/2017 | Zhang et al. |
| 2017/0220306 A1 | 8/2017 | Price et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250869 A1 | 8/2017 | Voellmy |
| 2017/0250902 A1 | 8/2017 | Rasanen et al. |
| 2017/0250917 A1 | 8/2017 | Ruckstuhl et al. |
| 2017/0251065 A1 | 8/2017 | Furr et al. |
| 2017/0257432 A1 | 9/2017 | Fu et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317887 A1 | 11/2017 | Dwaraki et al. |
| 2017/0317926 A1 | 11/2017 | Penno et al. |
| 2017/0317936 A1 | 11/2017 | Swaminathan et al. |

(56) References Cited

U.S. PATENT DOCUMENTS

| | | |
|---|---|---|
| 2017/0317954 A1 | 11/2017 | Masurekar et al. |
| 2017/0317969 A1 | 11/2017 | Masurekar et al. |
| 2017/0318097 A1 | 11/2017 | Drew et al. |
| 2017/0324651 A1 | 11/2017 | Penno et al. |
| 2017/0331672 A1 | 11/2017 | Fedyk et al. |
| 2017/0339110 A1 | 11/2017 | Ni |
| 2017/0339600 A1 | 11/2017 | Roeland et al. |
| 2017/0346764 A1 | 11/2017 | Tan et al. |
| 2017/0353387 A1 | 12/2017 | Kwak et al. |
| 2017/0364794 A1 | 12/2017 | Mahkonen et al. |
| 2017/0366605 A1 | 12/2017 | Chang et al. |
| 2017/0373990 A1 | 12/2017 | Jeuk et al. |
| 2018/0004954 A1 | 1/2018 | Liguori et al. |
| 2018/0006935 A1 | 1/2018 | Mutnuru et al. |
| 2018/0026911 A1 | 1/2018 | Anholt et al. |
| 2018/0041425 A1 | 2/2018 | Zhang |
| 2018/0041470 A1 | 2/2018 | Schultz et al. |
| 2018/0041524 A1 | 2/2018 | Reddy et al. |
| 2018/0063018 A1 | 3/2018 | Bosch et al. |
| 2018/0063087 A1 | 3/2018 | Hira et al. |
| 2018/0091420 A1 | 3/2018 | Drake et al. |
| 2018/0102919 A1 | 4/2018 | Hao et al. |
| 2018/0102965 A1 | 4/2018 | Hari et al. |
| 2018/0115471 A1 | 4/2018 | Curcio et al. |
| 2018/0123950 A1 | 5/2018 | Garg et al. |
| 2018/0124061 A1 | 5/2018 | Raman et al. |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159801 A1 | 6/2018 | Rajan et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0183764 A1 | 6/2018 | Gunda |
| 2018/0184281 A1 | 6/2018 | Tamagawa et al. |
| 2018/0191600 A1 | 7/2018 | Hecker et al. |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0203736 A1 | 7/2018 | Vyas et al. |
| 2018/0205637 A1 | 7/2018 | Li |
| 2018/0213040 A1 | 7/2018 | Pak et al. |
| 2018/0219762 A1 | 8/2018 | Wang et al. |
| 2018/0227216 A1 | 8/2018 | Hughes |
| 2018/0234360 A1 | 8/2018 | Narayana et al. |
| 2018/0247082 A1 | 8/2018 | Durham et al. |
| 2018/0248713 A1 | 8/2018 | Zanier et al. |
| 2018/0248755 A1 | 8/2018 | Hecker et al. |
| 2018/0248790 A1 | 8/2018 | Tan et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0288129 A1 | 10/2018 | Joshi et al. |
| 2018/0295036 A1 | 10/2018 | Krishnamurthy et al. |
| 2018/0295053 A1 | 10/2018 | Leung et al. |
| 2018/0302242 A1 | 10/2018 | Hao et al. |
| 2018/0309632 A1 | 10/2018 | Kompella et al. |
| 2018/0337849 A1 | 11/2018 | Sharma et al. |
| 2018/0349212 A1 | 12/2018 | Liu et al. |
| 2018/0351874 A1 | 12/2018 | Abhigyan et al. |
| 2019/0007382 A1 | 1/2019 | Nirwal et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0028347 A1 | 1/2019 | Johnston et al. |
| 2019/0028384 A1 | 1/2019 | Penno et al. |
| 2019/0028577 A1 | 1/2019 | D?Souza et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0102280 A1 | 4/2019 | Caldato et al. |
| 2019/0108049 A1 | 4/2019 | Singh et al. |
| 2019/0116063 A1 | 4/2019 | Bottorff et al. |
| 2019/0121961 A1 | 4/2019 | Coleman et al. |
| 2019/0124096 A1 | 4/2019 | Ahuja et al. |
| 2019/0132220 A1 | 5/2019 | Boutros et al. |
| 2019/0132221 A1 | 5/2019 | Boutros et al. |
| 2019/0140863 A1 | 5/2019 | Nainar et al. |
| 2019/0140947 A1 | 5/2019 | Zhuang et al. |
| 2019/0140950 A1 | 5/2019 | Zhuang et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0173850 A1 | 6/2019 | Jain et al. |
| 2019/0173851 A1 | 6/2019 | Jain et al. |
| 2019/0222538 A1 | 7/2019 | Yang et al. |
| 2019/0229937 A1 | 7/2019 | Nagarajan et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0268384 A1 | 8/2019 | Hu et al. |
| 2019/0286475 A1 | 9/2019 | Mani |
| 2019/0288915 A1 | 9/2019 | Denyer et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0377604 A1 | 12/2019 | Cybulski |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0059761 A1 | 2/2020 | Li et al. |
| 2020/0067828 A1 | 2/2020 | Liu et al. |
| 2020/0073739 A1 | 3/2020 | Rungta et al. |
| 2020/0076684 A1 | 3/2020 | Naveen et al. |
| 2020/0076734 A1 | 3/2020 | Naveen et al. |
| 2020/0084141 A1 | 3/2020 | Bengough et al. |
| 2020/0084147 A1 | 3/2020 | Gandhi et al. |
| 2020/0136960 A1 | 4/2020 | Jeuk et al. |
| 2020/0145331 A1 | 5/2020 | Bhandari et al. |
| 2020/0162318 A1 | 5/2020 | Patil et al. |
| 2020/0162352 A1 | 5/2020 | Jorgenson et al. |
| 2020/0183724 A1 | 6/2020 | Shevade et al. |
| 2020/0195711 A1 | 6/2020 | Abhigyan et al. |
| 2020/0204492 A1 | 6/2020 | Sarva et al. |
| 2020/0213366 A1 | 7/2020 | Hong et al. |
| 2020/0220805 A1 | 7/2020 | Dhanabalan |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274801 A1 | 8/2020 | Feng et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274944 A1 | 8/2020 | Naveen et al. |
| 2020/0274945 A1 | 8/2020 | Rolando et al. |
| 2020/0287962 A1 | 9/2020 | Mishra et al. |
| 2020/0344088 A1 | 10/2020 | Selvaraj et al. |
| 2020/0358696 A1 | 11/2020 | Hu et al. |
| 2020/0364074 A1 | 11/2020 | Gunda et al. |
| 2020/0382412 A1 | 12/2020 | Chandrappa et al. |
| 2020/0382420 A1 | 12/2020 | Suryanarayana et al. |
| 2020/0389401 A1 | 12/2020 | Enguehard et al. |
| 2021/0004245 A1 | 1/2021 | Kamath et al. |
| 2021/0011812 A1 | 1/2021 | Mitkar et al. |
| 2021/0011816 A1 | 1/2021 | Mitkar et al. |
| 2021/0029088 A1 | 1/2021 | Mayya et al. |

(56) References Cited

U.S. PATENT DOCUMENTS

| | | |
|---|---|---|
| 2021/0067439 A1 | 3/2021 | Kommula et al. |
| 2021/0073736 A1 | 3/2021 | Alawi et al. |
| 2021/0117217 A1 | 4/2021 | Croteau et al. |
| 2021/0136147 A1 | 5/2021 | Giassa et al. |
| 2021/0240734 A1 | 8/2021 | Shah et al. |
| 2021/0266295 A1 | 8/2021 | Stroz |
| 2021/0271565 A1 | 9/2021 | Bhavanarushi et al. |
| 2021/0311758 A1 | 10/2021 | Cao et al. |
| 2021/0314310 A1 | 10/2021 | Cao et al. |
| 2021/0328913 A1 | 10/2021 | Nainar et al. |
| 2021/0349767 A1 | 11/2021 | Asayag et al. |
| 2021/0377160 A1 | 12/2021 | Faseela |
| 2022/0019698 A1 | 1/2022 | Durham et al. |
| 2022/0038310 A1 | 2/2022 | Boutros et al. |
| 2022/0060467 A1 | 2/2022 | Montgomery et al. |

FOREIGN PATENT DOCUMENTS

| | | | |
|---|---|---|---|
| CN | 101594358 | A | 12/2009 |
| CN | 101729412 | A | 6/2010 |
| CN | 103516807 | A | 1/2014 |
| CN | 103795805 | A | 5/2014 |
| CN | 104471899 | A | 3/2015 |
| CN | 107204941 | A | 9/2017 |
| CN | 109213573 | A | 1/2019 |
| CN | 110521169 | A | 11/2019 |
| CN | 107105061 | B | 9/2020 |
| CN | 112181632 | A | 1/2021 |
| EP | 2426956 | A1 | 3/2012 |
| JP | 2005311863 | A | 11/2005 |
| JP | 2015519822 | A | 7/2015 |
| WO | 9918534 | A2 | 4/1999 |
| WO | 2008095010 | A1 | 8/2008 |
| WO | 2014182529 | A1 | 11/2014 |
| WO | 2016053373 | A1 | 4/2016 |
| WO | 2016054272 | A1 | 4/2016 |
| WO | 2019084066 | A1 | 5/2019 |
| WO | 2019147316 | A1 | 8/2019 |
| WO | 2019157955 | A1 | 8/2019 |
| WO | 2019168532 | A1 | 9/2019 |
| WO | 2019226327 | A1 | 11/2019 |
| WO | 2020046686 | A1 | 3/2020 |
| WO | 2020171937 | A1 | 8/2020 |
| WO | 2021041440 | A1 | 3/2021 |

OTHER PUBLICATIONS

Portions of prosecution history of U.S. Appl. No. 14/569,452, Jun. 14, 2016, Jain, Jayant, et al.

Author Unknown, "Datagram," Jun. 22, 2012, 2 pages, retrieved from https://web.archive.org/web/20120622031055/https://en.wikipedia.org/wiki/datagram.

Author Unknown, "AppLogic Features," Jul. 2007, 2 pages. 3TERA, Inc.

Author Unknown, "Enabling Service Chaining on Cisco Nexus 1000V Series," Month Unknown, 2012, 25 pages, Cisco.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Halpern, J., et al., "Service Function Chaining (SFC) Architecture," draft-ietf-sfc-architecture-02, Sep. 20, 2014, 26 pages, IETF.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Kumar, S., et al., "Service Function Chaining Use Cases in Data Centers," draft-ietf-sfc-dc-use-cases-01, Jul. 21, 2014, 23 pages, IETF.

Liu, W., et al., "Service Function Chaining (SFC) Use Cases," draft-liu-sfc-use-cases-02, Feb. 13, 2014, 17 pages, IETF.

Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Casado, Martin, et al., "Virtualizing the Network Forwarding Plane," Dec. 2010, 6 pages.

Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.

Non-Published Commonly Owned U.S. Appl. No. 16/905,909, filed Jun. 18, 2020, 36 pages, Nicira, Inc.

Lin, Po-Ching, et al., "Balanced Service Chaining in Software-Defined Networks with Network Function Virtualization," Computer: Research Feature, Nov. 2016, 9 pages, vol. 49, No. 11, IEEE.

Xiong, Gang, et al., "A Mechanism for Configurable Network Service Chaining and Its Implementation," KSII Transactions on Internet and Information Systems, Aug. 2016, 27 pages, vol. 10, No. 8, KSII.

Siasi, N., et al., "Container-Based Service Function Chain Mapping," 2019 SoutheastCon, Apr. 11-14, 2019, 6 pages, IEEE, Huntsville, AL, USA.

Author Unknown, "Research on Multi-tenancy Network Technology for Datacenter Network," May 2015, 64 pages, Beijing Jiaotong University.

Author Unknown, "MPLS," Mar. 3, 2008, 47 pages.

Cianfrani, Antonio, et al., "Translating Traffic Engineering Outcome into Segment Routing Paths: the Encoding Problem," 2016 IEEE Conference on Computer Communications Workshops (Infocom Wkshps): GI 2016: 9th IEEE Global Internet Symposium, Apr. 10-14, 2016, 6 pages, IEEE, San Francisco, CA, USA.

Li, Qing-Gu, "Network Virtualization of Data Center Security," Information Security and Technology, Oct. 2012, 3 pages.

\* cited by examiner

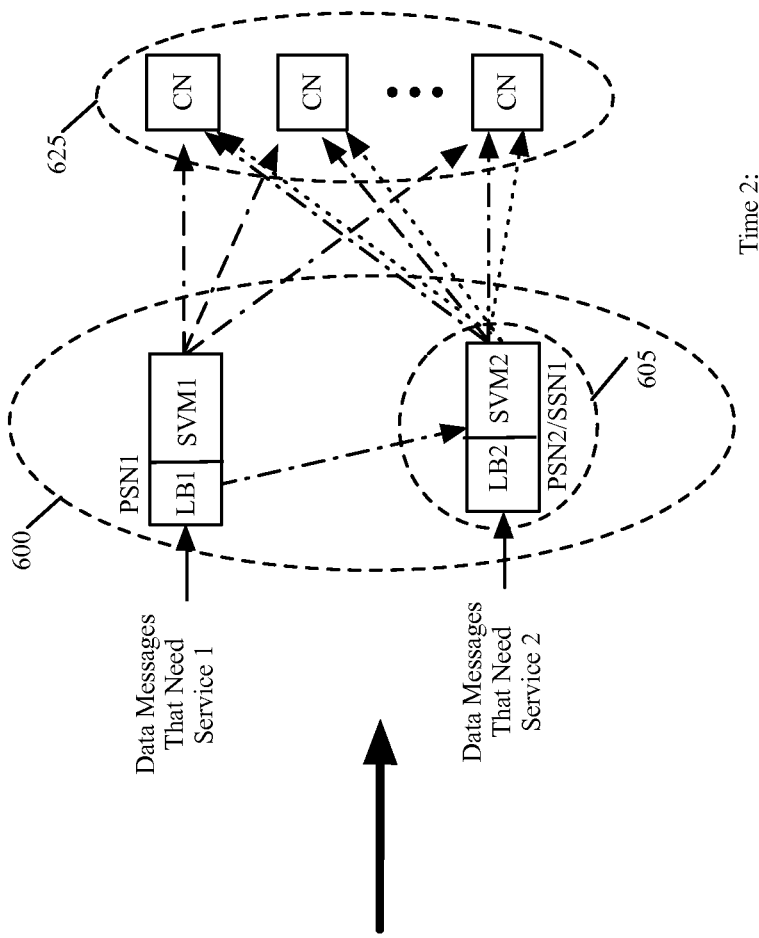
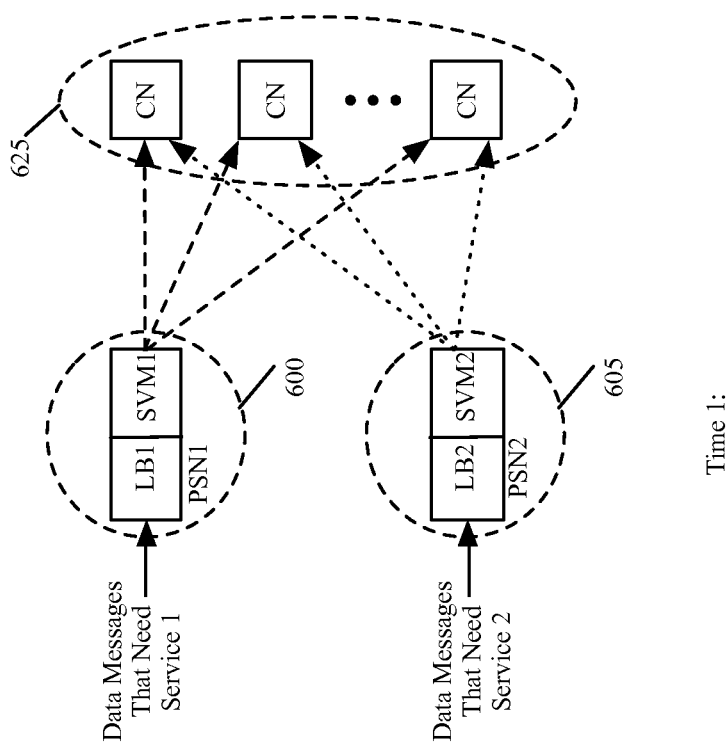
*Figure 6*

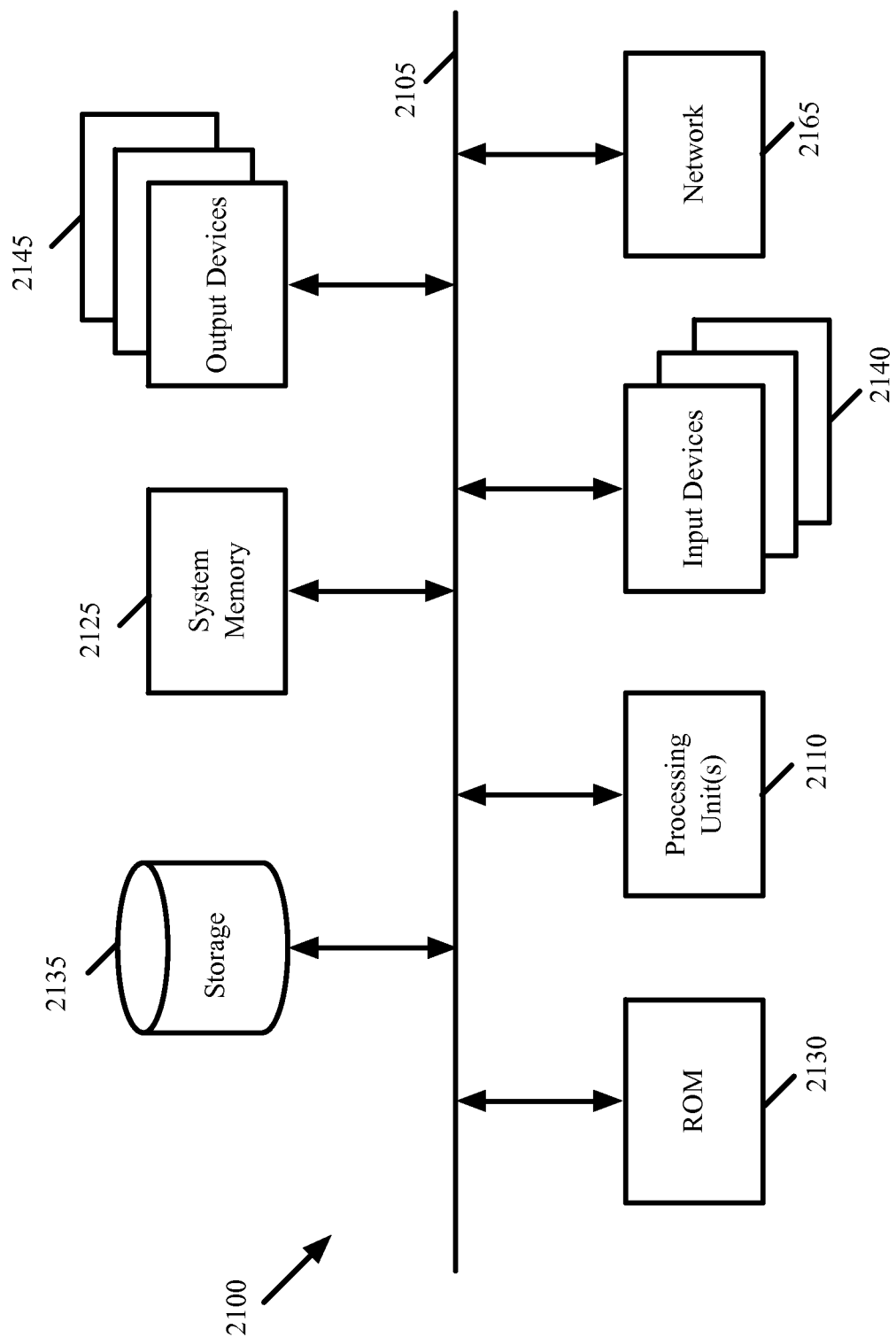

METHOD AND APPARATUS FOR PROVIDING A SERVICE WITH A PLURALITY OF SERVICE NODES

BACKGROUND

Load balancers are commonly used in datacenters to spread the traffic load to a number of available computing resources that can handle a particular type of traffic. For instance, load balancers are topologically deployed at the edge of the network and between different types of VMs (e.g., between webservers and application servers, and between application servers and the database servers). The load balancers are in some deployments standalone machines (e.g., F5 machines) that perform load balancing functions. Also, in some deployments, the load balancers are service virtual machines (VMs) that execute on the same host computing devices that execute the different layers of servers that have their traffic balanced by the load balancers.

In many load balancer deployments, the load balancers serve as chokepoint locations in the network topology because they become network traffic bottlenecks as the traffic load increases. Also, these deployments do not seamlessly grow and shrink the number of the computing devices that receive the load balanced traffic, as the data traffic increases and decreases.

BRIEF SUMMARY

Some embodiments provide an elastic architecture for providing a service in a computing system. To perform a service on the data messages, the service architecture uses a service node (SN) group that includes one primary service node (PSN) and zero or more secondary service nodes (SSNs). The service can be performed on a data message by either the PSN or one of the SSN. However, in addition to performing the service, the PSN also performs a load balancing operation that assesses the load on each service node (i.e., on the PSN or each SSN), and based on this assessment, has the data messages distributed to the service node(s) in its SN group.

Based on the assessed load, the PSN in some embodiments also has one or more SSNs added to or removed from its SN group. In some embodiments, the PSN in some embodiments directs a set of controllers to add (e.g., instantiate or allocate) or remove an SSN to or from the SN group. Also, to assess the load on the service nodes, the PSN in some embodiments receives message load data from the controller set, which collects such data from each service node. In other embodiments, the PSN receives such load data directly from the SSNs.

As mentioned above, the PSN has the data messages distributed among the service nodes in its SN group based on its assessment of the message traffic load on the service nodes of the SN group. The PSN uses different techniques in different embodiments to distribute the data messages to the service node(s) in its group. In some embodiments, the PSN receives each data message for which the service has to be performed. In these embodiments, the PSN either performs the service on the data message, or re-directs the data message to an SSN to perform the service on the data message. To redirect the data messages, the PSN in different embodiments uses different techniques, such as MAC redirect (for L2 forwarding), IP destination network address translation (for L3 forwarding), port address translation (for L4 forwarding), L2/L3 tunneling, etc. In some embodiments, the PSN has a connection data store that maintains the identity of the service node that it previously identified for each data message flow, in order to ensure that data messages that are part of the same flow are directed to the same service node (i.e., to the PSN or the same SSN).

In other embodiments, the PSN configures a set of one or more front-end load balancers (FLBs) that receives the data messages before the PSN, so that the FLB set can direct the data messages to the PSN or the SSN. To configure the FLB set, the PSN in some embodiments receives the first data message of a new data message flow that is received by the FLB set so that the PSN can figure out how the new flow should be distributed. When such a data message has to be forwarded to a particular SSN, the PSN in some embodiments directs the data message to the SSN, and configures the FLB set to direct the data message's flow to the SSN. Before the configuration of the FLB set is completed, the PSN in some embodiments may have to receive data messages that are part of this flow (i.e., the flow that is directed to the particular SSN). In such situation, the PSN of some embodiments direct the data messages to the particular SSN, until the load balancer set can directly forward subsequent data messages of this flow to the particular SSN.

In other embodiments, the PSN configures the FLB set differently. For instance, in some embodiments, the PSN configures the FLB set by simply providing the identity (e.g., the MAC and/or IP address) of each service node in the SN group, and the FLB set uses its own load balancing scheme (e.g., a standard equal cost multipath, ECMP, scheme) to distribute the data message flows to the service nodes in the SN group in a stateful or stateless manner. In other embodiments, the PSN configures the FLB set by providing to the FLB set a load balancing parameter set that provides a particular scheme for the FLB set to use to distribute the data message flows to the service nodes in the SN group.

For example, in some embodiments, the PSN provides to the FLB set a hash table that defines multiple hash value ranges and a service node for each hash value range. In some such embodiments, a load balancer in the FLB set generates a hash value from a header parameter set of a data message flow, identifies the hash range (in the hash table) that contains the hash value, and selects for the data message flow the service node that is associated with the identified hash range. To make its flow distribution stateful, the load balancer in some embodiments stores the identity of the identified service node for the data message flow in a flow connection-state storage, which the load balancer can subsequently access to select the identified service node for subsequent data messages of the flow.

In some embodiments, the service nodes (PSN and SSNs), as well as some or all of the source compute nodes (SCNs) and destination compute nodes (DCNs) that send and receive messages to and from the service nodes, are machines (e.g., virtual machines (VMs) or containers) that execute on host computing devices. A host computing device in some embodiments can execute an arbitrary combination of SCNs, DCNs and service nodes. In some embodiments, the host also executes one or more software forwarding elements (e.g., software switches and/or software routers) to interconnect the machines that execute on the host and to interconnect these machines (through the network interface of the host and intervening forwarding elements outside of the host) with other SCNs, DCNs, and/or service nodes that operate outside of the host. In some embodiments, one or more SCNs, DCNs, and service nodes (PSN and SSNs) are standalone devices (i.e., are not machines that execute on a host computing device with other machines).

The elastic service architecture of some embodiments can be used to provide different services in a computer network. In some embodiments, the services can be any one of the traditional middlebox services, such as load balancing, firewall, intrusion detection, intrusion protection, network address translation (NAT), WAN (wide area network) optimizer, etc. When the service that is performed by the service node group is not load balancing, the PSN of the service node group (that includes the PSN and one or more SSNs) in some embodiments performs a load balancing service in addition to the service performed by all the service nodes in the group. As mentioned above, the PSN in some embodiments performs this load balancing service in order to ensure that the SN group's service is distributed among the service nodes of the group (i.e., in order to distribute the data message load among these service nodes). As described above, the PSN performs different load balancing operations in different embodiments. These operations range from re-directing data message flows directly to the SSNs in some embodiments, to configuring a FLB set to direct the data message flows to the service nodes in other embodiments.

In some cases, the SN group's service is load balancing. In these cases, the PSN performs two types of load balancing. The first type of load balancing is the same load balancing that is performed by all of the service nodes in the group, while the second type of load balancing is a load balancing operation that the PSN performs to ensure that the first type of load balancing is distributed among the group's service nodes (including the PSN). For instance, in some embodiments, the first type load balancing operation is based on L3, L4 and/or L7 parameters of the data messages, and each SN of the group performs this load balancing operation. In addition to performing this load balancing operation, the PSN in some embodiments also performs a second load balancing operation, which is an L2 load balancing operation (e.g., a load balancing operation that relies on the data message L2 parameters and on MAC redirect) that distribute the data messages (on which it does not perform the first type load balancing) to one or more other service nodes of the SN group.

In other embodiments, the first type load balancing operation is based on L4 and/or L7 parameters of the data messages. Each SN of the group performs this L4 and/or L7 load balancing operation. In addition, the PSN of some embodiments also performs an L2 and/or L3 load balancing operation (e.g., a load balancing operation that relies on the data message L3 parameters and IP address DNAT) to distribute the data messages (on which it does not perform the first type load balancing) to one or more other service nodes of the SN group.

In cases where the SN group's service is load balancing, the PSN second type of load balancing operation in some embodiments might not require the PSN to directly re-direct the data message flows to the SSN. For instance, in some embodiments, the PSN's second type load balancing might simply configure an FLB set to direct the data message flows to the service nodes. As mentioned above, the PSN can configure the FLB set differently in different embodiments, e.g., by providing to the FLB set only the SN group membership data, or providing to the FLB set a hash table that for each of several header-parameter, specifies hash-value ranges identifies a service node.

In some embodiments, the SSNs of a SN group also re-direct the data message flows that they receive. For example, in some embodiments, the PSN supplies to an FLB set a SN group update each time a service node is added to or removed from the group. In some such embodiments, each FLB in the FLB set distributes the data message flows in a stateless manner. Before such an FLB in the FLB set updates its distribution scheme based on the updated group membership, the FLB might send a new data message flow to a first service node based on the FLB's old distribution scheme. After this FLB updates its distribution scheme based on the updated group membership, the FLB might send the data message flow to the a second service node based on the FLB's new distribution scheme.

For such a case, the first service node needs to re-direct the data messages for the new flow to the second service node that needs to process these data messages based on the new distribution scheme. When the FLB set distributes data message flows based on its own load balancing distribution scheme, each service node needs to perform this load balancing distribution scheme so that they can predict the service node that should receive the new data message flow based on an updated SN group membership. When the FLB set distributes data message flows based on load balancing parameter (LBP) set provided by the PSN (e.g., based on the hash table provided by the PSN), each SSN in some embodiments either (1) obtains the LBP set form the PSN, or (2) performs the same load balancing operations as the PSN in order to independently derive the LBP set that the PSN will provide to the FLB set. In these embodiments, each SSN uses the LBP set in order to re-direct a new message flow to the correct service node when the FLB set forwards the message flow incorrectly to the SSN.

When the FLB set distributes data message flows in a stateless manner, a first service node (e.g., a PSN or an SSN) might also need to re-direct to a second service node an old data message flow that it receives from the FLB set, because the second service node has previously been processing the data message flow and the FLB set statelessly has begun forwarding the data message flow to the first service node based on an update that it has received from the PSN. To perform this re-direction, the service nodes in some embodiments synchronize in real-time flow connection-state data that identifies the flows that each of them is handling at any time. In some embodiments, the flow connection-state data is synchronized through control channel communication between the service nodes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 6 illustrates an example of two different service node groups performing two different services for data messages that are sent to the same set of destination compute nodes after they are processed by the service nodes of groups.

FIG. 21 conceptually illustrates a computer system with which some embodiments of the invention are implemented.

DETAILED DESCRIPTION

Figure 1:
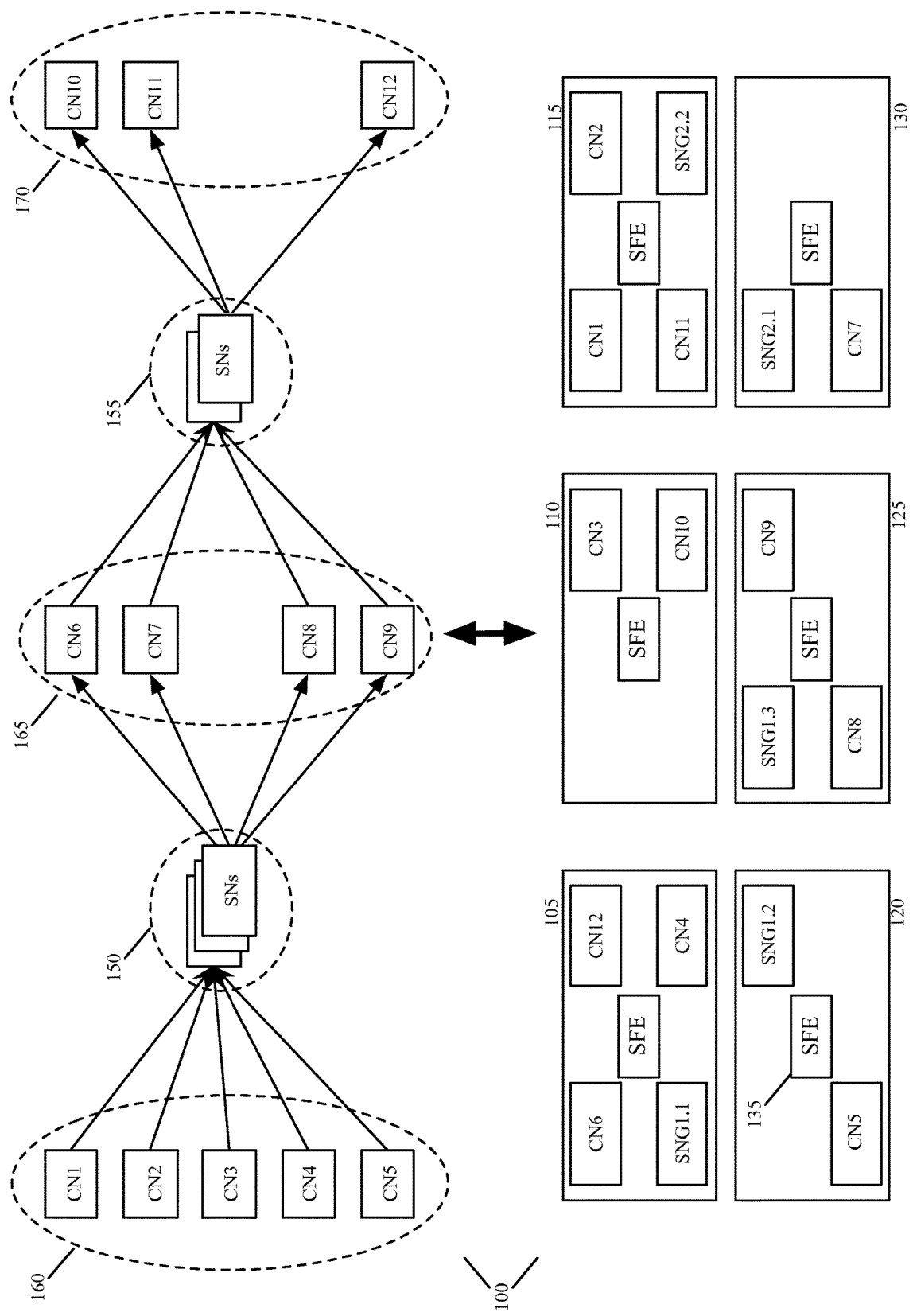
FIG. 1 illustrates an example service architecture of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide an elastic architecture for providing a service in a computing system. As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc.

To perform a service on the data messages, the service architecture uses a service node (SN) group that includes one primary service node (PSN) and zero or more secondary service nodes (SSNs). The service can be performed on a data message by either the PSN or one of the SSN. In addition to performing its group's service, the PSN also performs a load balancing operation that assesses the load on each service node (i.e., on the PSN or each SSN), and based on this assessment, has the data messages distributed to the service node(s) in its SN group.

Based on the assessed load, the PSN in some embodiments also has one or more SSNs added to or removed from its SN group. To add or remove an SSN to or from the service node group, the PSN in some embodiments directs a set of controllers to add (e.g., instantiate or allocate) or remove the SSN to or from the SN group. Also, to assess the load on the service nodes, the PSN in some embodiments receives message load data from the controller set, which collects such data from each service node. In other embodiments, the PSN receives such load data directly from the SSNs.

The elastic service architecture of some embodiments can be used to provide different services in a computer network. In some embodiments, the services can be any one of the traditional middlebox services, such as load balancing, firewall, intrusion detection, intrusion protection, network address translation (NAT), WAN optimizer, etc. When the service that is performed by the service node group is not load balancing, the PSN of the service node group (that includes the PSN and one or more SSNs) in some embodiments performs a load balancing service in addition to the service performed by all the service nodes in the group. As mentioned above, the PSN performs this load balancing service in order to ensure that the SN group's service is distributed among the service nodes of the group. This load balancing service of the PSN is different in different embodiments. This service ranges from re-directing data message flows directly to the SSNs in some embodiments, to configuring a front-end load balancer (FLB) set to direct the data message flows to the service nodes in other embodiments, as further described below.

On the other hand, when the SN group's service is load balancing, the PSN performs two types of load balancing. The first type of load balancing is the same load balancing that is performed by all of the service nodes in the group, while the second type of load balancing is a load balancing operation that the PSN performs to ensure that the first type of load balancing is distributed among the group's service nodes (including the PSN).

For instance, in some embodiments, the first type load balancing operation is an L3, L4 and/or L7 load balancing operation, while the second type of load balancing operation is an L2 load balancing operation. In other embodiments, the first type load balancing operation is an L4 and/or L7 load balancing operation, while the second type of load balancing operation is an L2 and/or L3 load balancing operation. As used in this document, references to L2, L3, L4, and L7 layers are references respectively to the second data link layer, the third network layer, the fourth transport layer, and the seventh application layer of the OSI (Open System Interconnection) layer model.

In different embodiments, the PSN uses different techniques to distribute the data messages to one or more SSNs. In some embodiments, the PSN receives each data messages for which the service has to be performed, and either performs the service on the data message, or re-directs the data message to an SSN to perform the service on the data message. In other embodiments, the PSN configures an FLB set that receives the data messages before the PSN, so that the FLB set can direct the data messages to the PSN or the SSN. As further described below, the PSN can configure the FLB set differently in different embodiments, e.g., by providing to the FLB set only the SN group membership data, by configuring the FLB set for each flow, or by providing to the FLB set a hash table that identifies a service node for each of several header-parameter, hash-value ranges.

FIGS. 3-8 illustrate several examples of a PSN that does not use an FLB set to distribute the data messages to SSNs in its SN group, while FIGS. 9-13 illustrate several examples of a PSN that uses an FLB set to do this task. Before explaining these examples, a multi-host system of some embodiments will be first described by reference to FIGS. 1 and 2. In this system, the service nodes (PSN and SSNs), as well as some or all of the source compute nodes (SCNs) and destination compute nodes (DCNs) that send and receives messages from the service nodes, are machines (e.g., virtual machines (VMs) or containers) that execute on host computing devices. Notwithstanding these examples, one of ordinary skill will realize that the elastic service architecture in some embodiments is used in computer networks that have one or more SCNs, DCNs, and service nodes (PSN and SSNs) operate as standalone devices (i.e., as machines that do not execute on a host computing device with other machines).

FIG. 1 illustrates an example service architecture 100 of some embodiments of the invention. In this deployment, two different sets of elastically adjustable service node groups 150 and 155 are deployed between three groups 160, 165, and 170 of compute nodes. As shown, the compute nodes in each CN group and the service nodes in each SN groups are virtual machines that execute on six host computing devices 105-130 in a datacenter. In FIG. 1, the service nodes in SN group 150 are designated with the acronym SNG1, while the service nodes in SN group 155 are designated with the acronym SNG2. In the discussion below, the compute nodes are referred to as guest VMs (GVMs) while the service nodes are referred to as service VMs (SVMs).

The service node group 150 has three service nodes, while the service node group 155 has two service nodes. In each of these groups, one service node is a primary service node, with each other node being a secondary service node. The two SN groups 150 and 155 can perform the same service operation (e.g., load balancing operation) or can perform two different service operations (e.g., a firewall operation for SN group 150 and a load balancing operation for SN group 155). However, even when the two SN groups perform the same service operation, the service operation of one SN group is distinct and independent from the service operation of the other SN group (e.g., the SN groups perform two different firewall operations).

Each CN group can include an arbitrary collection of compute nodes, or it can be a collection of a particular type of compute nodes. For instance, the CN groups 160, 165, and 170 in some deployments are a collection of web servers 160, application servers 165, and database server 170, while in other embodiments one CN group (e.g., group 165) includes a collection of different types of servers.

A host computing device (also referred to as a host) in some embodiments can execute an arbitrary combination of SCN, DCN and SN virtual machines. FIG. 1 illustrates that in addition to the GVMs and SVMs that execute on the hosts, each host also executes a software forwarding element (SFE) 135 in some embodiments. The SFE 135 on a host communicatively couples the VMs of the host to each other, and to other devices outside of the host (e.g., VMs on other hosts) through a network interface card (NIC) of the host and the intervening network fabric (such as switches and routers) outside of the host. Examples of SFEs include software switches, software routers, etc.

In some embodiments, the VMs execute on top of a hypervisor, which is a software layer that enables the virtualization of the shared hardware resources of the host. In some of these embodiments, the hypervisor provides the SFE functionality on a host computing device, while in other embodiments, the forwarding element functionality is provided by another software module or hardware component (e.g., the network interface card) of the host computing device.

In some embodiments, each service node in an SN group maintains statistics regarding the message traffic load that it processes. Each service node in some embodiments forwards the collected statistics to a set of controllers, which aggregates these statistics and distributes aggregated load data to the PSN in the SN group. Alternatively, in some embodiments, the SSNs directly forward their collected statistics to the PSN.

In some embodiments, the PSN of a SN group uses the aggregated load data to control how the data message flows are directed to different service nodes in its group. In some embodiments, the aggregated load data are also used to determine when new service nodes should be added to or removed from a SN group. In some embodiments, each SSN also receives the load data from the controller set or from other service nodes, in order to compute the load balancing parameters that the PSN will compute.

Figure 2:
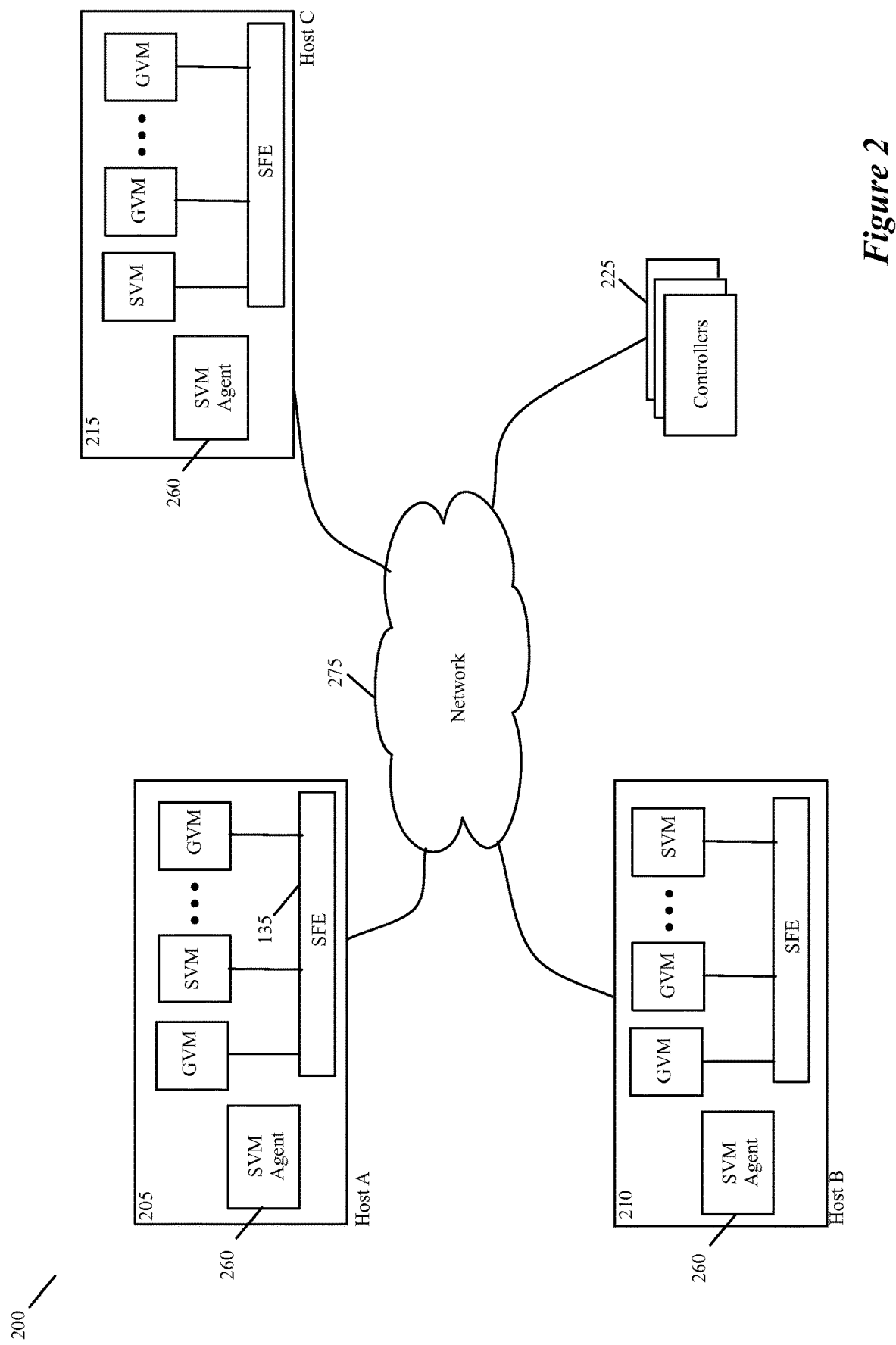
FIG. 2 illustrates a multi-host computer system of some embodiments of the invention.

FIG. 2 illustrates a multi-host system 200 of some embodiments that includes a controller set that gathers statistics from the service nodes and distributes aggregated statistics to the PSNs. As shown, this system includes multiple hosts 205-215, a set of one or more controllers 225, and a network 275. The network 275 communicatively couples the hosts with each other and with the controller set. In some embodiments, the network is a local area network (LAN), a wide area network (WAN), and/or a network of networks (e.g., Internet).

In some embodiments, the hosts 205-215 are similar to the hosts 105-130 of FIG. 1. In FIG. 2, the communicative couplings between each SFE on a host and the GVMs and SVMs on the host are conceptually illustrated. As mentioned above, the SFE on the host communicatively couples the GVMs and SVMs of the host to each other, and to other devices outside of the host (e.g., VMs on other hosts) through the host's NIC and the intervening network 275.

FIG. 2 also shows each host 205, 210, or 215 having an SVM agent 260 for communicating with the controller set 225. Through this communication, the SVM agent can receive configuration data for configuring the operation of the SVMs that operate on the agent's host. Also, in some embodiments, the SVM agent forwards message load statistics from the SVMs on the agent's host to the controller set 225. In some embodiments, the SVM agent aggregates and/or analyzes some of the statistics before relaying processed statistics to the controller set, while in other embodiments the SVM agent relays collected raw statistics to the controller set.

When a PSN executes on the agent's host, the SVM agent of some embodiments receives global load statistics or load balancing parameters from the controller set 225 to supply to any PSN that executes on its host. In some embodiments, the SVM agent receives aggregated statistics from the controller set, analyzes the aggregated statistics, and generates and/or to adjusts the load balancing parameters of the PSN that executes on the agent's hosts.

In some embodiments, the SVM agents are not used at all, or are used for only some of the above-described operations. For instance, in some embodiments, the PSN and SSN SVMs directly send their load statistic data to the controller set 235, and/or the PSN SVMs directly receive the global statistic data from the controller set 235. Also, in some embodiments, the SVM agents are not used to compute or adjust the load balancing parameters of the PSNs, as the PSN SVMs compute or adjust these values. In some embodiments, the SVM agents are not used to configure the SVMs. For instance, in some embodiments, the controller set 225 communicates directly with the SVMs to configure their operations.

As mentioned above, the controller set 225 in some embodiments receives load statistic data from the SVMs of each SN group, generates global load statistic data from the received data, and distributes the global load statistic data to the PSN of the SN group. In other embodiments, the SSNs send their load statistics data directly to the PSN of their group. In different embodiments, the SVMs provide the load statistic data (e.g., to the controller set or to the PSN) in terms of different metrics. Examples of such metrics include number of data message flows currently being processed, number of data messages processed within a particular time period, number of payload bytes in the processed messages, etc.

The controller set distributes the global load statistic data in different forms in different embodiments. In some embodiments, global load data is in the same format as the format that the controller set receives the load data from the service nodes, except that the global load data is an aggregation of the received statistic data from the different service nodes. In other embodiments, the controller set processes the load statistic data from the SVMs to produce processed global statistic data that is in a different format or is expressed in terms of different metrics than the load statistic data that it receives from the service nodes.

Based on the distributed global load statistic data, the PSN of a SN group in some embodiments generates load balancing parameter (LBP) set for distributing the data message flows (e.g., new data message flows) to the service nodes of the group. In some embodiments, the PSN then uses the LBP set to distribute the data message flows to the service nodes of its SN group, while in other embodiments, the PSN uses the LBP set to configure an FLB set to distribute the data message flows.

As mentioned above, even in the embodiments that the PSN configures the FLB set, the PSN in some embodiments uses the LBP set to distribute the data message flows (e.g., because the FLB set statelessly distributes the load or has not yet reconfigured for a new LBP set that is provided by the PSN). In some embodiments, an SSN might also have to distribute the data message flows during this interim time period for similar reasons. To do this, each SSN of a SN group would have to receive the global load statistic data from the controller set, or the global load statistic data or LBP set from the PSN (directly from the PSN or indirectly through the controller set).

Instead of distributing global load statistic data, the controller set 225 of some embodiments generates LBP set from the statistic data that it receives from the service nodes of an SN group, and distributes the load balancing parameter set to the PSN of the SN group. In some embodiments, the PSN then uses this load balancing parameter set to distribute the data message flows to the service nodes of its SN group, while in other embodiments, the PSN uses the load balancing parameter set to configure an FLB set to distribute the data message flows. Again, in some cases (e.g., because the FLB set statelessly distributes the load or has not yet reconfigured for a new LBP set that is provided by the PSN), the PSN in some embodiments might have to use the load balancing parameter set to distribute the data message flows. In some embodiments, an SSN might also have to distribute the data message flows for the same reasons, and for this, the SSN would have to receive LBP set from the controller set.

In addition to distributing global load statistic data and/or load balancing parameters, the controller set 225 in some embodiments also adds service nodes to an SN group, or removes service nodes from the SN group, based on the monitored load on the service nodes in the SN group. In some embodiments, the controller set 225 adds or removes a service node based on its own determination, while in other embodiments the controller set adds or removes a service node in response to a request from the PSN of the SN group. In some embodiments, the controller set 225 adds a service node by instantiating a new SVM and adding this SVM to the SN group. In other embodiments, the controller set 225 adds the service node by allocating a previously instantiated SVM to the SN group.

In some embodiments, the controller set 225 provide control and management functionality for defining (e.g., allocating or instantiating) and managing one or more VMs on the host computing devices 205-215. The controller set 225 also provide control and management functionality for defining and managing multiple logical networks that are defined on the common software forwarding elements of the hosts. In some embodiments, the controller set 225 includes multiple different sets of one or more controllers for performing different sets of the above-described controller operations.

Figure 3:
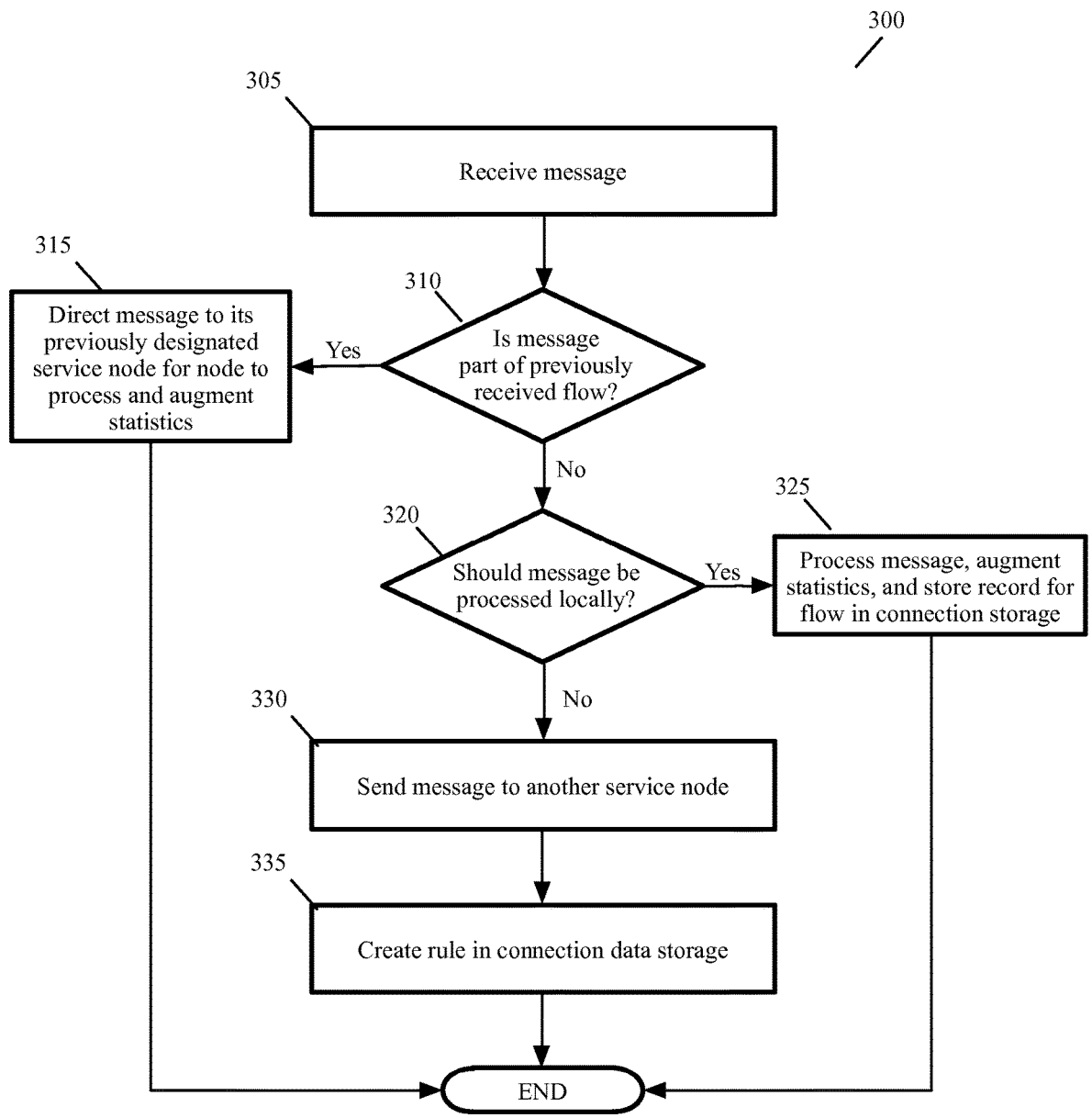
FIG. 3 conceptually illustrates a process that a primary service node (PSN) performs whenever the PSN receives a data message in some embodiments.

FIGS. 3-8 illustrate several examples of a PSN that directly distributes the data messages to the SSN of its SN group without the use of an FLB set. FIG. 3 conceptually illustrates a process 300 that such a PSN performs whenever the PSN receives a data message in some embodiments. The process 300 identifies one service node in the PSN's SN group that should process the received data message, and then directs the identified service node to perform the SN group's service for the received data message. The identified service node can be the PSN itself, or it can be an SSN in the SN group.

As shown in FIG. 3, the process 300 starts (at 305) when the PSN receives a data message. In some embodiments, the received data message is addressed to the SN group. For instance, in some embodiments, the received data message is a data packet that contains the virtual IP (VIP) address of the SN group as its destination address. In some of these embodiments, the group address is not only defined by the VIP address, but also by the port number of the service. In some embodiments, the SN group address is the address of the PSN of the group.

After receiving the data message, the process determines (at 310) whether the received message is part of a particular data message flow for which the PSN has previously processed at least one data message. To make this determination, the process examines (at 310) a flow connection-state data storage that stores (1) the identity of each of several data message flows that the PSN previously processed, and (2) the identity of the service node that the PSN previously identified as the service node for processing the data messages of each identified flow. In some embodiments, the process identifies each flow in the connection-state data storage in terms of one or more flow attributes, e.g., the flow's five tuple header values, which are the source IP address, destination IP address, source port, destination port, and protocol. Also, in some embodiments, the connection-state data storage is hash indexed based on the hash of the flow attributes (e.g., of the flow's five tuple header values). For such a storage, the PSN generates a hash value from the header parameter set of a data message, and then uses this hash value to identify one or more locations in the storage to examine for a matching header parameter set (i.e., for a matching data message flow attribute set).

When the process identifies (at 310) an entry in the flow connection-state data storage that matches the received data message flow's attributes (i.e., when the process determines that it previously processed another data message that is part of the same flow as the received data message), the process directs (at 315) the received data message to the service node (in the SN group) that is identified in the matching entry of the connection-state data storage (i.e., to the service node that the PSN previously identified for processing the data messages of the particular data message flow). This service node then performs the service on the data message, and augments the statistics that it maintains (e.g., the data message count, the byte count, etc.) regarding the data messages that it processes. This service node can be the PSN itself, or it can be an SSN in the SN group. After 315, the process ends.

On the other hand, when the process determines (at 310) that the connection-state data storage does not store an entry for the received data message (i.e., determines that it previously did not process another data message that is part of the same flow as the received data message), the process transitions to 320. In some embodiments, the connection-state data storage periodically removes old entries that have not matched any received data messages in a given duration of time. Accordingly, in some embodiments, when the process determines (at 310) that the connection-state data storage does not store an entry for the received data message, the process may have previously identified a service node for the data message's flow, but the matching entry might have been removed from the connection-state data storage.

At 320, the process determines whether the received data message should be processed locally by the PSN, or remotely by another service node of the SN group. To make this determination, the PSN in some embodiments performs a load balancing operation that identifies the service node for the received data message flow based, based on the load balancing parameter set that the PSN maintains for the SN group at the time that the data message is received. As mentioned before, the load balancing parameter set is adjusted in some embodiments (1) based on updated statistic data regarding the traffic load on each service node in the SN group, and (2) based on service nodes that are added to or removed from the SN group.

The process 300 performs different load balancing operations (at 320) in different embodiments. In some embodiments, the load balancing operation relies on L2 parameters of the data message flows (e.g., generates hash values form the L2 parameters, such as source MAC addresses, to identify hash ranges that specify service nodes for the generated hash values) to distribute the data messages to service nodes, while in other embodiments, the load balancing operations relies on L3/L4 parameters of the flows (e.g., generates hash values form the L3/L4 parameters, such as five tuple header values, to identify hash ranges that specify service nodes for the generated hash values) to distribute the data messages to service nodes. In yet other embodiments, the load balancing operations (at 320) use different techniques (e.g., round robin techniques) to distribute the load amongst the service nodes.

When the process determines (at 320) that the PSN should process the received data message, the process directs (at 325) a service module of the PSN to perform the SN group's service on the received data message. Based on this operation, the PSN's service module also augments (at 325) the statistics that it maintains (e.g., the data message count, the byte count, etc.) regarding the data messages that the PSN processes. At 325, the process 300 also creates an entry in the flow connection-state data storage to identify the PSN as the service node for processing data messages that are part of the same flow as the received data message. In some embodiments, this entry identifies the PSN and identifies the received data message header values (e.g., five tuple values) that specify the message's flow. After 325, the process ends.

When the process determines (at 320) that based on its load balancing parameter set, the PSN should not process the received data message, the process identifies (at 320) another service node in the PSN's SN group to perform the service on the data message. Thus, in this situation, the process directs (at 330) the message to another service node in the PSN's SN group. To redirect the data messages, the PSN in different embodiments uses different techniques, such as MAC redirect (for L2 forwarding), IP destination network address translation (for L3 forwarding), port address translation (for L4 forwarding), L2/L3 tunneling, etc.

To perform MAC redirect, the process 300 in some embodiments changes the MAC address to a MAC address of the service node that it identifies at 320. For instance, in some embodiments, the process changes the MAC address to a MAC address of another SFE port in a port group that contains the SFE port connected with the PSN. More specifically, in some embodiments, the service nodes (e.g., SVMs) of a SN group are assigned ports of one port group that can be specified on the same host or different hosts. In some such embodiments, when the PSN wants to redirect the data message to another service node, it replaces the MAC address of the PSN's port in the data message with the MAC address of the port of the other service node, and then provides this data message to the SFE so that the SFE can forward it directly or indirectly (through other intervening forwarding elements) to the port of the other service node.

Similarly, to redirect the data message to the other service node through IP destination network address translation (DNAT), the PSN replaces the destination IP address in the data message to the destination IP address of the other service node, and then provides this data message to the SFE so that the SFE can forward it directly or indirectly (through other intervening forwarding elements) to the other service node. In some embodiments, the initial destination IP address in the data message that gets replaced is the VIP of the SN group. This VIP in some embodiments is the IP address of the PSN.

To redirect the data message to the other service node through port address translation, the PSN replaces the destination port address in the data message to the destination port address of the other service node, and then uses this new port address to direct the data message to the other service node. In some embodiments, the PSN's network address translation may include changes to two or more of the MAC address, IP address, and port address.

After directing (at 330) the data message to the other service node, the process creates (at 335) an entry in the connection-state data storage to identify the other service node as the service node for processing data messages that are part of the same flow as the received data message. In some embodiments, this entry identifies (1) the other service node and (2) the received data message header values (e.g., five tuple values) that specify the message's flow. After 335, the process ends.

Figure 4:
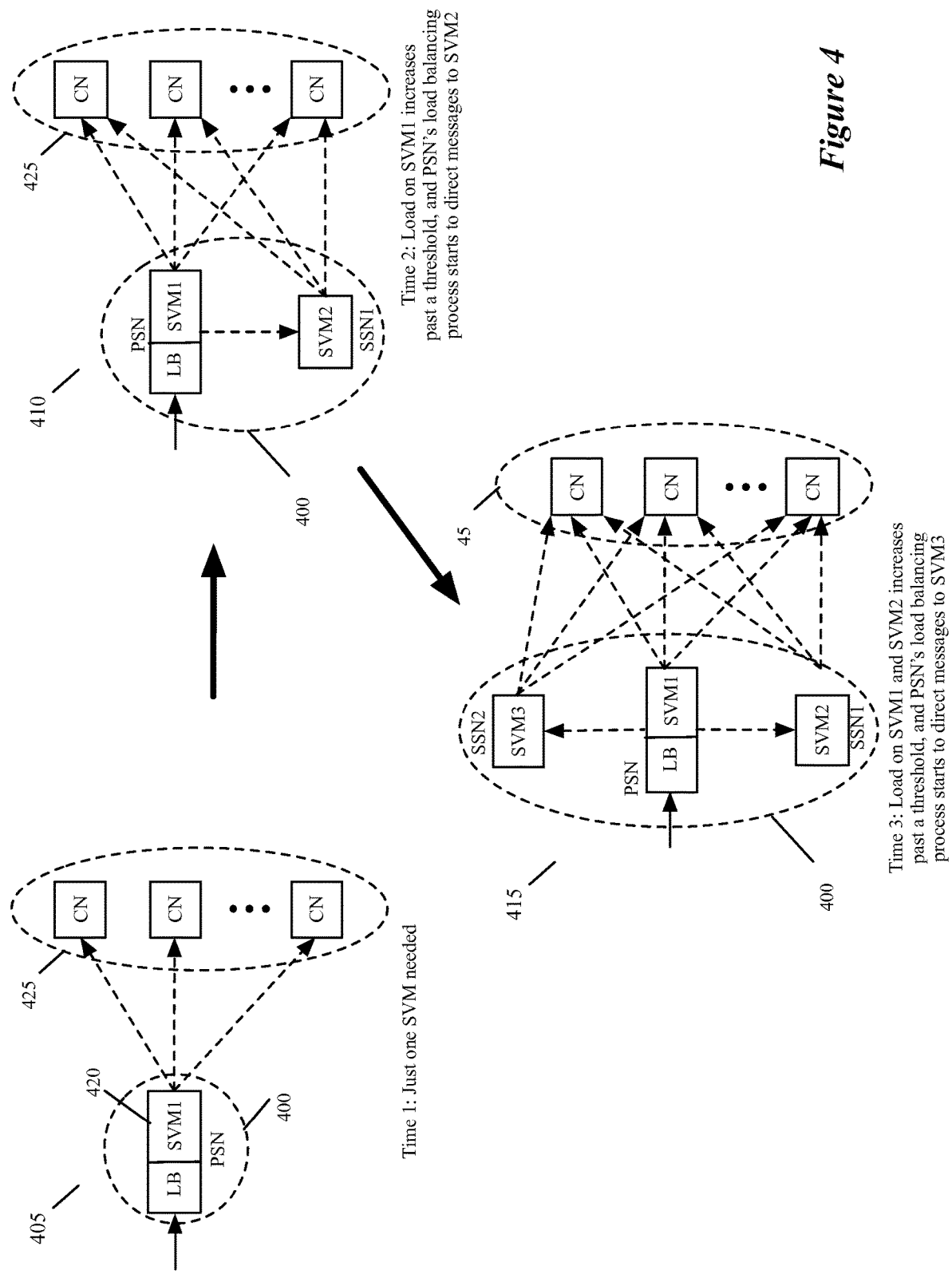
FIG. 4 illustrates an example of how service nodes are added to a service node (SN) group and how the group's PSN distributes the data traffic among the service node of the SN group.

FIG. 4 illustrates an example of how service nodes are added to a SN group 400, and how the group's PSN distributes the data traffic among the service node of the SN group. This example is illustrated in three stages 405-415 that illustrate the operation of the SN group at three different instances in time. The first stage 405 illustrates that at a time T1, the SN group just includes the PSN 420. As shown, the PSN 420 has a load balancer (LB) and a service virtual machine (SVM1). In the first stage 405, the PSN receives all data messages on which the SN group has to perform its service, performs this service on these messages, and then directs these messages to their destination compute nodes 425.

In some embodiments, the destination node for a data message after a service node performs a service on the data message is the source compute node that sent the data message directly or indirectly to the service node group. In other embodiments, the service node is deployed at the edge of a network, and the destination node for a data message that a service node processes, is the compute node or forwarding element inside or outside of the network to which the service node is configured to send its processed messages. In still other embodiments, the service node identifies the destination node for a data message that it processes based on the data message's header parameters and based on the service node's configured rules that control its operation.

The second stage 410 illustrates that a time T2, the SN group has been expanded to include another service node, SSN1, which is implemented by a second service virtual machine, SVM2. In some embodiments, the service node SSN1 is added to the group because the data message load on the group has exceeded a first threshold value. The controller set 225 in some embodiments adds SSN1 when it detects that the data message load has exceeded the first threshold value, or when the PSN detects this condition and directs the controller set to add SSN1. To assess whether the data message load exceeds a threshold value, the controller set or PSN in different embodiments quantify the data message load based on different metrics. In some embodiments, these metrics include one or more of the following parameters: (1) number of flows being processed by the SN group or by individual service nodes in the group, (2) number of packets being processed by the SN group or by individual service nodes in the group, (3) amount of packet data being processed by the SN group or by individual service nodes in the group.

The second stage 410 also illustrates that time T2 the PSN performs the SN group's service on some of the data message flows, while directing other data message flows to SSN1 so that this service node can perform this service on these other flows. As shown, once either the PSN or SSN1 performs the service on a data message, the PSN or SSN1 directs the data message to one of the destination compute nodes that should receive the data message after the SN group processes them. As shown in FIG. 4, the PSN performs a load balancing (LB) operation before performing its own SN group service. The LB operation is the operation that determines which service node in the SN group should perform the group's service on each data message that the PSN receives. In some embodiments, the LB operation is also the operation that determines when service nodes should be added to or removed from the SN group.

The third stage 415 illustrates that a time T3, the SN group has been expanded to include yet another service node, SSN2, which is a third service virtual machine, SVM3. In some embodiments, the service node SSN2 is added to the group because the data message load on the group, or on SVM1 and/or SVM2, has exceeded a second threshold value, which is the same as the first threshold value in some embodiments or is different than the first threshold value in other embodiments. As before, the controller set 225 in some embodiments adds SSN2 when it or the PSN detects that the data message load has exceeded the second threshold value. The third stage 415 also illustrates that time T3, the PSN performs the SN group's service on some of the data message flows, while directing other data message flows to SSN1 or SSN2, so that these service nodes can perform this service on these other flows. As shown, once any of the service nodes, PSN, SSN1, or SSN2, performs the service on a data message, the service node directs the data message to one of the destination compute nodes that should receive the data message after the SN group processes them.

Figure 5:
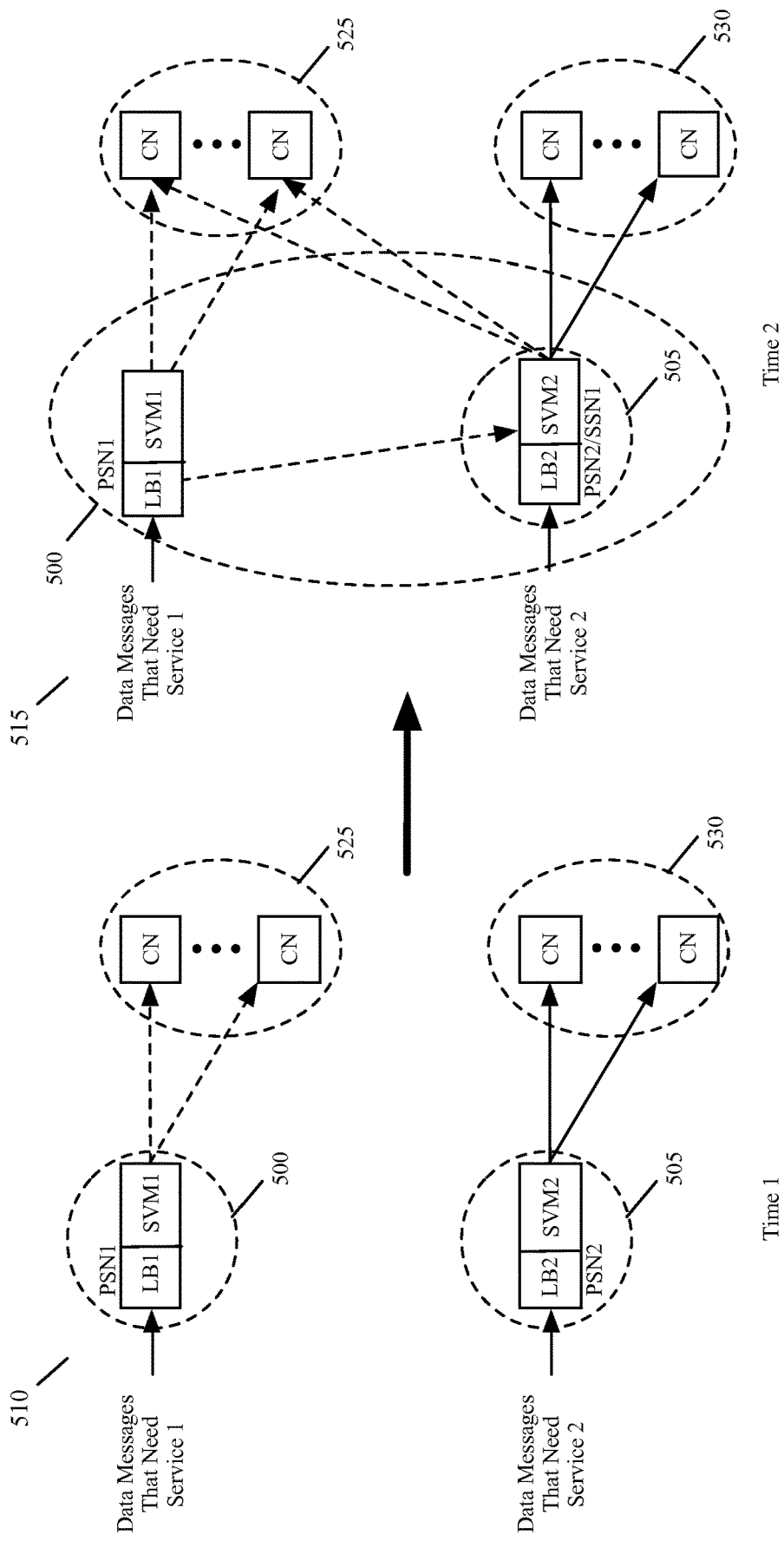
FIG. 5 illustrates an example of the secondary service nodes (SSNs) of one SN group are PSNs or SSNs of another SN group.

In some embodiments, the SSNs of one SN group are PSNs or SSNs of another SN group. FIG. 5 illustrates an example of this by showing two operational stages 510 and 515 of two different SN groups 500 and 505. The two operational stages 510 and 515 show the operation of each SN group at two different instances in time. The first stage 510 illustrates that at a time T1, the SN group 500 just includes PSN1, while SN group 505 just includes PSN2. The service operations of PSN1 are performed by SVM1, while the service operations of PSN2 are performed by SVM2. As shown, each PSN has a load balancer to perform its load balancing operation to distribute the load among the service nodes in its SN group.

In the first stage 510, PSN1 receives all data messages on which the SN group 500 has to perform its service, performs this service on these messages, and then directs these messages to a first set of destination compute nodes 525. Similarly, in this stage, PSN2 receives all data messages on which the SN group 505 has to perform its service, performs this service on these messages, and then directs these messages to a second set of destination compute nodes 530, which is different than the first set of compute nodes 525.

The second stage 515 illustrates that a time T2, the SN group 500 has been expanded to include SVM2 as a service node SSN1. Accordingly, at this stage, SVM2 performs the service operations of PSN1 of SN group 505, and the service operations of SSN1 of SN group 500. In some embodiments, the controller set or PSN1 decides to add SVM2 as service node SSN1 to SN group 500 because the data message load on this group (i.e., on PSN1) has exceeded a first threshold value (as detected by the controller set or the PSN1) and SVM2 has excess capacity to handle service operations for SN group 500.

The second stage 515 also illustrates that time T2 the PSN1 performs the service of SN group 500 on some of the data message flows, while directing other data message flows to SVM2 so that SVM2 can perform the service of group 500 on these other flows. At this stage, the SVM2 not only performs the service of group 500 on the flows passed by the PSN1, but also performs the service of group 505 on the message flows that it receives for group 505. Once either the SVM1 or SVM2 performs the service of group 500 on a data message, the SVM directs the data message to one of the first set of destination compute nodes 525. Also, once SVM2 performs the service of group 505 on a data message, this SVM directs the data message to one of the second set of destination compute nodes 530.

Some embodiments do not allow one SN group to add an underutilized SVM of another SN group (i.e., to use the excess capacity of another service node group's underutilized SVM). However, some of these embodiments allow one SN group to add a service node by instantiating or utilizing a new SVM on a host that executes the PSN or SSN of another SN group. In this manner, these embodiments allow one SN group to capture the underutilized computational capacity of another group's host.

In the example illustrated in FIG. 5, the two SN groups 500 and 505 direct data messages to different sets of compute nodes 525 and 530. However, in some embodiments, the destination compute nodes of the two groups partially or fully overlap. FIG. 6 illustrates an example of two different service node groups 600 and 605 performing two different services for data messages that are sent to the same set of destination compute nodes 625 after they are processed by the service nodes of groups 600 and 605. The only difference between the examples of FIGS. 5 and 6 is that in FIG. 5, the SN groups 500 and 505 direct the processed data messages to two different sets of compute nodes 525 and 530, while in FIG. 6, the SN groups 600 and 605 direct the processed data messages to the same set of compute nodes 625.

In some embodiments, the service of a SN group is load balancing traffic that a set of SCNs sends to a set of two or more DCNs. In such cases, the SN group's PSN performs two types of load balancing. The first type of load balancing is the same load balancing that is performed by all of the service nodes in the group, while the second type of load balancing is a load balancing operation that the PSN performs to ensure that the first type of load balancing is distributed among the group's service nodes (including the PSN).

For instance, in some embodiments, the first type load balancing operation is an L3, L4 and/or L7 load balancing operation, while the second type of load balancing operation is an L2 load balancing operation. In other embodiments, the first type load balancing operation is an L4 and/or L7 load balancing operation, while the second type of load balancing operation is an L2 and/or L3 load balancing operation. An LN load balancing operation distributes the load amongst the DCNs based on LN header parameters of the data messages, where N is an integer that can be 2, 3, 4, or 7. When a load balancing that is based on different layer parameters, the load balancing operation distributes the load amongst the DCNs based on different layer header parameters. For example, when the load balancing is based on L2 and L3 header values, the load balancer in some embodiments generates a hash of the L2 and L3 header values of the data message flow and identifies a DCN for the data message flow based on the L2 and L3 header values. Alternatively, for such an example, the load balancer in some embodiments uses the flow's L2 and L3 header values to identify a load balancing rule that provides load balancing criteria for selecting a DCN for the data message flow (e.g., by using the criteria to pick the DCN in a round robin manner).

Figure 7:
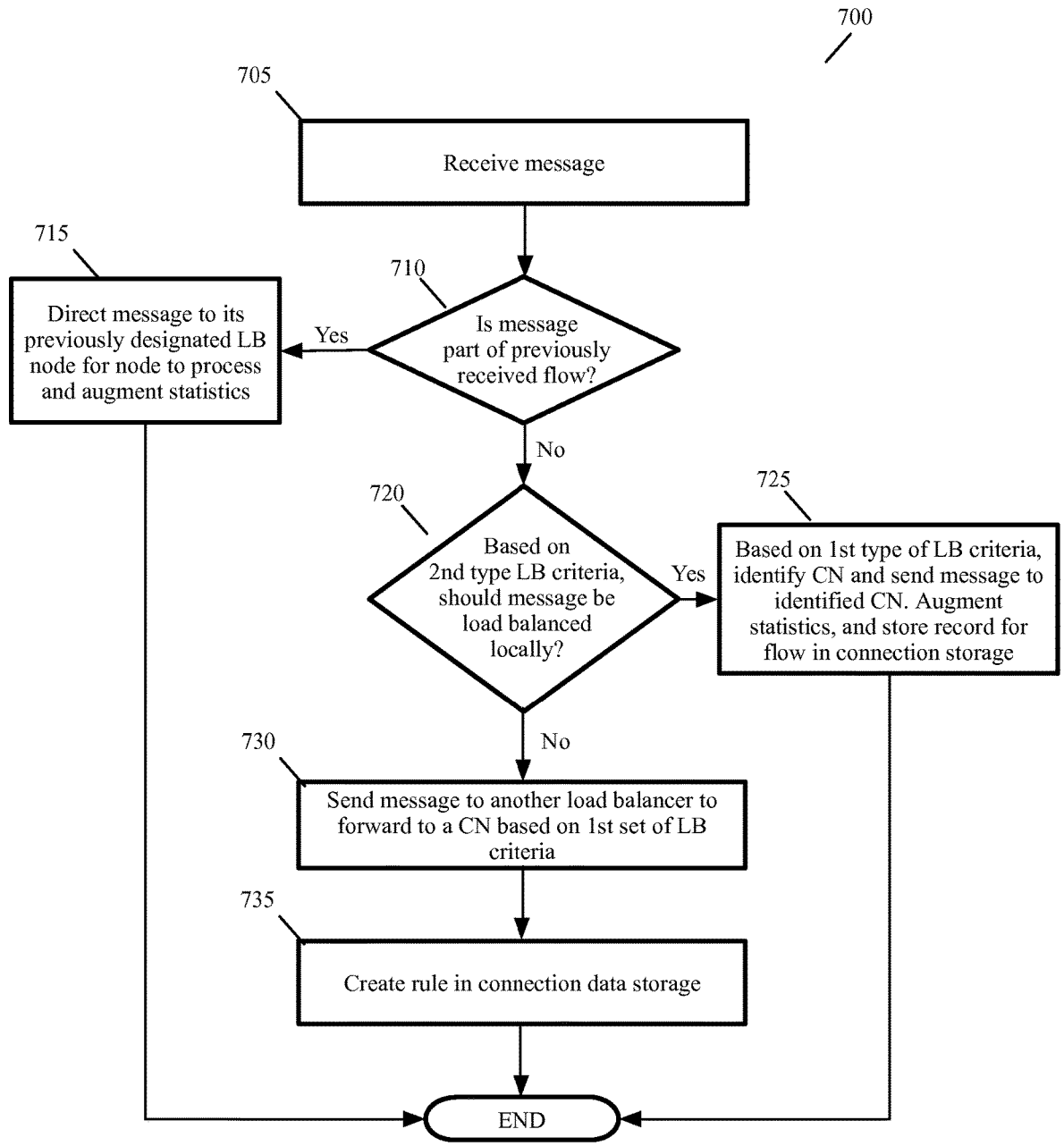
FIG. 7 illustrates a process that the PSN of a load balancing SN group performs in some embodiments.

FIG. 7 illustrates a process 700 that the PSN of a load balancing SN group performs in some embodiments. This process is similar to the process 300 of FIG. 3, except that the service that is performed by the SN group is a load balancing operation that distributes data messages among the compute nodes of a DCN group. The PSN process 700 (1) performs a load balancing operation (referred to above and below as the second type of load balancing), to identify one load balancer in the SN group that should process the received data message, and then (2) directs the data message to the identified load balancer to perform another type of load balancing operation (referred to above and below as the first type of load balancing) on the data message. The identified load balancer can be the PSN itself, or it can be an SSN in the SN group.

As shown in FIG. 7, the process 700 starts (at 705) when the PSN receives a data message. In some embodiments, the received data message is addressed to the SN group. For instance, in some embodiments, the received data message is a data packet that contains the virtual IP (VIP) address of the SN group as its destination address. In some embodiments, the SN group address is the IP address of the PSN of the group.

After receiving the data message, the process determines (at 710) whether the received message is part of a particular data message flow for which the PSN has previously processed at least one data message. To make this determination, the process examines (at 710) a flow connection-state data storage that stores (1) the identity of each of several data message flows that the PSN previously processed, and (2) the identity of the load balancer that the PSN previously identified as the load balancer for processing the data messages of each identified flow. In some embodiments, the process 700 identifies each flow in the connection-state data storage in terms of one or more flow attributes, e.g., the flow's five tuple header values. Also, in some embodiments, the connection-state data storage is hash indexed based on the hash of the flow attributes (e.g., of the flow's five tuple header values).

When the process identifies (at 710) an entry in the connection-state data storage that matches the received data message flow's attributes (i.e., when the process determines that it previously processed another data message that is part of the same flow as the received data message), the process directs (at 715) the received data message to the load balancer (in the SN group) that is identified in the matching entry of the connection-state data storage (i.e., to the load balancer that the PSN previously identified for processing the data messages of the particular data message flow). This load balancer then performs the first type of load balancing operation on the data message to direct the received data message to one compute node in the DCN set. This load balancer also augments the statistics that it maintains (e.g., the data message count, the byte count, etc.) regarding the data messages that it processes. This load balancer can be the PSN itself, or it can be an SSN in the SN group. After 715, the process ends.

On the other hand, when the process determines (at 710) that the connection-state data storage does not store an entry for the received data message (i.e., determines that it previously did not process another data message that is part of the same flow as the received data message), the process determines (at 720) whether the received data message should be processed locally by the PSN, or remotely by another load balancer of the SN group. To make this determination, the PSN in some embodiments performs the second type of load balancing operation that relies on a second set of load balancing parameters that the PSN maintains for the SN group at the time that the data message is received.

The second type of load balancing operation is based on different load balancing parameter sets in different embodiments. For instance, in some embodiments, the second type of load balancing operation is an L2 load balancing operation that relies on load balancing parameter set that are defined in terms of L2 parameters. In other embodiments, the second type of load balancing operation is an L2 and/or L3 load balancing operation that relies on load balancing parameter set that are defined in terms of L2 and/or L3 parameters. As mentioned before, the load balancing parameter set is adjusted in some embodiments (1) based on updated statistic data regarding the traffic load on each load balancer in the SN group, and (2) based on load balancers that are added to or removed from the SN group.

When the process determines (at 720) that the PSN should process the received data message, the process directs (at 725) a load balancer module of the PSN to perform the first type of load balancing operation on the received data message. The first type of load balancing operation relies on a first set of load balancing parameter that the PSN maintains for the DCN group at the time that the data message is received.

The first type of load balancing operation is based on different load balancing parameter sets in different embodiments. For instance, in some embodiments, the first type load balancing operation is an L3, L4 and/or L7 load balancing operation and the load balancing parameter set is defined in terms of L3, L4 and/or L7 parameters. In other embodiments, the first type load balancing operation is an L4 and/or L7 load balancing operation and the load balancing parameter set is defined in terms of L4 and/or L7 parameters.

Also, in some embodiments, an LB parameter set includes load balancing criteria that the load balancer uses to select a destination for the message (e.g., to select a destination in a weighted round robin fashion). In other embodiments, an LB parameter set includes a hash table that specifies several hash value ranges and a destination for each hash value range. The load balancer generates a hash value from a set of header values (e.g., the L3, L4 and/or L7 parameter) of a data message, and then selects for the message the destination that is associated with the hash-value range that contains the generated hash value. Some embodiments uses the same load balancing approaches (e.g., hashing approaches) for the first and second load balancing operations of the PSN, while other embodiments uses different load balancing approaches (e.g., a hashing approach and a round robin approach) sets for these load balancing operations of the PSN.

At 725, the PSN also augments the statistics that it maintains (e.g., the data message count, the byte count, etc.) regarding the data messages that it distributes to the DCN identified at 725. At 725, the process 700 also creates an entry in the connection-state data storage to identify the PSN as the load balancer for performing the first type of load balancing operation on the data messages that are part of the same flow as the received data message. In some embodiments, this entry identifies the PSN and identifies the received data message header values (e.g., five tuple values) that specify the message's flow. After 725, the process ends.

When the process determines (at 720) that based on its second set of load balancing parameters, the PSN should not distribute the received data message to one of the DCNs, the process identifies (at 720) another load balancer in the PSN's SN group to distribute the data message to a DCN. Thus, in this situation, the process directs (at 730) the message to another load balancer in the PSN's SN group. To redirect the data messages, the PSN in different embodiments uses different techniques, such as MAC redirect (for L2 forwarding), IP destination network address translation (for L3 forwarding), port address translation (for L4 forwarding), L2/L3 tunneling, etc. These techniques were described above by reference to operation 330 of the process 300 of FIG. 3.

After directing (at 730) the data message to the other load balancer, the process creates (at 735) an entry in the connection-state data storage to identify the other load balancer as the service node for load balancing the data messages that are part of the same flow as the received data message. In some embodiments, this entry identifies (1) the other service node and (2) the received data message header values (e.g., five tuple values) that specify the message's flow. After 735, the process ends.

As mentioned above, the PSN's distribution of the data messages to other load balancers in its load balancing service group is based on the second set of load balancing parameters that is adjusted based on message load data aggregated and distributed by the controller set in some embodiments. In some embodiments, the data aggregated and distributed by the controller set also updates the first set of load balancing parameters that the load balancers in the PSN's load balancer group use to distribute the data messages amongst the DCNs in the DCN group. Examples of modifying such load balancing operations based on dynamically gathered and updated message load data is described in U.S. patent application Ser. No. 14/557,287 now issued as U.S. Pat. No. 10,320,679.

Figure 8:
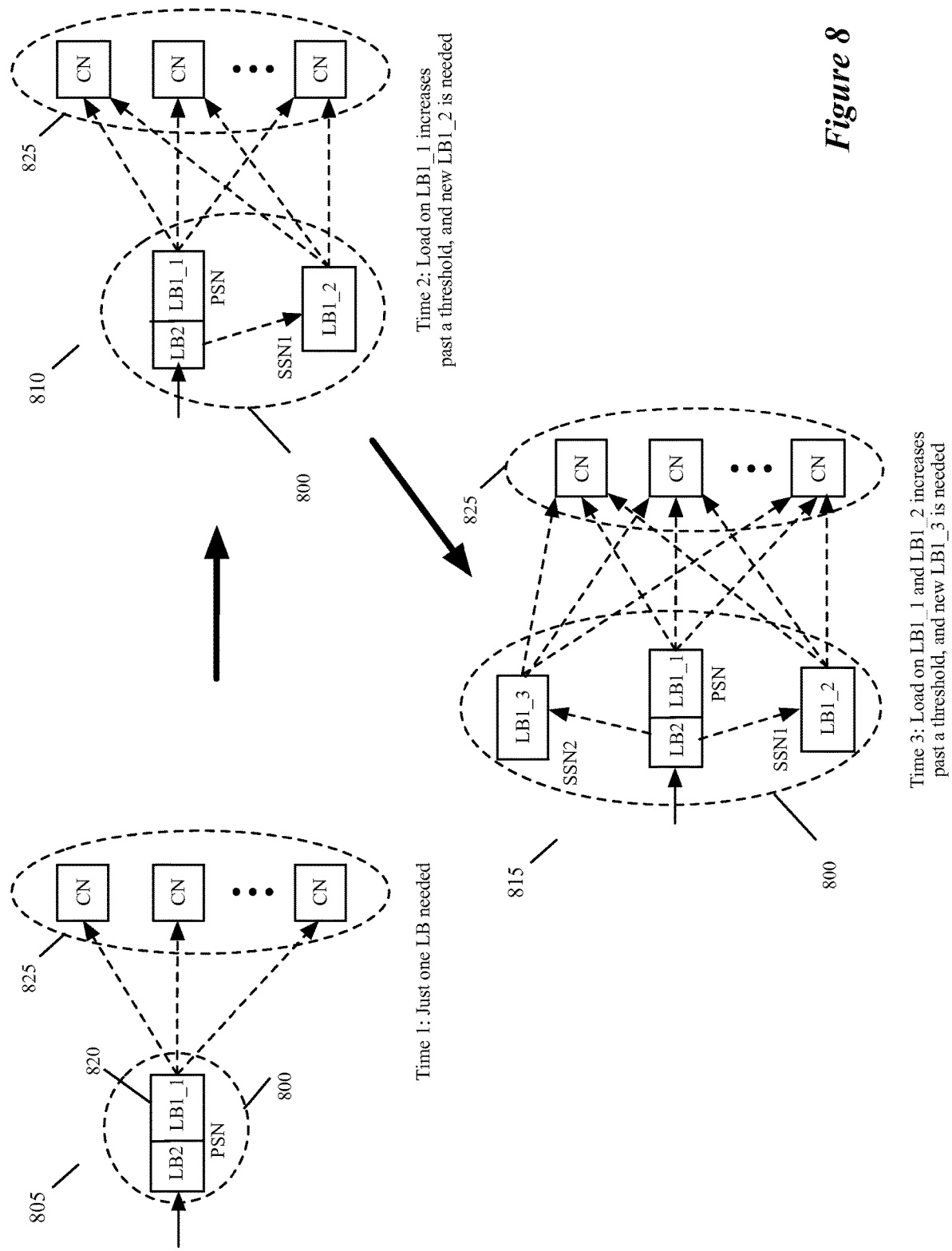
FIG. 8 illustrates an example of how load balancers are added to a load-balancing service group, and how the group's PSN distributes the data traffic among the load balancers of the group.

FIG. 8 illustrates an example of how load balancers are added to a load-balancing service group 800, and how the group's PSN distributes the data traffic among the load balancers of the group. This example is similar to the example illustrated in FIG. 4, except that the service nodes are load balancers. FIG. 8 illustrated three operational stages 805-815 of the service group 800 at three different instances in time. The first stage 805 illustrates that at a time T1, the service group 800 just includes the PSN 820. As shown, the PSN receives all the data messages that have to be load balanced, and based on a first set of load balancing parameters, distributes these messages among the compute nodes of a DCN group 825.

In FIG. 8, the PSN 820 is shown to include two load balancers, which are LB1_1 and LB2. LB 1_1 is a first type load balancer that distributes the data messages between the compute nodes of the DCN group, while LB2 is a second type load balancer that distributes the data messages between the first type load balancers of the service group 800 so that one of these load balancers can distribute the data messages between the compute nodes of the DCN group 825. In the first stage, the PSN 820 is the only first type load balancer of the service group 800, so the PSN's second type load balancer at this stage simply forwards all the data messages to the PSN's LB1_1.

The second stage 810 illustrates that a time T2, the service group 800 has been expanded to include a service node SSN1, which in this example is a load balancer LB 1_2. In some embodiments, the LB 1_2 is added to the group because the data message load on the group has exceeded a first threshold value. The controller set 225 in some embodiments adds LB 1_2 when it detects that the data message load has exceeded the first threshold value, or when the PSN detects this condition and directs the controller set to add this secondary service node. To assess whether the data message load exceeds a threshold value, the controller set or PSN in different embodiments quantify the data message load based on different metrics, such as the metrics described above (e.g., by reference to FIG. 4).

The second stage 810 also illustrates that at time T2, the LB 1_1 performs the group's load balancing on some of the data message flows, while directing other data message flows to LB 1_2 so that this load balancer can perform this service on these other flows. As shown, the first type load balancing operation that either the LB 1_1 or LB 1_2 performs on a data message, directs the data message to one of the compute nodes in the DCN group 825. As shown in FIG. 8, the PSN's LB2 performs the second load balancing operation before performing the first load balancing operation. The second load-balancing operation is the operation that determines which first type load balancer in the service group 800 should distribute each data message among the DCNs.

The third stage 815 illustrates that a time T3, the SN group has been expanded to include yet another service node SSN2, which in this example is a load balancer LB 1_3. In some embodiments, the load balancer LB 1_3 is added to the group because the data message load on the group or on the PSN or SSN1 has exceeded a second threshold value. As before, the controller set 225 in some embodiments adds LB 1_3 when it or the PSN detects that the data message load has exceeded the second threshold value. The third stage 815 also illustrates that at time T3, the PSN distributes some of the data message flows among the DCNs, while directing other data message flows to LB 1_2 and LB 1_3 so that these load balancers can distribute these other flows among the DCNs.

Figure 9:
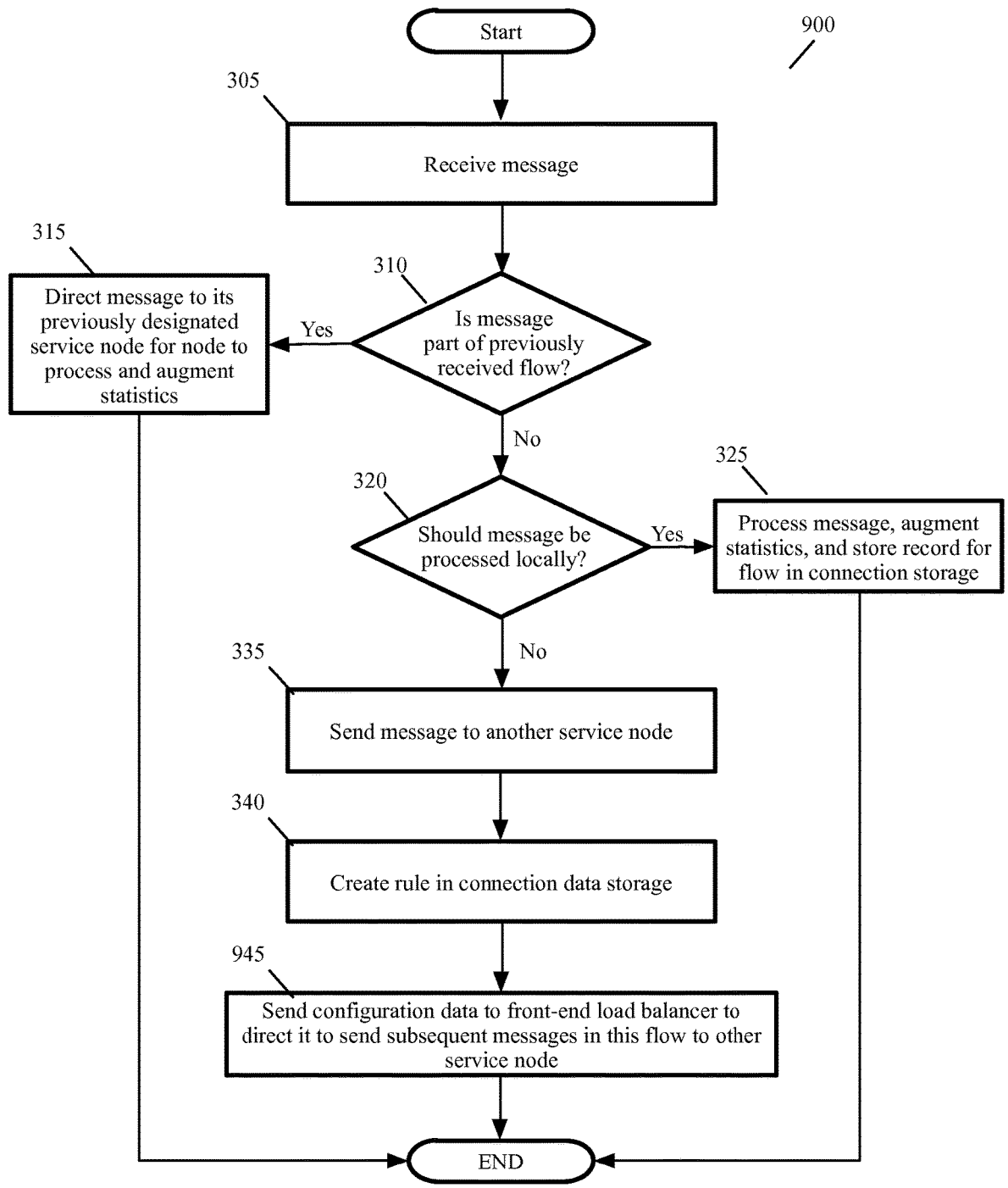
FIG. 9 illustrates a process of a PSN of some embodiments that configures a set of one or more front end load balancers (FLBs) to distribute data message flows that the PSN identifies as flows that should be processed by other service nodes of the PSN's SN group.

Instead of relying on the SN group's PSN to distribute directly the data messages among the service nodes of the SN group, some embodiments use one or more front-end load balancers to do this task. For general purpose service nodes, FIG. 9 illustrates a process 900 of a PSN of some embodiments that configures a set of one or more FLBs to distribute data message flows that the PSN identifies as flows that should be processed by other service nodes of the PSN's SN group. This process is identical to the process 300 of FIG. 3, except that the process 900 includes an operation 945 that sends configuration data to the FLB set to configure this set to forward data messages that are part of a message flow that should be processed by another service node (based on the determination at 320), to the other service node.

After sending (at 945) the configuration data to the FLB set, the PSN might continue to receive data messages for a data message flow that should be directed to another service node because the FLB set has not yet been reconfigured based on the sent configuration data, and therefore continues to send data messages of the redirected flow to the PSN. In a subsequent iteration for a data message of a flow that should be directed to another service node, the process forwards the data message to the other service node at 315.

Figure 10:
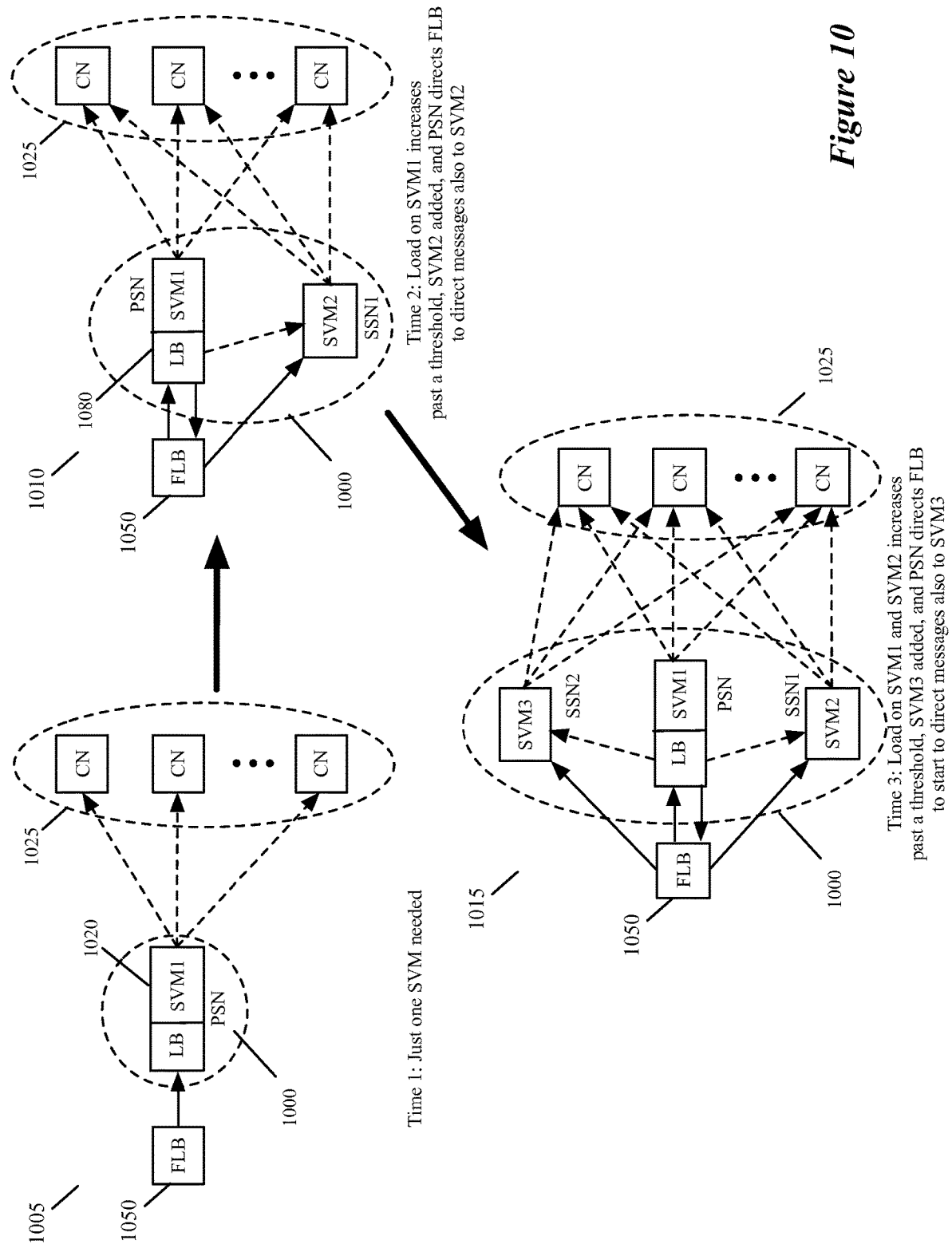
FIG. 10 illustrates an example of a PSN working with an FLB as service nodes are added to a SN group.

FIG. 10 illustrates an example of a PSN working with a front-end load balancer 1050 as service nodes are added to a SN group 1000. This example is similar to the example illustrated in FIG. 4 except that in FIG. 10, there is now the front-end load balancer 1050 that directs the data message flows to the service nodes in the SN group 1000. In some embodiments, the front-end load balancer 1050 is a hardware appliance (e.g., an F5 load balancer), standard switch, or high-end software switch, while the service nodes in the SN group 1000 are SVMs executing on host computing devices. Also, while only one front-end load balancer is illustrated in FIG. 10, two or more front-end load balancers are used in some embodiments of the invention to distribute the load among the service nodes of one or more SN groups.

FIG. 10 illustrates three operational stages 1005-1015 of the SN group 1000 at three different instances in time. The first stage 1005 illustrates that at a time T1, the SN group just includes the PSN 1020. As shown, the PSN is formed by (1) a service virtual machine SVM1, which performs the service of the SN group, and (2) a load balancer LB, which performs a load balancing operation that identifies the service node in the SN group that should perform the group's service on each data message that the PSN receives. In the first stage 1005, the load balancer directs all the data messages to its SVM1, which performs the SN group's service on these messages and then directs these messages to their destination compute nodes 1025.

The second stage 1010 illustrates that at a time T2, the SN group 1000 has been expanded to include another service node, SSN1, which is the service virtual machine SVM2. In some embodiments, the service node SSN1 is added to the group because the data message load on the group has exceeded a first threshold value, as quantified by a set of metrics (such as those described above by reference to FIG. 4). The controller set 225 in some embodiments adds SSN1 when it detects that the data message load has exceeded the first threshold value, or when the PSN detects this condition and directs the controller set to add SSN1.

The second stage 1010 also illustrates that at time T2, the PSN configures the load balancer to direct some of the flows to the PSN while directing other flows to SSN1. Because of this configuration, the PSN performs the SN group's service on some of the data message flows, while SSN1 performs this service on other data message flows. The second stage 1010 also shows that the load balancer LB of the PSN 1020 directs some of the data message flows to SSN1 for this service node to process. These directed messages are those that the SSN1 has to process, but the PSN receives because the front-end load balancer 1050 has not yet been configured to forward these data messages to SSN1. As shown, once either the PSN or SSN1 performs the service on a data message, the PSN or SSN1 directs the data message to one of the destination compute nodes 1025 that should receive the data message after the SN group processes them.

The third stage 1015 illustrates that at time T3, the SN group 1000 has been expanded to include yet another service node, SSN2, which is the service virtual machine SVM2. In some embodiments, the service node SSN2 is added to the group because the data message load on the group, or on PSN and/or SSN1, has exceeded a second threshold value, as quantified by a set of metrics like those described above. As before, the controller set 225 in some embodiments adds SSN2 when it or the PSN detects that the data message load has exceeded the second threshold value.

The third stage 1015 also illustrates that at time T3, the PSN configures the load balancer 1050 to distribute the flows amongst all the SN group members, i.e., amongst PSN, SSN1, and SSN2. Because of this configuration, the PSN performs the SN group's service on some of the data message flows, SSN1 performs this service on other data message flows, and SSN2 performs this service on yet other data message flows. As shown, once the PSN, SSN1 or SSN2 performs the service on a data message, the PSN, SSN1 or SSN2 directs the data message to one of the destination compute nodes that should receive the data message after the SN group processes them.

The third stage 1015 also shows that the load balancer LB of the PSN 1020 directs some of the data message flows to SSN1 and SSN2 for these service nodes to process. These directed messages are those that SSN1 or SSN2 has to process, but the PSN receives because the front-end load balancer 1050 has not yet been configured to forward to these data messages to SSN1 or SSN2. In other embodiments, the PSN's load balancer does not direct the data message flows to SSNs during the second and third stages 1010 and 1015. For instance, in some embodiments, the FLB set queues a new data message flow until it receives instructions from the PSN as to which service node should process the new data message flow. In other embodiments, the PSN's load balancer does not direct the data messages to other SSNs because the FLB set statefully distributes the data message flows to the service nodes, as further explained below.

In the example illustrated in FIGS. 9 and 10, the FLB 1050 sends each new flow to the PSN 1020, so that the PSN's LB 1080 can program (configure) the FLB 1050 to direct the flow to a SSN if an SSN needs to process this new flow. Absent receiving such instructions, the FLB 1050 will send all the data messages for the flow to the PSN. In other embodiments, the PSN does not configure the FLB for each new flow (i.e., on a flow-by-flow basis), but rather configures the FLB with a load balancing parameter (LBP) set that the FLB set analyzes to determine how to distribute data message flows to the service nodes of the SN group.

The PSNs of different embodiments provide different LBP sets to their FLB sets. For instance, in some embodiments, the distributed LBP set includes the SN group membership (e.g., the network address (L2 and/or L3 address) of each service node in the SN group). In these embodiments, the FLB uses its own load balancing scheme (e.g., its own equal cost multipath, ECMP, process) to distribute the data message flows amongst the service nodes of the SN group. For instance, in some embodiments, the FLB set's ECMP process generates hash ranges based on the SN group membership that the PSN provides, and then uses the generated hash ranges to distribute the data message flows amongst the service nodes.

In other embodiments, the PSN's distributes LBP set includes the SN group membership and a distribution scheme for the FLB to use to distribute flows across the service nodes of the SN group. For instance, in some embodiments, the PSN provides to the FLB a hash table that identifies each service node of a SN group and specifies a hash range for each service node of the group. In some embodiment, the hash table (e.g., a hash table the PSN generates for itself or for an FLB) can specify the same destination node (e.g., the same service node) for two or more contiguous or non-contiguous hash ranges specified by the hash table.

The FLB generates a hash value for each flow (e.g., from the flow's five tuple), and then uses the PSN-provided hash value to identify the service node for the flow (i.e., identifies the hash range in the supplied table that contains the generated hash value, and then identifies the service node associated with the identified hash range). In some embodiments, each time that the SN group membership changes, the PSN distributes to the FLB set a new LBP set, which may include (i) an updated group membership to the FLB set and/or (ii) an updated distribution scheme (e.g., an updated hash table). Also, in some embodiments, each time that the PSN determines that the load distribution has to be modified amongst the existing service nodes of the SN group, the PSN distributes an updated LBP set to the FLB set to modify the FLB set's distribution of the data message flows amongst the service nodes of the SN group. In some embodiments, an updated LBP set includes an updated hash table, which may have more hash ranges or new service nodes for previously specified hash ranges.

In some embodiments, a front-end load balancer and a PSN use stateful load balancing processes that ensure that flows that were previously processed with a service node, remain with that node even after a new service node is added to the SN group. This is because without the stateful nature of these load balancing processes, a flow that was processed by one service node might get directed to a new service node because the addition of a new node might affect a load balancing scheme or a load balancing computation (e.g., a hash computation) that the load balancers use to distribute the data message flows amongst the service nodes of the group. One way that an FLB or PSN ensures stateful load balancing in some embodiments is to use a flow connection-state storage that stores the identity of the service node for a previously processed flow.

In other embodiments, the FLB set uses a stateless load balancing scheme. For instance, in some embodiments, the FLB is a simple forwarding element (e.g., hardware or software switch) that receives the SN group membership, defines several hash value ranges and their associated service nodes based on the number of service nodes, and then performs a stateless ECMP process that distributes the data messages as it receives by generating hashes of the message header values and determining the hash ranges that contain the generated hashes. In other embodiments, the FLB is a forwarding element (e.g., software or hardware switch) that (1) receives from the PSN a hash table containing several hash value ranges and their associated service nodes, and (2) performs a stateless ECMP process that distributes the data messages as it receives them by generating hashes of the message header values and determining the hash ranges that contain the generated hashes.

The FLB in either of these approaches does not maintain the flow connection states. Whenever the PSN provides a new LBP set (e.g., new SN group membership and/or distribution scheme) in either of these stateless approaches, the FLB may forward a flow that was previously processed by one service node to another service node. To avoid different service nodes from processing the same flow, the service nodes of the SN group of some embodiments synchronize their flow connection states (e.g., through control channel communications) so that when an FLB forwards an old flow that was handled by a first service node to a second service node, the second service node can detect that the first service node was processing this flow and re-direct the flow to the second service node. In some embodiments, a service node may also re-direct a new flow to another service node when the flow was not previously processed by the other service node. For example, in some cases, the service node detects that although the flow is new and has not been processed by any other service node, it should be handled by another service node once the FLB set reconfigures based on an updated LBP set that the PSN distributes.

Figure 11:
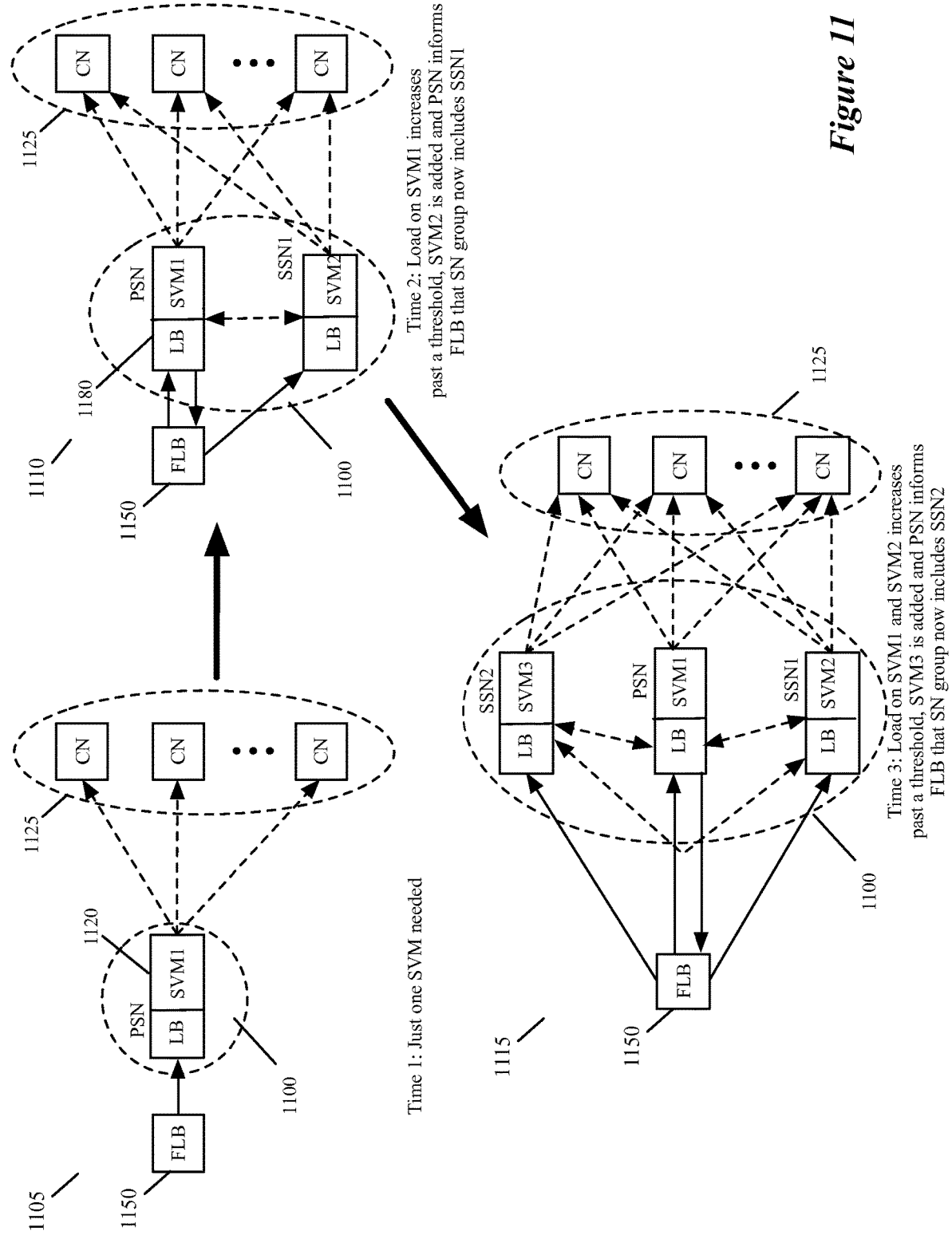
FIG. 11 illustrates an example of each service node having a load balancer that performs the secondary load balancing operation to direct messages to other service nodes.

To determine when flows need to be re-directed, each service node (i.e., the PSN and each SSN) in a SN group in some embodiments includes a load balancer that performs the secondary load balancing operation to direct messages to other service nodes. FIG. 11 illustrates an example of one such approach. This example is similar to the example illustrated in FIG. 10 in that a SN group 1100 is shown to be growing from one service node (PSN 1020) to three service nodes (PSN, SSN1 and SSN2) in three operational stages 1105-1115. Also, like the example of FIG. 10, the service nodes provide their processed data messages to the compute nodes 1125.

However, in the example illustrated in FIG. 11, the PSN does not configure the FLB on a flow-by-flow basis, but rather provides the FLB 1150 with an updated LBP set each time that it modifies the SN group. The updated LBP set includes just the SN group membership updated in some embodiments, while it also includes a distribution scheme (e.g., a hash table) in other embodiments.

In the example of FIG. 11, the FLB 1150 distributes the data message flows in a stateless manner. Accordingly, in this example, each service node includes a load balancer, which, as shown in the second and third stages 1110 and 1115, allows each service node to forward to the other service nodes the data message flows that the FLB 1150 forwards to it that should really be processed by the other service nodes.

One example of a data message flow that a first service node re-directs to a second service node includes a flow that was previously processed by the second service node but that after the LBP set updated, gets forwarded to the first service node by the FLB's stateless load balancing. To identify such a flow, the service nodes of some embodiments synchronize their flow connection states (e.g., through control channel communications). Another example for re-directing a data message flow is when the FLB has not yet reconfigured its operations based on a new LBP set from the PSN and forwards a new flow to a service node that determines based on the new LBP set another service node should process this new flow. To identify the need for such a re-direction, the SSNs in some embodiments obtain the LBP set updates from the PSN, or derive the LBP set updates independently of the PSN by using similar update processes. To derive the LBP set updates independently, the SSNs receive the same global statistics (from the controller set or from the other service nodes) as the PSN in some embodiments.

Figure 12:
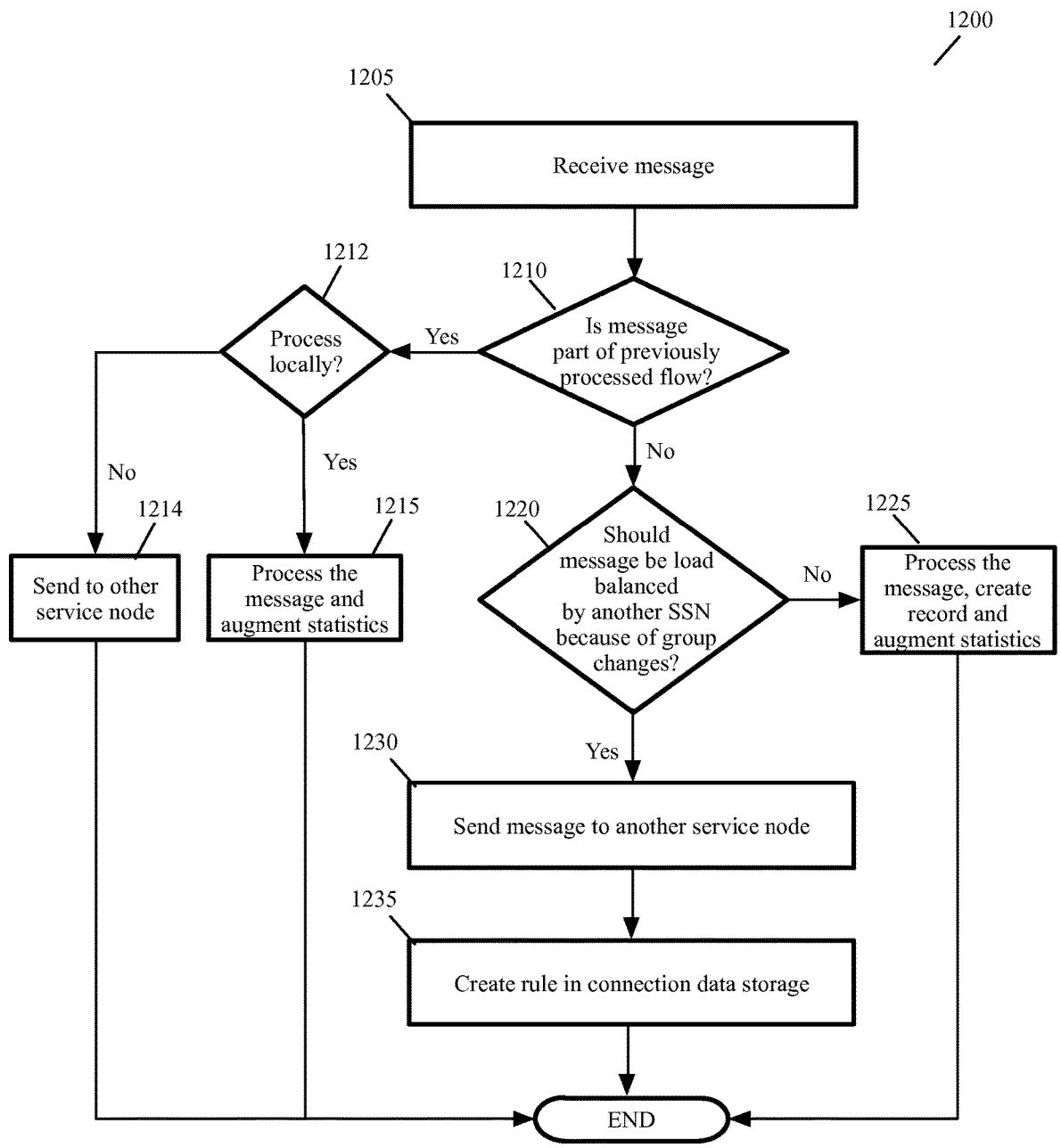
FIG. 12 illustrates a process that a load balancer of a PSN or an SSN performs in some embodiments that have the PSN configure a stateless FLB set with periodic LBP set updates.

FIG. 12 illustrates a process 1200 that a load balancer of a PSN or an SSN (e.g., SSN1 of FIG. 11) performs in some embodiments that have the PSN configure a stateless FLB set with periodic LBP set updates. This process ensures that the PSN or SSN processes data message flows that it should process, while directing other data message flows that other service nodes have to perform to other service nodes in the group.

As shown in FIG. 12, the process 1200 starts (at 1205) when the service node (PSN or SSN) receives a data message (e.g., from the PSN or the FLB set). After receiving the data message, the process determines (at 1210) whether the received message is part of a data message flow that one of the service nodes has previously processed. To make this determination, the process examines (at 1210) a flow connection-state data storage that stores (1) the identity of the data message flows that the service nodes previously processed, and (2) the identity of the service node that previously processed the identified flow.

The flow connection-state storage includes the flows that are being currently processed by all the service nodes. To maintain this storage, the service nodes synchronize the records in the connection-state storage on a real-time basis in some embodiments. This synchronization is through control channel communications in some embodiments. Also, in some embodiments, the process identifies each flow in the connection-state data storage in terms of one or more flow attributes, e.g., the flow's five tuple header values. As mentioned above, the connection-state data storages in some embodiments are hash indexed storages.

When the process identifies (at 1210) an entry in the connection-state data storage that matches the received data message flow's attributes (i.e., when it determines that the data message flow has been previously processed by one of the service nodes), the process then determines (at 1212) the identity of the service node that should process the data message from the matching connection-state data storage entry. When this matching entry specifies that another service node should process the received message, the process then directs (at 1214) the received data message to this other service node and then ends. The process 1200 re-directs the data messages to the other service node using one of the approaches mentioned above (e.g., MAC redirect, destination network address translation, etc.).

When the process determines (at 1212) that the matching entry identifies the process' associated SVM (e.g., SVM1 of PSN or SVM2 of SSN1 in FIG. 11) as the service node for the received data message, the process then directs (at 1215) its own SVM to perform this service. This SVM then performs the service on the data message, and augments the statistics that it maintains (e.g., the data message count, the byte count, etc.) regarding the data messages that it processes. After 1215, the process ends.

When the process determines (at 1210) that the connection-state data storage does not store an entry for the received data message (i.e., determines that the received data message flow is not a flow currently being processed by any service node), the process determines (at 1220) whether the received data message should be processed locally by its SVM, or remotely by another service node of the SN group. In some embodiments, another service node should process the received data message's flow when the LBP set (e.g., SN group membership) has changed but the FLB set has yet to complete its reconfiguration for a new distribution scheme that accounts for LBP set update (e.g., an addition or removal of a service node to the SN group).

To make the determination at 1220, the process needs to know of the LBP set update. When the process is performed by an SSN, the SSN would have to receive the LBP set update from the PSN, or would have to independently derive the LBP set update by using similar processes and similar input data as the PSN. In some embodiments, the LBP set update identifies the service node that should process a new data message flow. In other embodiments, the FLB set uses the LBP set to derive its load distribution scheme (e.g., to derive the hash values for its ECMP distribution scheme). For these embodiments, a service node would need to generate a load distribution scheme (e.g., to generate a hash table) from the LBP set update in the same manner as the FLB set, and then use this generated distribution scheme to identify the service node that should receive a new data message load (e.g., to identify the service node associated with a hash table range that contains a hash that is derived from the data message's header values).

When the process determines (at 1220) that its associated SVM should process the received data message, the process directs (at 1225) its SVM to perform the SN group's service on the received data message. Based on this operation, the SVM also augments (at 1225) the statistics that it maintains (e.g., the data message count, the byte count, etc.) regarding the data messages that it processes. At 1225, the process 1200 also creates an entry in the connection-state data storage to identify its SVM as the service node for processing data messages that are part of the same flow as the received data message. In some embodiments, this entry identifies the SVM and identifies the received data message header values (e.g., five tuple values) that specify the message's flow. After 1225, the process ends.

When the process determines (at 1220) that another service node should process the data message, the process directs (at 1230) the message to another service node in the SN group. To redirect the data messages, the process 1200 in different embodiments uses different techniques, such as MAC redirect (for L2 forwarding), IP destination network address translation (for L3 forwarding), port address translation (for L4 forwarding), L2/L3 tunneling, etc. These operations were described above by reference to FIG. 3.

Figure 13:
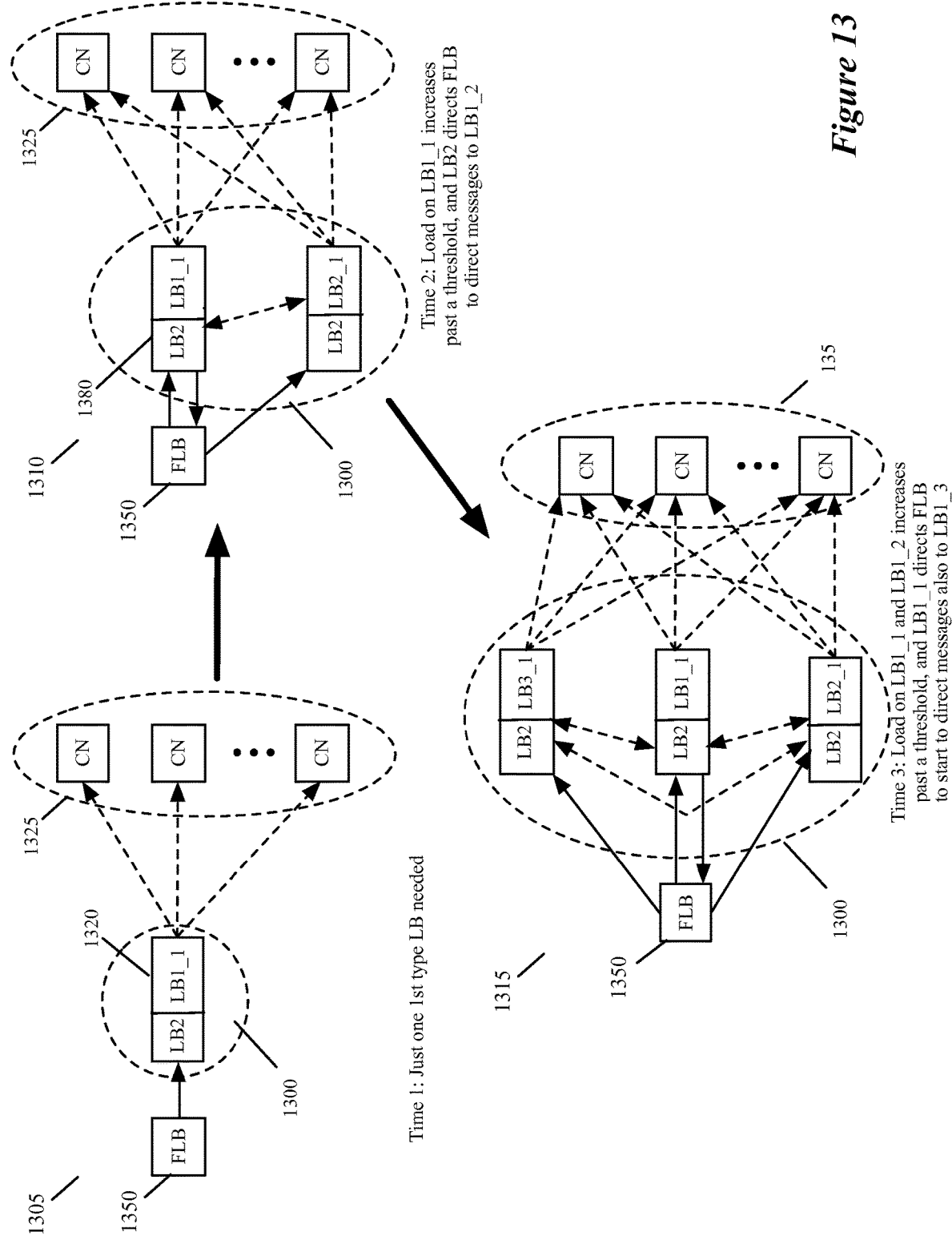
FIG. 13 presents an example that is similar to the example illustrated in FIG. 11, except that the service operation of the SN group is a load balancing operation.

After directing (at 1230) the data message to the other service node, the process creates (at 1235) an entry in the connection-state data storage to identify the other service node as the service node for processing data messages that are part of the same flow as the received data message. In some embodiments, this entry identifies (1) the other service node and (2) the received data message header values (e.g., five tuple values) that specify the message's flow. After 1235, the process ends In the example illustrated in FIGS. 10 and 11, the service nodes of SN group 1000 or 1100 can be any type of service nodes, e.g., firewalls, intrusion detection systems, intrusion prevention systems, WAN optimizers, etc. However, in some cases, the service that is provided by the SN group is a load balancing service. To illustrate this, FIG. 13 presents an example that is identical to the example illustrated in FIG. 11, except that the service operation of the SN group is a load balancing operation. Accordingly, in the example illustrated in FIG. 13, each service node performs two types of load balancing operations. One operation is to distribute the data message flows to other the service nodes that need to process the flows, while the other operation is to distribute the processed data message load to the DCNs of a DCN group.

As mentioned above, the distribution of the data message load to the DCNs is referred to as the first type load balancing while the distribution of the data message load to the group's service nodes (so that each can perform the first type load balancing) is referred to as the second type load balancing. In some embodiments, the PSN's second type load balancing in the system of FIG. 13 differs slightly from the SSN's second type load balancing in that this operation of the PSN also entails (1) directing the controller set to modify the SN group membership, and (2) informing the FLB of the change to the SN group (e.g., after receiving confirmation of this change from the controller set).

In some embodiments, one SVM performs both the load balancing operation and the service operation (which may be a non-load balancing service or a load balancing service) of a PSN or an SSN. However, in other embodiments, the two operations of such a service node (e.g., of a PSN, or of an SSN in the cases where the SSN performs a load balancing operation and another service) are performed by two different modules of the service node's associated host.

Figure 14:
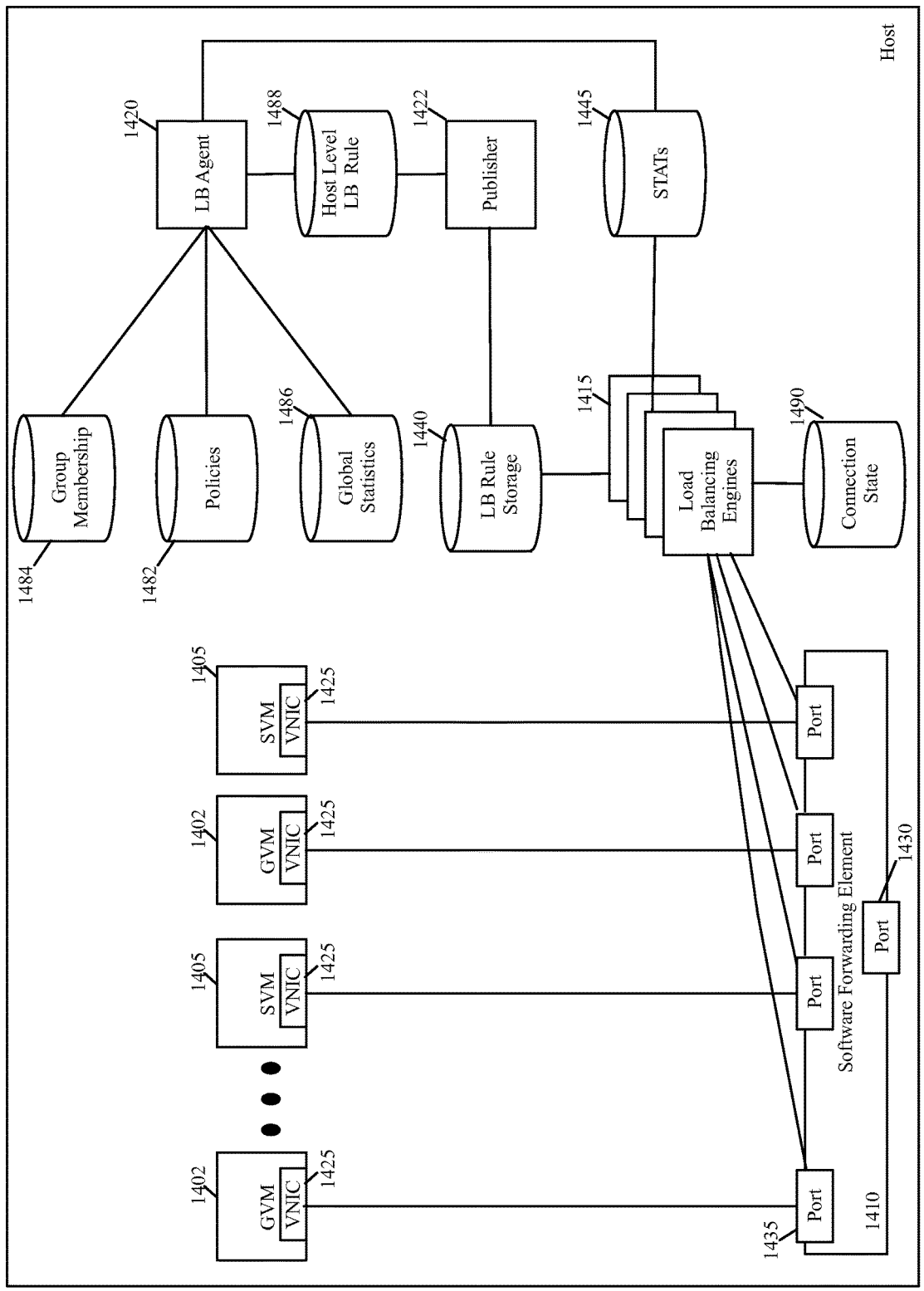
FIG. 14 illustrates an architecture of a host that executes one or more SVMs and one or more load balancers of some embodiments of the invention.

In some of these embodiments, the service node's service operation is performed by an SVM, while the service node's load balancing operation is performed by a load balancer that intercepts data messages from the datapath to the SVM. One such approach is illustrated in FIG. 14. Specifically, this figure illustrates an architecture of a host 1400 that executes one or more SVMs 1405 and one or more load balancers 1415 of some embodiments of the invention. In this architecture, each SVM 1405 in some embodiments pairs with a load balancer 1415 to form one service node of a SN group, as further described below. In other embodiments, only the PSN is implemented by an associated pair of an SVM 1405 and a load balancer 1415; the SSNs in these embodiments are implemented by an SVM 1405.

In addition to the SVMs 1405 and load balancers 1415, the host 1400 executes one or more GVMs 1402, a software forwarding element 1410, an LB agent 1420, and a publisher 1422. The host also has LB rule storage 1440 and the STATs data storage 1445, as well as group membership data storage 1484, policy data storage 1482, aggregated statistics data storage 1486, and connection state storage 1490.

The software forwarding element (SFE) 1410 executes on the host to communicatively couple the VMs of the host to each other and to other devices outside of the host (e.g., other VMs on other hosts) through the host's physical NIC (PNIC) and one or more forwarding elements (e.g., switches and/or routers) that operate outside of the host. As shown, the SFE 1410 includes a port 1430 to connect to a PNIC (not shown) of the host. For each VM, the SFE also includes a port 1435 to connect to the VM's VNIC 1425. In some embodiments, the VNICs are software abstractions of the PNIC that are implemented by the virtualization software (e.g., by a hypervisor). Each VNIC is responsible for exchanging packets between its VM and the SFE 1410 through its corresponding SFE port. As shown, a VM's egress datapath for its data messages includes (1) the VM's VNIC 1425, (2) the SFE port 1435 that connects to this VNIC, (3) the SFE 1410, and (4) the SFE port 1430 that connects to the host's PNIC. The VM's ingress datapath is the same except in the revere order (i.e., first the port 1430, then the SFE 1410, then the port 1435, and finally the VNIC 1425.

In some embodiments, the SFE 1410 is a software switch, while in other embodiments it is a software router or a combined software switch/router. The SFE 1410 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network. In other words, different logical forwarding elements can be defined to specify different logical networks for different users, and each logical forwarding element can be defined by multiple SFEs on multiple hosts. Each logical forwarding element isolates the traffic of the VMs of one logical network from the VMs of another logical network that is serviced by another logical forwarding element. A logical forwarding element can connect VMs executing on the same host and/or different hosts.

Through its port 1430 and a NIC driver (not shown), the SFE 1410 connects to the host's PNIC to send outgoing packets and to receive incoming packets. The SFE 1410 performs message-processing operations to forward messages that it receives on one of its ports to another one of its ports. For example, in some embodiments, the SFE tries to use header values in the VM data message to match the message to flow based rules, and upon finding a match, to perform the action specified by the matching rule (e.g., to hand the packet to one of its ports 1430 or 1435, which directs the packet to be supplied to a destination VM or to the PNIC). In some embodiments, the SFE extracts from a data message a virtual network identifier and a MAC address. The SFE in these embodiments uses the extracted VNI to identify a logical port group, and then uses the MAC address to identify a port within the port group.

The SFE ports 1435 in some embodiments include one or more function calls to one or more modules that implement special input/output (I/O) operations on incoming and outgoing packets that are received at the ports. One of these function calls for a port is to a load balancer in the load balancer set 1415. In some embodiments, the load balancer performs the load balancing operations on incoming data messages that are addressed to load balancer's associated VM (e.g., the load balancer's SVM that has to perform a service on the data message). For the embodiments illustrated by FIG. 14, each port 1435 has its own load balancer 1415. In other embodiments, some or all of the ports 1435 share the same load balancer 1415 (e.g., all the ports share one load balancer, or all ports that are part of the same logical network share one load balancer).

Examples of other I/O operations that are implemented by the ports 1435 include ARP proxy operations, message encapsulation operations (e.g., encapsulation operations needed for sending messages along tunnels to implement overlay logical network operations), etc. By implementing a stack of such function calls, the ports can implement a chain of I/O operations on incoming and/or outgoing messages in some embodiments. Instead of calling the I/O operators (including the load balancer set 1415) from the ports 1435, other embodiments call these operators from the VM's VNIC or from the port 1430 of the SFE.

In some embodiments, a PSN of a SN group is formed by an SVM 1405 and the SVM's associated in-line load balancer 1415. Also, for the embodiments that have an SSN perform a load balancing operation in addition to its service operation, the SSN is formed by an SVM and the SVM's associated in-line load balancer 1415. When an SSN does not perform a load balancing operation to distribute message flows to other service nodes, each SSN is implemented by only an SVM in some embodiments, while other embodiments implement each SSN with an SVM and an load balancer 1415 so that this load balancer can maintain statistics regarding the data message load on the SSN's SVM.

In some embodiments, an SVM's load balancer performs the load balancing operation needed to distribute data messages to its own SVM or to other SVMs in its SN group. When the SVM and the load balancer form a PSN, the PSN's load balancer in some embodiments may one or more of the following operations: (1) directing the controller set to modify SN group membership, (2) supplying statistics to the controller set, (3) receiving global statistics from the controller set, (4) receiving statistics from the SSNs, and (5) providing LBP data (including group membership data) to the SSNs.

When a PSN works with an FLB set, the PSN's load balancer in some embodiments configures (e.g., provides LBP set to) the FLB set, so that the FLB set can perform its load balancing operation to distribute the load amongst the service nodes of the SN group 1300. The PSN's load balancer configures the FLB differently in different embodiments. For instance, in some embodiments, the PSN simply provides the FLB with a list of service nodes in the SN group. In other embodiments, the PSN also provides the FLB with a specific distribution scheme (e.g., a hash lookup table, etc.). In still other embodiments, for each new flow that the FLB sends the PSN, the PSN configures the FLB with the identity of the service node for processing this new flow.

In other embodiments, the PSN's load balancer does not communicate with the controller set, does not send LBP data to its group's SSNs, and/or does not configure the FLB, because some or all of these operations are performed by the LB agent 1420 of the PSN's host. For instance, in some embodiments, the LB agent 1420 of the host communicates with the controller set (1) to provide statistics regarding its hosts service nodes, and (2) to receive global statistics, group membership updates, and/or membership update confirmations for the SN group of any PSN that executes on its host. Also, in some embodiments, the LB agent 1420 provides the SSNs with LBP data and/or configures the FLB, as further described below.

In some embodiments, each SN group is associated with a VIP address and this address is associated with the SN group's PSN. In some of these embodiments, the load balancer 1415 of the SN group's PSN handles ARP messages that are directed to the group's VIP. In this manner, the initial data messages of new data message flows to the group's VIP will be forwarded to the load balancer of the group's PSN. In other embodiments, the PSN's load balancer does not handle the ARP messages to the group's VIP but another module that executes on the PSN's host handles the ARP messages and this module's response ensures that the initial data messages of new data message flows to the group's VIP are forwarded to the PSN's load balancer. For example, in some embodiments, an ARP proxy module is inserted in the datapath of the PSN's SVM in the same manner as the PSN's load balancer (i.e., the ARP proxy is called by the SVM's VNIC or SFE port). This ARP proxy then responds to the ARP messages for the SN group's VIP address. It should be noted that the ARP message response is disabled on all SSN of the SN group. Also, in some embodiments, the PSN's ARP module (e.g., its load balancer or ARP proxy module) sends out gratuitous ARP replies at the beginning when the service is started on the primary host.

A service node's load balancer 1415 performs its load balancing operations based on the LB rules that are specified in the LB rule storage 1440. For a virtual address (e.g., VIP) of a load balanced group, the LB rule storage 1440 stores a load balancing rule that specifies two or more physical addresses (e.g., MAC addresses) of service nodes of the group to which a data message can be directed. As mentioned above, a PSN's associated load balancer may direct a data message to its SVM or to one or more SVMs that execute on the same host or different hosts. In some embodiments, this load balancing rule also includes load balancing metrics for specifying how the load balancer should bias the spreading of traffic across the service nodes of the group associated with a virtual address.

Figure 15:
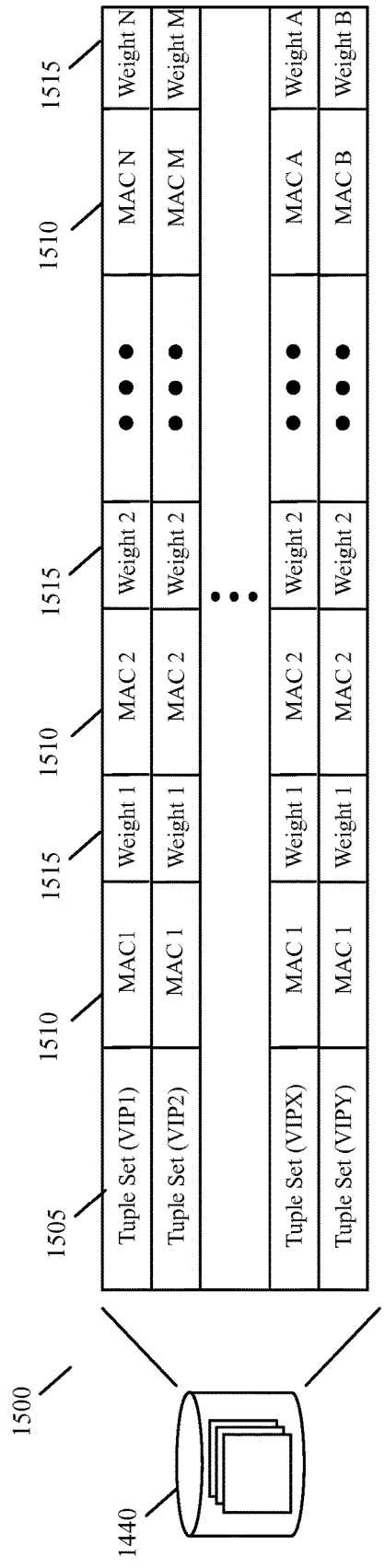
FIGS. 15 and 16 presents examples of load balancing rules that are stored in the LB rule storage.

One example of such load balancing metrics is illustrated in FIG. 15, which presents examples of load balancing rules that are stored in the LB rule storage 1440. As shown, this data storage includes multiple LB rules 1500, with each LB rule associated with one load balanced SN group. In this example, each load balance rule includes (1) a set of data-message identifying tuples 1505, (2) several MAC addresses 1510 of several SNs of the load balanced SN group, and (3) a weight value 1515 for each IP address.

Each rule's tuple set 1505 includes the VIP address of the rule's associated SN group. In some embodiments, the tuple set 1505 also includes other data message identifiers, such as source IP address, source port, destination port, and protocol. In some embodiments, a load balancer examines a LB data storage by comparing one or more message identifier values (e.g., message five-tuple header values) to the rule tuple sets 1505 to identify a rule that has a tuple set that matches the message identifier values. Also, in some embodiments, the load balancer identifies the location in the data storage 1440 that may contain a potentially matching tuple set for a received data message by generating a hash of the received data message identifier values (e.g., the message five-tuple header values) and using this hash as an index that identifies one or more locations that may store a matching entry. The load balancer then examines the tuple set 1505 at an identified location to determine whether the tuple set 1505 stored at this location matches the received message's identifier values.

In some embodiments, the MAC addresses 1510 of an LB rule are the MAC addresses of the SVMs of the SN group that has the VIP address specified in the rule's tuple set 1505. The weight values 1515 for the MAC addresses of each LB rule provide the criteria for a load balancer to spread the traffic to the SVMs that are identified by the MAC addresses. For instance, in some embodiments, the PSN's load balancer use a weighted round robin scheme to spread the traffic to the SVMs of the load balanced SN group. As one example, assume that the SN group has five SNs (i.e., five SVMs) and the weight values for the MAC addresses of these SNs are 1, 3, 1, 3, and 2. Based on these values, a load balancer would distribute data messages that are part of ten new flows as follows: 1 to the first MAC address, 3 to the second MAC address, 1 to the third MAC address, 3 to the fourth MAC address, and 2 to the fifth MAC address.

When the load balancer 1415 identifies an LB rule for a received data message and then based on the rule's LB criteria identifies an SVM for the data message, the load balancer then replaces the message's original destination MAC address with the identified SVM's MAC address when the message's original destination MAC address is not the identified SVM's MAC address (i.e., is not the MAC address of the load balancer's SVM). The load balancer then sends the data message along its datapath. In some embodiments, this operation entails returning a communication to the SFE port 1435 (that called the load balancer) to let the port know that the load balancer is done with its processing of the data message. The SFE port 1435 can then handoff the data message to the SFE 1410 or can call another I/O chain operator to perform another operation on the data message. Instead of using MAC redirect, the load balancers 1415 of some embodiments perform destination network address translation (DNAT) operations on the received data messages in order to direct the data messages to the correct SVMs. DNAT operations entail replacing the VIP address in the data message with the IP address of the identified SVM.

In some embodiments, the load balancers maintain statistics in the STAT data storage 1445 about the data messages that they direct to their associated SVM. To maintain such statistics for data message load on the SSNs, some embodiments have a load balancer 1415 for each SSN even when the SSNs do not have to distribute message flows to other service nodes. In such cases, other embodiments do not employ a load balancer 1415 for an SSN, but rather have the SSN's SVM maintain such statistics and have the LB agent of the SVM's host obtain these statistics from the SVM.

In some embodiments, the LB agent 1420 periodically supplies to the controller set the statistics that are gathered (e.g., by the load balancers 1415 or the SVMs 1405 of the service nodes) for a SN group and stored in the STAT data storage 1445. In some embodiments, LB agent 1420 generates and updates the LBP set (e.g., load balancing weight values or load balancing hash table) for a SN group with PSNs and/or SSNs on the agent's host. When multiple different SN groups have SVMs and load balancers executing on a host, the host's LB agent 1420 in some embodiments performs some or all of its operations for all of the SN groups that execute on its host. Other embodiments, however, use different LB agents for different SN groups that have SVMs and load balancers executing on the same host.

Figure 16:
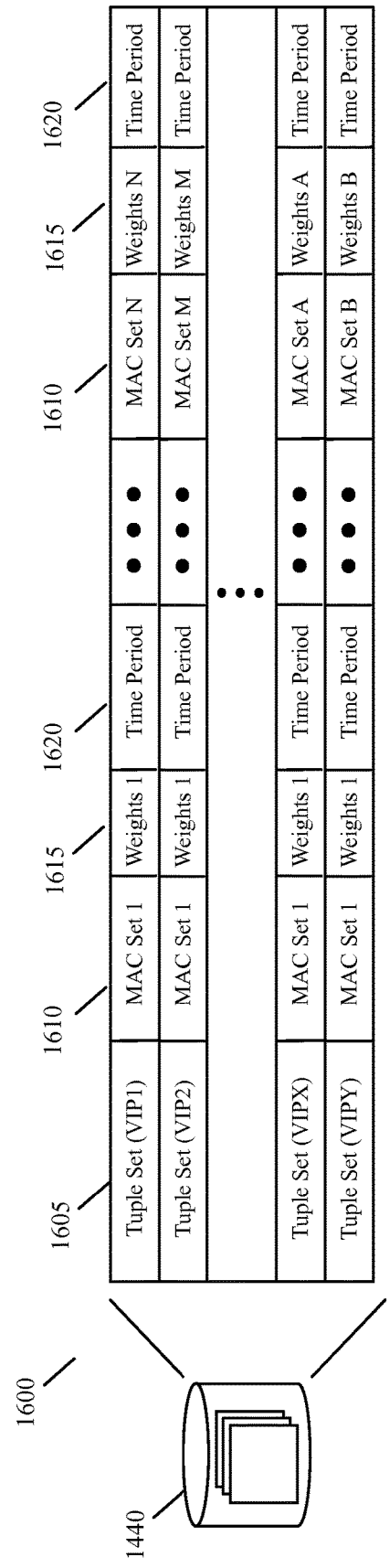

To gracefully switch between different LBP sets, the LB rules in some embodiments specify time periods for different LBP sets that are valid for different periods of time. FIG. 16 illustrates examples of load balancing rules 1600 that are stored in the LB rule storage 1440 in some embodiments. Each load balancing rule 1600 has one message identifying tuple 1605, one or more MAC address sets 1610, and one weight value set 1615 for each MAC address set. Each MAC address set 1610 has two or more MAC addresses, and each weight value set has one weight value for each MAC address in its associated MAC address set.

In the example illustrated in FIG. 16, each pair of associated MAC address set and weight value set has a time period during which the MAC address set 1610 and its associated weight value set 1615 are valid. For instance, in a LB rule, the time value for one MAC address set might specify "before 1 pm on 9/1/2014," while the time value for another MAC address set might specify "after 12:59 pm on 9/1/2014." These two time periods allow the load balancers to seamlessly switch from using one MAC address set and its associated weight value set to another MAC address set and its associated weight value set at 1 pm on 9/1/2014. These two MAC address sets might be identical and they might only differ in their associated weight value sets, or the two MAC address sets might be different. Two MAC address sets might differ but have overlapping MAC addresses (e.g., one set might have five MAC addresses, while another set might have four of these five MAC addresses when one SN is removed from a SN group). Alternatively, two MAC address sets might differ by having no MAC addresses in common.

In FIG. 16, the time period values and the weight values are used in the LB rules. One of ordinary skill will realize that in other embodiments, the LB rules do include the weight values, but include the time values to allow the load balancer to gracefully switch between different LBP sets, e.g., switch between two different hash lookup tables.

As shown in FIG. 14, the host includes a connection state storage 1490 in which each load balancer 1415 stores data records that allow the load balancer to maintain connection state for data messages that are part of the same flow, and thereby to distribute statefully data messages that are part of the same flow to the same SVM.

More specifically, whenever a load balancer identifies an SVM for a data message based on the message's group destination address (e.g., the destination VIP), the load balancer not only may replace the destination MAC address, but also stores a record in the connection state storage 1490 to identify the SVM for subsequent data messages that are part of the same flow. This record stores the MAC address of the identified SVM along with the data message's header values (e.g., source IP address, source port, destination port, destination VIP, protocol). The connection data storage 1490 is hash indexed based on the hash of the data message header values.

Accordingly, to identify an SVM for a received data message, the load balancer first checks the connection state storage 1490 to determine whether it has previously identified an SVM for receiving data messages that are in the same flow or flow hash range as the received message. If so, the load balancer uses the SVM that is identified in the connection state storage. Only when the load balancer does not find a connection record in the connection state storage 1490, the load balancer in some embodiments examines the LB rule storage to try to identify an SVM for the data message.

In FIG. 14, only one connection state storage 1490 is illustrated for all the load balancers 1415. In other embodiments, each load balancer has its own connection state storage 1490. In yet other embodiments, the host has several connection state storage 1490, but two or more load balancers can share a connection state storage (e.g., two load balancers that are balancing the load for two VMs that are part of the same logical network). As mentioned above, the connection data storages for the service nodes of a SN group (e.g., the connection data storages on different hosts) are synchronized in some embodiments, so that a PSN or an SSN can forward to another service node a data message flow that is sent by an FLB set, when the data message flow has to be processed by the other service node.

As mentioned above, the LB agent 1420 of some embodiments gathers (e.g., periodically collects) the statistics that the load balancers store in the STATs data storage(s) 1445, and relays these statistics to the controller set. Based on statistics that the controller set gathers from various LB agents of various hosts, the LB controller set in some embodiments (1) distributes the aggregated statistics to each host's LB agent so that each LB agent can define and/or adjust its load balancing parameter set, and/or (2) analyzes the aggregated statistics to specify and distribute some or all of the load balancing parameter set for the load balancers to enforce. In some embodiments where the LB agent receives new load balancing parameter set from the LB controller set, the LB agent stores the parameter set in the host-level LB rule storage 1488 for propagation to the LB rule storage(s) 1440.

In the embodiment where the LB agent receives aggregated statistics from the LB controller set, the LB agent stores the aggregated statistics in the global statistics data storage 1486. In some embodiments, the LB agent 1420 analyzes the aggregated statistics in this storage 1486 to define and/or adjust the LBP set (e.g., weight values or hash lookup tables), which it then stores in the LB rule storage 1488 for propagation to the LB rule storage(s) 1440. The publisher 1422 retrieves each LB rule that the LB agent 1420 stores in the LB rule storage 1488, and stores the retrieved rule in the LB rule storage 1440 of the load balancer 1415 that needs to enforce this rule.

The LB agent 1420 not only propagates LB rule updates based on newly received aggregated statistics, but it also propagates LB rules or updates LB rules based on updates to SN groups. In some embodiments, the controller set updates the SN group. In other embodiments, the SN group's PSN modifies the SN group. In still other embodiments, the controller set updates the SN group at the direction of the group's PSN (e.g., at the direction of the LB agent 1420 or the load balancer 1415 of the PSN SVM of the SN group).

The LB agent 1420 stores each SN group's members in the group data storage 1484. When a SN is added to or removed from a SN group, the LB agent 1420 of some embodiments stores this update in the group storage 1484, and then formulates updates to the LB rules to add or remove the destination address of this SN from the LB rules that should include or already include this address. Again, the LB agent 1420 stores such updated rules in the rule data storage 1488, from where the publisher propagates them to the LB rule storage(s) 1440 of the load balancers that need to enforce these rules.

In some embodiments, the LB agent 1420 stores in the policy storage 1482, LB policies that direct the operation of the LB agent in response to newly provisioned SVMs and their associated load balancers, and/or in response to updated global statistics and/or adjusted SN group membership. The policies in the policy storage 1482 in some embodiments are supplied by the controller set.

Figure 17:
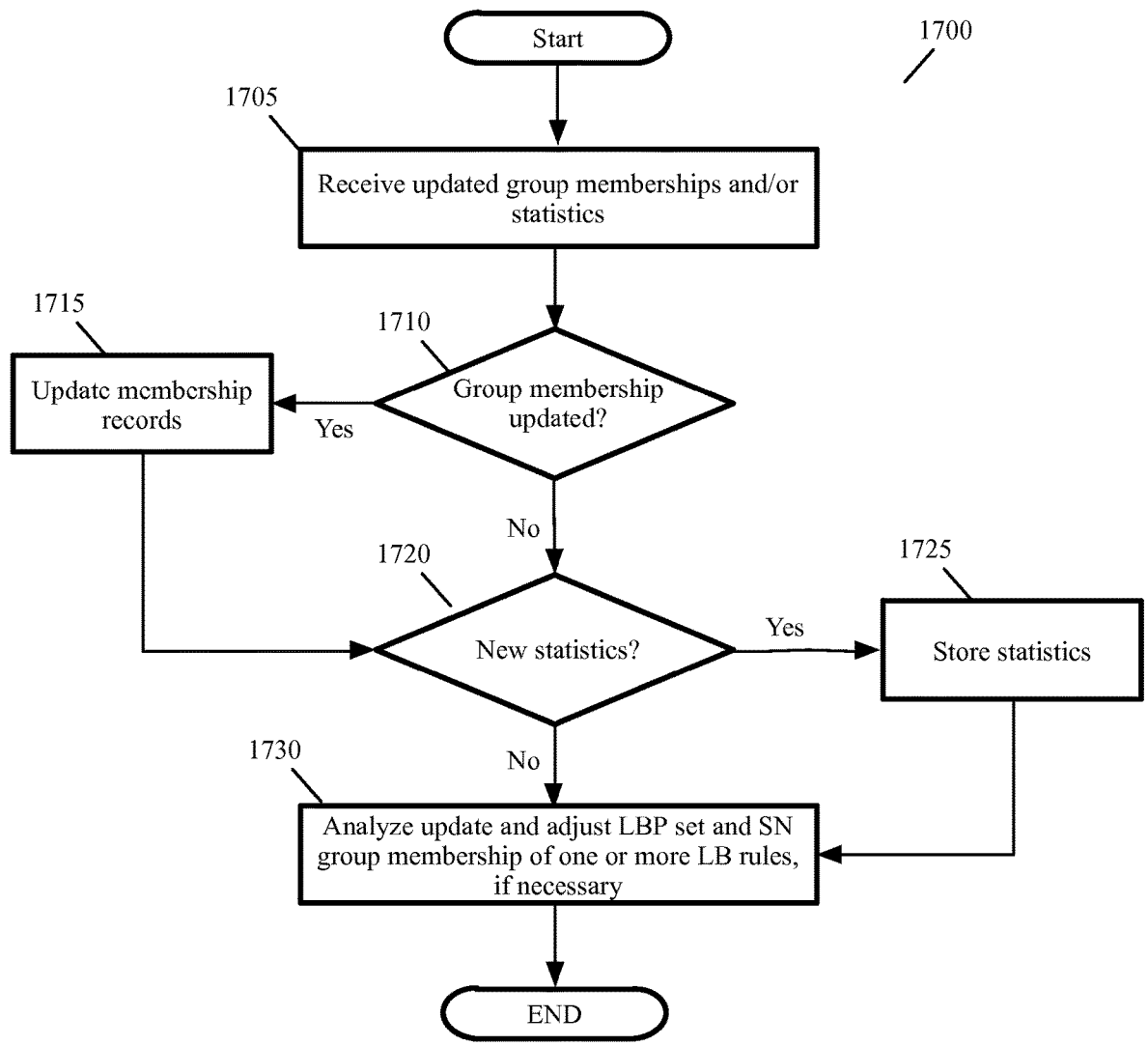
FIG. 17 illustrates a process that the LB agent performs in some embodiments each time that it receives updated group memberships and/or global statistics from a controller set.

FIG. 17 illustrates a process 1700 that the LB agent 1420 performs in some embodiments each time that it receives updated group memberships and/or global statistics from the controller set 225. As shown, the process 1700 starts (at 1705) when it receives from the controller set 225 updated statistics for at least one SN group and/or updated membership to at least one SN group.

At 1710, the process 1700 determines whether the received update includes an update to the membership of at least one SN group for which the LB agents generates and/or maintains the LB rules. In some embodiments, the PSN's load balancer 1415 or the LB agent 1420 direct the controller set to instantiate a new SVM for the SN group or to allocate a previously instantiated SVM to the SN group, when the load balancer 1415 or the LB agent 1420 determine that a new service node should be added to the SN group. Similarly, when the load balancer 1415 or the LB agent 1420 determine that the SN group should shrink, the load balancer 1415 or the LB agent 1420 direct the controller set to remove one or more SVMs from the SN group. Thus, in these embodiments, the received group update is in response to a group adjustment request from the load balancer 1415 or the LB agent 1420.

When the process determines (at 1710) that the received update does not include a membership update, the process transitions to 1720. Otherwise, the process creates and/or updates (at 1715) one or more records in the group membership storage 1484 to store the updated group membership that the process received at 1705. From 1715, the process transitions to 1720.

At 1720, the process 1700 determines whether the received update includes updated statistics for at least one SN group for which the LB agents generates and/or maintains the LB rules. If not, the process transitions to 1730. Otherwise, the process creates and/or updates (at 1725) one or more records in the global statistics storage 1486 to store the updated global statistics that the process received at 1705. From 1725, the process transitions to 1730.

At 1730, the process initiates a process to analyze the updated records in the group membership storage 1484 and/or the global statistics storage 1486 to update the group memberships (e.g., the IP addresses) and/or the load balancing parameter set (e.g., the weight values or hash lookup table) of one or more LB rules in the host-level LB rule data storage 1488. In some embodiments, the policies that are stored in the policy storage 1482 control how the LB agent 1420 updates the LB rules based on the updated group membership record(s) and/or the updated global statistics. In some embodiments, the LB agent performs an identical or similar process (1) when the LB agent powers up (e.g., when its host powers up) to configure the LB rules of the load balancers on the host, and (2) when a new SVM 1405 is instantiated on the host and the LB agent needs to configure the LB rules of the instantiated SVM's associated load balancer 1415.

In different embodiments, the process 1700 updates (at 1730) the load balancing parameter set differently. For instance, in some embodiments, the process updates weight values and/or time values for load balancing criteria, and/or updates the service nodes for one or more weight values. In other embodiments, the process updates hash tables by modifying hash ranges, adding new hash ranges, and/or specifying new service nodes for new or previous hash ranges. As mentioned before, multiple contiguous or non-contiguous hash ranges in some embodiments can map to the same service node. In some embodiments, updates to the hash table re-assign a hash range from one service node to another service node.

From the host-level LB rule data storage 1488, the publisher 1422 propagates each new or updated LB rule to the LB rule data storages 1440 of the individual load balancers 1415 (on the same host) that need to process the new or updated LB rule. In publishing each new or updated LB rule, the publisher 1422 does not publish the LB rule to the rule data storage 1440 of a load balancer (on the same host) that does not need to process the rule.

In some embodiments, the updated LB rules also have to be supplied the load balancers of the SSNs. In some of these embodiments, the updated LB rules are distributed by the LB agent 1420 or publisher 1422 of the PSN's host to the host-level data storage 1488 of other hosts that execute SSNs of the PSN's SN group. In other embodiments, however, the LB agent 1420 on these other hosts follows the same LB policies to generate the same LB rule updates on these other hosts, and the publisher on these other hosts pushes these updated LB rules to the LB rule data storages 1440 of the SSNs' load balancers 1415. Accordingly, in these embodiments, the updated rules do not need to be distributed from the PSN's host to the hosts that execute SSNs of the PSN's SN group.

After 1730, the process 1700 ends.

Figure 18:
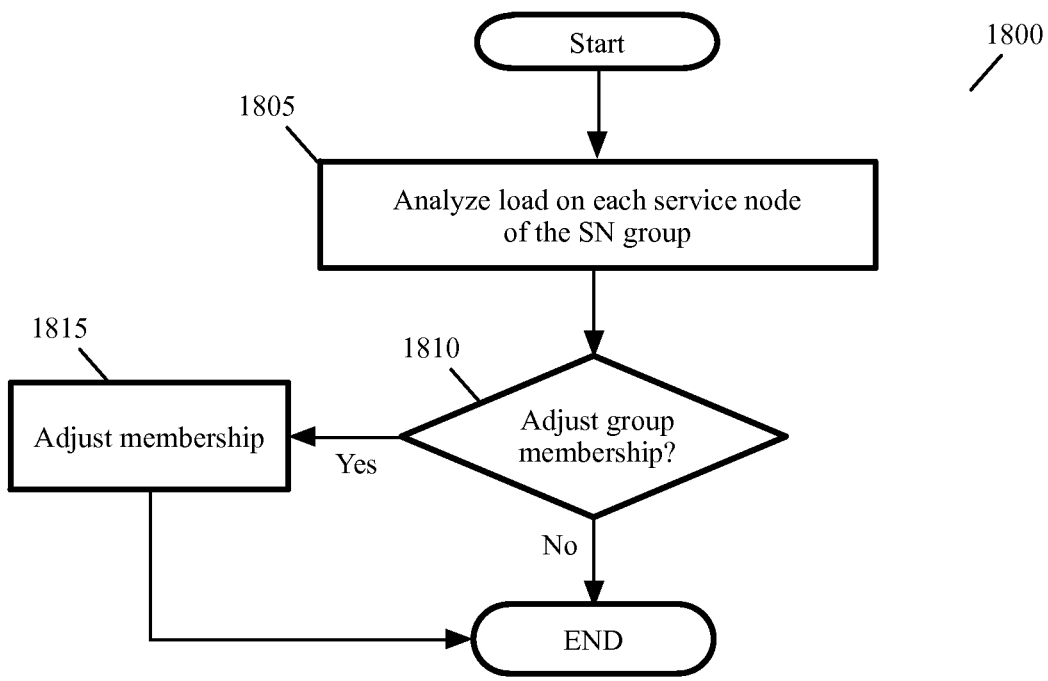
FIG. 18 illustrates a process that the LB agent of the PSN SVM performs in some embodiments to elastically adjust the membership of the PSN's SN group.

FIG. 18 illustrates a process 1800 that the LB agent 1420 of the PSN SVM performs in some embodiments to elastically adjust the membership of the PSN's SN group. The LB agent periodically performs this process to analyze global statistics regarding the message load on the SN group's service nodes and when necessary to adjust the SN group membership to alleviate load on the service nodes or eliminate unused excess capacity on the service nodes.

As shown, the process 1800 initially analyzes (at 1805) the data message load on the service nodes of the SN group. Next, at 1810, the process determines whether the SN group membership should be updated in view of analyzed message load data. In some embodiments, when the message load on the SN group as a whole exceeds a first threshold, the process determines (at 1810) that a service node should be added to the SN group. In other embodiments, the process decides (at 1810) to add a service node to the SN group when the message load on one or more service nodes in the SN group exceeds the first threshold.

Conversely, the process determines (at 1810) to remove a service node from the SN group when it determines that the message load on the SN group as a whole, or on one or more service nodes individually, is below a second threshold value. The second threshold value is different than the first threshold value in some embodiments, while it is the same as the first threshold value in other embodiments. Several examples for quantifying message load (for comparison to threshold values) were described above. These examples include metrics such as number of data message flows currently being processed, number of data messages processed within a particular time period, number of payload bytes in the processed messages, etc. For these examples, the threshold values can similarly be quantified in terms of these metrics.

When the process determines (at 1810) that it does not need to adjust the group membership, the process ends. Otherwise, the process transitions to 1815, where it performs the set of operations for adding one or more service nodes to, or removing one or more service nodes from, the SN group. In some embodiments, the sequence of operations for adding a service node is the same as the sequence of operations for removing a service node.

In other embodiments, these two sequences are not similar. For instance, in some embodiments, to add a service node, the process 1800 initially directs the controller set to add the service node, and then after receiving notification from the controller set regarding the addition of the service node, the process updates the load balancing rules of the PSN, and when applicable, the SSNs and FLBs. On the other hand, the process 1800 of some embodiments removes a service node by (1) initially directing the PSN (and when applicable, the SSNs and FLBs) to stop sending new flows to the service node, and then (2) after a transient delay or a sufficient reduction in the usage of the service node, directing the controller set to remove the service node from the SN group.

In still other embodiments, the process 1800 can follow other sequences of operations to add a service node to, or remove a service node from, the SN group. Also, in other embodiments, the PSN's LB agent does not perform the elastic adjustment process 1800. For instance, in some embodiments, the PSN's load balancer performs this process. In other embodiments, the controller set performs this process.

Figure 19:
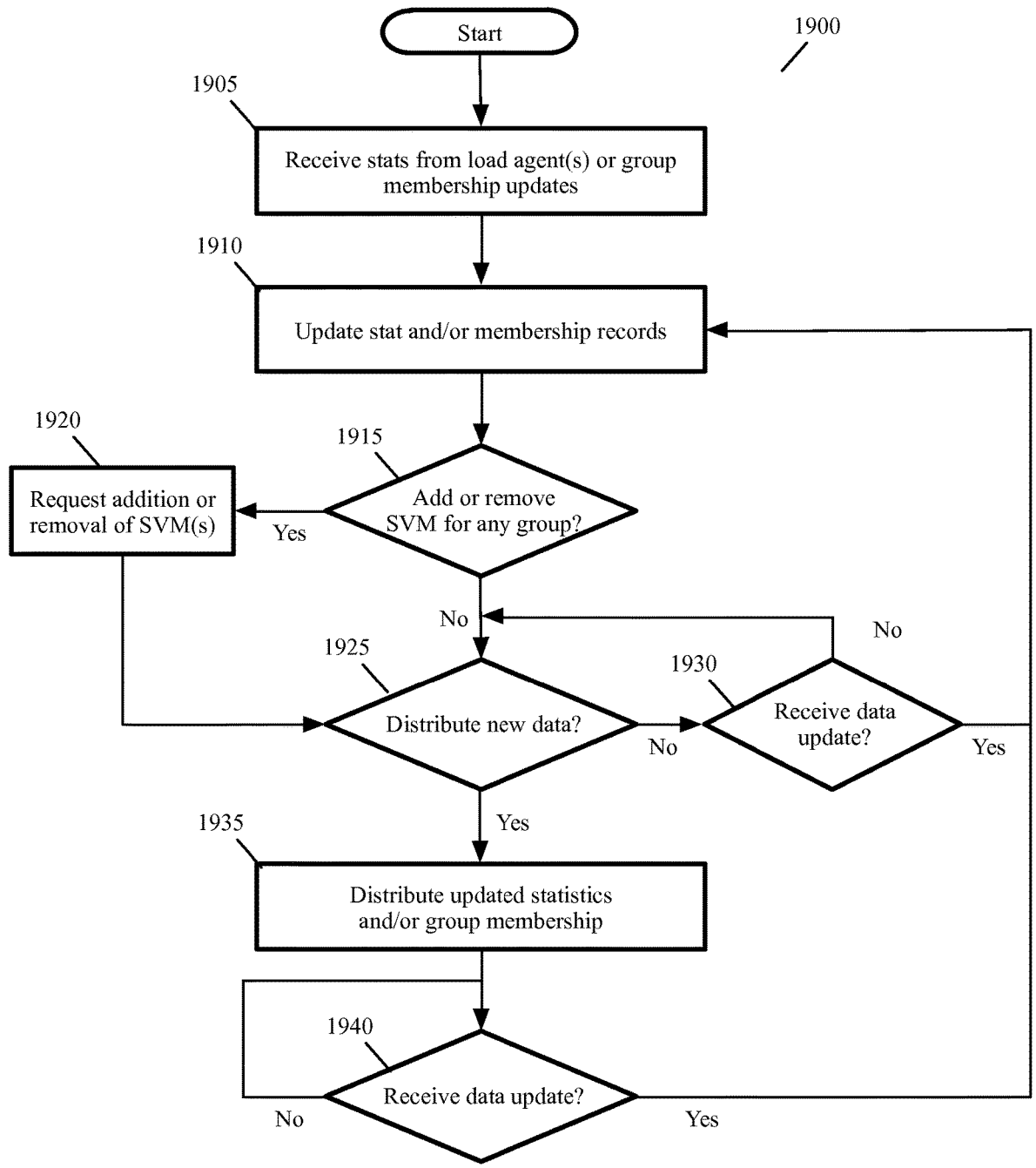
FIG. 19 illustrates a process that one or more controllers in the controller set perform in some embodiments.

FIG. 19 illustrates a process 1900 that one or more controllers in the controller set perform in some embodiments. The controller set performs this process to distribute global statistics and/or group membership updates for a SN group. As shown, the process 1900 starts (at 1905) when it (1) receives statistics from one or more LB agents 1420 or load balancers 1415, and/or (2) receives membership updates for a SN group.

The process 1900 in some embodiments receives the group membership updates from another process of the controller set. For instance, in some embodiments, a virtualization manager informs the process 1900 that a new SVM has been added to an SN group when a new SVM has been created for the SN group, or has been removed from the SN group when the SVM has been terminated or has failed in the SN group. In some embodiments, the virtualization manager instantiates a new SVM or allocates a previously instantiated SVM to the SN group at the behest of the process 1900, as further described below.

At 1910, the process updates (1) the global statistics that the controller set maintains for the SN group based on the statistics received at 1905, and/or (2) the SN group's membership that the controller set maintains based on the group updates received at 1905. Next, at 1915, the process determines based on the updated statistics whether it should have one or more SVM specified or removed for the group. For instance, when the updated statistics causes the aggregated statistics for the SN group to exceed a threshold load value for one or more SNs in the group, the process 1900 determines that one or more new SVMs have to be specified (e.g., allotted or instantiated) for the SN group to reduce the load on SVMs previously specified for the group. Conversely, when the updated statistics shows that a SVM in a SN group is being underutilized or is no longer being used to handle any flows, the process 1900 determines (at 1915) that the SVM has to be removed for the SN group. In some embodiments, process 1900 also determines that SN group membership should be modified when it receives such a request from the PSN (e.g., through the PSN's LB agent or load balancer).

When the process 1900 determines (at 1915) that it should have one or more SVMs added to or removed for the group, the process requests (at 1920) one or more virtualization manager to add or remove the SVM(s), and then transitions to 1925. In some embodiments, a virtualization manager is a process that one or more controllers in the controller set execute, while in other embodiments, the virtualization manager is a process that is executed by one or more servers that are outside of the controller set that handles the LB data collection and data distribution.

The process 1900 also transitions to 1925 when it determines (at 1915) that no SVM needs to be added to or removed from the SN group. At 1925, the process determines whether the time has reached for it to distribute membership update and/or global statistics to one or more LB agents executing on one or more hosts. In some embodiments, the process 1900 distributes membership updates and/or global statistics on a periodic basis. In other embodiments, however, the process 1900 distributes membership update and/or global statistics for the SN group whenever this data is modified. Also, in some embodiments, the process 1900 distributes updated statistics and/or group membership to only the LB agent of the SN group's PSN, while in other embodiments, the process distributes the updated statistics and/or group membership to the LB agent of each host that executes the SVM of the PSN and/or an SSN of the group. In the embodiments where the process distributes statistic and membership updates to only the LB agent of the group's PSN, one or more modules on the PSN's host distribute the updated LB rules and/or group membership to the SSNs if the SSNs need such data.

When the process determines (at 1925) that it does not need to distribute new data, it transitions to 1930 to determine whether it has received any more statistic and/or membership updates for which it needs to update its records. If so, the process transitions back to 1910 to process the newly received statistic and/or membership updates. If not, the process transitions back to 1925 to determine again whether it should distribute new data to one or more LB agents.

When the process determines (at 1925) that should distribute membership update(s) and/or global statistics, it distributes (at 1935) this data to one or more LB agents that need to process this data to specify and/or update the load balancing rules that they maintain for their load balancers on their hosts. After 1935, the process determines (at 1940) whether it has received any more statistic and/or membership updates for which it needs to update its records. If not, the process remains at 1940 until it receives statistics and/or membership updates, at which time it transitions back to 1910 to process the newly received statistic and/or membership updates.

In the embodiments described above by reference to FIG. 19, the controller set distributes global statistics to the LB agents, which analyze this data to specify and/or adjust the LB rules that they maintain. In other embodiments, however, the controller set analyzes the global statistics that it gathers, and based on this analysis specifies and/or adjusts LBP sets or LB rules, which it then distributes to the LB agents 1420 or load balancers 1415.

Figure 20:
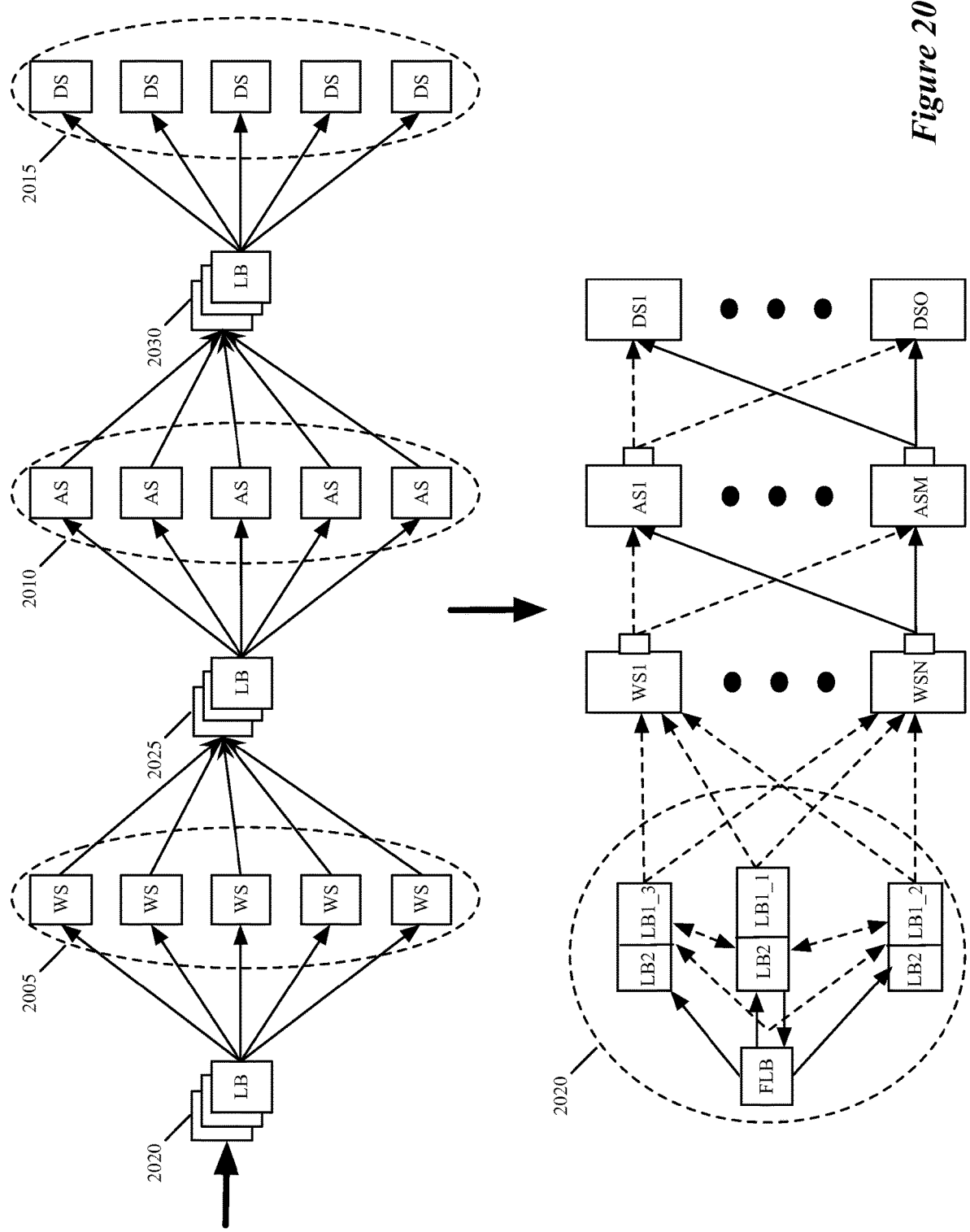
FIG. 20 illustrates an elastic SN group of some embodiments being used to elastically provide services at an edge of a network.

The elastic SN groups of some embodiments are used to elastically provide services (e.g., load balancing, firewall, etc.) at the edge of a network. FIG. 20 illustrates one such example. In this example, three layers of load balancers are topologically positioned before three layers of compute nodes of a compute cluster 2000. The three layers of compute nodes are a web server layer 2005, an application server layer 2010, and a data storage layer 2015.

In this example, the first load balancing layer 2020 is implemented by using an elastic load balancing group of some embodiments of the invention. This elastic group is identical to the group that was described above by reference to FIG. 13. The elastic LB group 2020 is deployed at the edge the network of the compute cluster 2000. The cluster's network interconnects the compute nodes of the cluster with each other and with other devices outside of the cluster's network. In some embodiments, the compute cluster 2000 is a shared-cloud datacenter or an entity's datacenter, while in other embodiments, the cluster is a portion of a datacenter.

Also, in this example, the second and third layers 2025 and 2030 of load balancers are implemented by the inline load balancers of the web server and application server VMs of some embodiments. In some embodiments, these inline load balancers are implemented like the load balancers 1415 of FIG. 14, except that they intercept the data messages on the egress path of their associated sever VMs in order to spread these messages to the VMs of the next stage of servers. This distributed in-line load balancing is further described in U.S. patent application Ser. No. 14/557,287, now issued as U.S. Pat. No. 10,320,679.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 21 conceptually illustrates a computer system 2100 with which some embodiments of the invention are implemented. The computer system 2100 can be used to implement any of the above-described hosts, controllers, and managers. As such, it can be used to execute any of the above described processes. This computer system includes various types of non-transitory machine readable media and interfaces for various other types of machine readable media. Computer system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the computer system 2100. For instance, the bus 2105 communicatively connects the processing unit(s) 2110 with the read-only memory 2130, the system memory 2125, and the permanent storage device 2135.

From these various memory units, the processing unit(s) 2110 retrieve instructions to execute and data to process in order to execute the processes of the invention. The processing unit(s) may be a single processor or a multi-core processor in different embodiments. The read-only-memory (ROM) 2130 stores static data and instructions that are needed by the processing unit(s) 2110 and other modules of the computer system. The permanent storage device 2135, on the other hand, is a read-and-write memory device. This device is a non-volatile memory unit that stores instructions and data even when the computer system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, etc.) as the permanent storage device. Like the permanent storage device 2135, the system memory 2125 is a read-and-write memory device. However, unlike storage device 2135, the system memory is a volatile read-and-write memory, such a random access memory. The system memory stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieve instructions to execute and data to process in order to execute the processes of some embodiments.

The bus 2105 also connects to the input and output devices 2140 and 2145. The input devices enable the user to communicate information and select commands to the computer system. The input devices 2140 include alphanumeric keyboards and pointing devices (also called "cursor control devices"). The output devices 2145 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples computer system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of computer system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, this specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 3, 7, 9, 12, and 17-19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, one of ordinary skill in the art would understand that the invention is not to be limited by the foregoing illustrative details, but rather is to be defined by the appended claims.

We claim:

1. A non-transitory machine readable medium of a primary service node (PSN), the medium storing a program for performing a particular service on data messages, the program comprising sets of instructions for:
at the PSN:
receiving a data message that requires the particular service;
identifying a service node (SN) in a SN group to perform the particular service on data messages that are in a same flow as the received data message, said SN group comprising the PSN;
when the PSN identifies the PSN as the identified SN for the received data message's flow, performing at the PSN the particular service on the received data message and on the data messages in the same flow as the received data message; and
when the PSN identifies another SN as the identified SN for the received data message's flow, directing the received data message to the other identified SN for the other identified SN to perform the particular service on the received data message.

2. The non-transitory machine readable medium of claim 1, wherein the set of instructions for directing the received data message to the other identified SN comprises a set of instructions for directing the data messages that are in the same flow as the received data message to the other identified SN for the other identified SN to perform the particular service on the data messages in the same flow.

3. The non-transitory machine readable medium of claim 1:
wherein the particular service is a non-load balancing service, the other identified SN is a secondary service node (SSN), and the SN group comprises a plurality of SSNs in addition to the PSN; and
wherein the set of instructions for identifying a service node comprises a set of instructions for performing load balancing operations to distribute data message flows among the service nodes of the SN group.

4. The non-transitory machine readable medium of claim 3, wherein the load balancing operations are based on load balancing criteria that are defined to ensure even distribution of data message traffic load to the service nodes.

5. The non-transitory machine readable medium of claim 3, wherein the non-load balancing service is one of a firewall service, an intrusion detection service, and a WAN optimizer service.

6. The non-transitory machine readable medium of claim 3, wherein the set of instructions for performing the load balancing operations comprises a set of instructions for identifying at least one load balancing rule that identifies load balancing criteria for distributing the data message flows to the service nodes.

7. The non-transitory machine readable medium of claim 6, wherein the set of instructions for identifying the load balancing rule comprises a set of instructions for identifying the load balancing rule by using a set of data message header parameters associated with the SN group.

8. The non-transitory machine readable medium of claim 7, wherein the set of data message header parameters includes a virtual Internet Protocol (VIP) address associated with the SN group.

9. The non-transitory machine readable medium of claim 8, wherein the VIP address is an Internet Protocol (IP) address of the PSN.

10. The non-transitory machine readable medium of claim 1, wherein the set of instructions for directing the received data message to the other identified SN comprises a set of instructions for changing a destination media access control (MAC) address of the data message to a MAC address of the other identified SN.

11. The non-transitory machine readable medium of claim 1, wherein the set of instructions for directing the received data message to the other identified SN comprises a set of instructions for changing a destination Internet Protocol (IP) address of the data message to an IP address of the other identified SN.

12. The non-transitory machine readable medium of claim 1, wherein the set of instructions for directing the received data message to the other identified SN comprises a set of instructions for configuring a front end load balancer to send the received data message and the data messages that are part of the same flow as the received data message to the other identified SN.

13. The non-transitory machine readable medium of claim 1,
wherein each service node includes a service virtual machine (SVM) that executes on a host computing device in a system with a plurality of host computing devices;
wherein the PSN further includes a load balancer that executes on the host computing device along with the PSN's SVM; and
wherein the load balancer is an inline load balancer that intercepts data messages from the datapath of the PSN's SVM and identifies a service node in the SN group that should perform the particular service on the data message.

14. A method for performing a particular service on data messages, for a primary service node (PSN) of a service node (SN) group that comprises the PSN and at least one secondary service node (SSN), the method comprising:
at the PSN, receiving a first data message and identifying the PSN as the service node to perform the particular service on data messages that are in a same flow as the first data message;
performing, at the PSN, the particular service on the first data message and on data messages in the same flow as the first data message;
at the PSN, receiving a second data message and identifying the SSN as the service node to perform the particular service on data messages that are in a same flow as the second data message; and
directing the second data message and the data messages in the same flow as the second data message to the SSN to perform the particular service on the second data message and the data messages in the same flow as the second data message.

15. The method of claim 14, wherein the service is a non-load balancing service and the SN group comprises a plurality of SSNs, the method further comprising performing load balancing operations to distribute data message flows among the service nodes of the SN group.

16. The method of claim 15, wherein the load balancing operations are based on load balancing criteria that are defined to ensure even distribution of data message traffic load to the service nodes.

17. The method of claim 14, wherein directing the second data message to the SSN comprises changing destination media access control (MAC) addresses of the second data message and the data messages in the same flow as the second data message to a MAC address of the SSN.

18. The method of claim 14, wherein directing the second data message to the SSN comprises changing destination Internet Protocol (IP) addresses of the second data message and the data messages in the same flow as the second data message to an IP address of the SSN.

19. The method of claim 14, wherein directing the second data message to the SSN comprises configuring a front end load balancer to send the second data message and the data messages that are part of the same flow as the second data message to the SSN.

\* \* \* \* \*